(12) United States Patent
Purusothaman et al.

(10) Patent No.: US 10,645,122 B2
(45) Date of Patent: May 5, 2020

(54) SYSTEM FOR MONITORING AND MANAGING FIREWALL DEVICES AND FIREWALL MANAGEMENT PLATFORMS

(71) Applicant: AppViewX Inc., Seattle, WA (US)

(72) Inventors: Anand Purusothaman, Jersey, NJ (US); Muralidharan Palanisamy, Jersey, NJ (US); Vigneshwar Mohan, Chennai (IN); Ashok Kumar Gnanam, Chennai (IN); Nandini Menon Thodenchat, Bangalore (IN)

( * ) Notice: Subject to any disclaimer, the term of this patent is extended or adjusted under 35 U.S.C. 154(b) by 231 days.

(21) Appl. No.: 15/986,474

(22) Filed: May 22, 2018

(65) Prior Publication Data
US 2019/0364072 A1    Nov. 28, 2019

(51) Int. Cl.
*H04L 29/06* (2006.01)

(52) U.S. Cl.
CPC .......... *H04L 63/20* (2013.01); *H04L 63/0236* (2013.01); *H04L 63/0263* (2013.01); *H04L 63/0281* (2013.01)

(58) Field of Classification Search
CPC ............................ H04L 63/20; H04L 63/0236
USPC .......................................................... 726/1–8
See application file for complete search history.

(56) References Cited

U.S. PATENT DOCUMENTS

| 6,148,337 A * | 11/2000 | Estberg ................. H04L 41/046 709/223 |
| 6,456,306 B1 * | 9/2002 | Chin ................... H04L 41/0213 709/224 |
| 7,428,300 B1 * | 9/2008 | Drew .................. H04M 3/2254 379/14.01 |

* cited by examiner

*Primary Examiner* — Longbit Chai

(57) ABSTRACT

A computer implemented method for monitoring and managing a security policy of a plurality of application specific objects across a plurality of datacenters are provides. The computer implemented method includes following steps: (i) displaying the plurality of application devices managed in a security policy management system in a single pane view; (ii) adding new application devices to a device inventory; (iii) automatically generating a trend line graph to display a configuration changes of the plurality of application specific objects over a period of time; (iv) defining a logic for searching and fetching a plurality of rules and a plurality of policies across the plurality of application devices; (v) defining a new security policy to the plurality of application specific objects; and (vi) implementing the new security policy to modify a plurality of user details and a rule and a policy information associated with the plurality of application specific objects.

20 Claims, 47 Drawing Sheets

| Name | Policy | IP Address | Vendor | Platform | Credentials Type | Access Type | Status | Rule |
|---|---|---|---|---|---|---|---|---|
| 192.168.12.14 | FWLandingPage | 192.168.12.14 | Cisco | ASA | Manual Entry | API | ● Available | 0 |
| 192.168.15.14 | KeywordSearch | 192.168.15.14 | Cisco | ASA | Manual Entry | API | ● Available | 0 |
| 192.168.12.56 | CiscoPolicy1 | 192.168.12.56 | Cisco | ASA | Manual Entry | API | ● Available | 0 |
| 192.168.12.14 | ExportTest | 192.168.12.14 | Juniper | SRX | Manual Entry | API | ● Available | 1 |
| 192.168.89.14 | Policy15 | 192.168.89.14 | PaloAlto | Firewall | Manual Entry | API | ● Available | 0 |
| 192.168.12.54 | Auto | 192.168.12.54 | Cisco | ASA | Manual Entry | API | ● Managed | 0 |
| 192.168.98.52 | ColumnTest | 192.168.98.52 | PaloAlto | ASA | Manual Entry | API | ● Managed | 0 |
| 192.168.96.14 | AdTest | 192.168.96.14 | Juniper | SRX | Manual Entry | API | ● Managed | 250 |
| AdTest | ExportTest | 192.168.15.14 | PaloAlto | Firewall | Manual Entry | API | ● Managed | 260 |
| 192.168.18.14 | Policy50 | 192.168.18.14 | Cisco | ASA | Manual Entry | API | ● UnManaged | 0 |
| 192.168.20.14 | KeywordSearch | 192.168.20.14 | PaloAlto | Firewall | Manual Entry | API | ● UnManaged | 0 |
| ExportTest | Auto | 192.168.12.64 | Juniper | SRX | Manual Entry | API | ● UnManaged | 0 |
| 192.168.12.29 | AdTest | 192.168.12.29 | PaloAlto | Firewall | Manual Entry | API | ● UnManaged | 1 |
| 192.168.52.14 | CiscoPolicy6 | 192.168.52.14 | Cisco | ASA | Manual Entry | API | ● UnManaged | 0 |
| 192.168.72.24 | FWLandingPage | 192.168.72.24 | PaloAlto | Firewall | Manual Entry | API | ● UnManaged | 0 |

Device > Firewall > Add

Thu Nov 12 2015 17:24:33 GMT+0530 (IST)

Device details

* Device vendor: Cisco
  platform: ASA
* Device name: Ban_7634
* IP address: 10.25.36.74
  Data center:
* Policy name: BAN_PROD
* Credential type: Manual_entry
* Access type: SSH
* Username: Admin
* Password: ********
* privilege password: ********
  Secondary / Alternate device: ⦿ Auto detect  ○ Manual entry

[Save]  [Cancel]

FIG. 4A

| Device details | |
|---|---|
| * Device vendor | Cisco |
| Platform | ASA |
| * Device name | Ban_7634 |
| * IP address | 10.25.36.74 |
| Data center | NYC |
| * Policy name | BAN_PROD |
| * Credential type | Manual_entry |
| * Access type | SSH |
| * Username | Admin |
| * Password | ******** |
| * Privilege password | ******** |
| Secondary / Alternate device | ○ Auto detect  ● Manual entry |
| * Device name | NJ32FW3 |
| * IP address | 192.168.63.2 |

Device :: Proxy > Modify

Device details

Vendor: [squid]

General Information

| | | | |
|---|---|---|---|
| CI name | | * Device name | Proxy40.3.4 |
| * IP Address | 192.168.43.6 | * Port | 22 |
| Config path | | * policy name | ProxyPolicy 1 |
| Data center | | | |

Credentials

| | | | |
|---|---|---|---|
| * Credential type | Manual entry | * User name | root |
| * Access type | SSH | | |
| * Password | ******** | | |

Secondary device Information

Secondary / Failover ▇

| | | | |
|---|---|---|---|
| * Device name | | CI name | |
| * Port | SSH | * IP address | |
| | ******** | Config path | |

Control center > Search results

Search Keys
ADC
Certificate
DNS
Firewall
WAF
Proxy

Operators AND OR destination            destinationip              mode
policy                 protocol                    service
source                 sourceip                    state ADC    Certificate    DNS    Firewall    WAF    Proxy

| Policy name | Source filter | Mapping Point | Content Security Policy | Thread protection | Description | Protocol |
|---|---|---|---|---|---|---|
| Testme | 1.1.1.10/32 | | XML Profile | File Blocking | sds | |
| Testme_11 | 1.1.1.10/32 | | XML Profile | File Blocking | sds | |
| Testme_12 | 1.1.1.10/32 | | XML Profile | File Blocking | sds | |
| Testme_13 | 1.1.1.10/32 | | XML Profile | File Blocking | sds | |
| Testme_14 | 1.1.1.10/32 | | XML Profile | File Blocking | sds | |

| Control Center > Search Results : * | | | |
|---|---|---|---|
| Policy Name | TestMe | Test00001-SDK | 2017TestUnit |
| | Partition :P2 | Partition :Common | Partition :Common |
| | Signature Staging :Enabled | Signature Staging :Enabled | Signature Staging :Enabled |
| | Enforcement Mode :Transparent | Enforcement Mode :Blocking | Enforcement Mode :Blocking |
| | Enforcement Readiness Period :? | Enforcement Readiness Period :? | Enforcement Readiness Period :? |
| Protocol | Telnet | Telnet | Telnet |
| | TCP | TCP | TCP |
| Content Security Profile | | | |
| Description | | | This Policy is a Scanner Baseline Policy |
| Target Device | IP : 192.168.55.248, Name : dev55.248 | IP : 192.168.55.248, Name : dev55.248 | IP : 192.168.55.248, Name : dev55.248 |
| Enforcement Mode | Transparent | Blocking | Blocking |
| Vendor | F5 | F5 | F5 |

FIG. 30C

SYSTEM FOR MONITORING AND MANAGING FIREWALL DEVICES AND FIREWALL MANAGEMENT PLATFORMS

TECHNICAL FIELD

The embodiments discussed herein generally relate to managing network and application security device, and more particularly, relate to a system and method for monitoring and reconfiguring of network firewall devices and security devices at single administration points. Further, embodiments of the invention relate to management of multi-platform firewalls using services, such as VPN, Authentication Servers, and the like.

DESCRIPTION OF THE RELATED ART

With the explosive growth of the Internet, computer users are now able to access many valuable sources of information, and, at the same time, users are now exposed to many new perils. Such perils include downloading of destructive computer viruses and sophisticated third-party, network attacks. In response to dangers lurking from "outside" computer networks, firewalls and other types of security devices have emerged as a preferred type of computer network security system.

Generally, a firewall is a security mechanism for controlling access between a private, trusted network and an untrusted outside network (which might be the public Internet or some other part of the corporate network within the intranet). Firewalls typically provide from one to three levels of security: packet filtering, circuit-level gateways, and application-level gateways. Firewalls are not all created alike for they often differ greatly in their architecture, the types platforms they run upon, their security capabilities, and their ability to support mixed protocol networks. For example, the mixed protocol network: TCP/IP is not, contrary to popular belief, the only network protocol still left standing millions of IPX clients still need to get secure access to the Internet without going through the dreaded "forklift upgrade" to a whole new protocol stack.

Accordingly, there is a need for a system and method for managing network and application security device across data centers.

SUMMARY OF EMBODIMENTS OF THE INVENTION

In view of the foregoing, an embodiment herein provides a security policy management system for monitoring and managing security policies of a plurality of application specific objects of a plurality of application devices across a plurality of datacenters by defining a security policy. The security policy management system includes a memory and a processor. The memory stores a database. The processor configured to (a) display the plurality of application devices that are managed in the security policy management system in a single pane view. The plurality of application devices are displayed along with abstracted rule base of the plurality of application devices. The abstracted rule base is designed and configured to display configurations of the plurality of application devices of different vendors in a unified manner; (b) add the plurality of application devices to a device inventory; (c) automatically generate a trend line graph to display outages and configuration changes of the plurality of application specific objects of the plurality of application devices over a period of time when at least one of the plurality of application specific objects of at least one of the plurality of application devices is modified or changed by continuously monitoring the plurality of application specific objects; (d) defining a logic to search and fetch a plurality of rules and a plurality of policies across the plurality of application devices by applying a logic over networks that is by matching and overlapping a IP address ranges of the plurality of application devices that is obtained from a user as a search query. The logic over networks includes identifying a starting range and an ending range of the IP address and analyzing the plurality of application specific objects, the plurality of rules and the plurality of policies that matches or overlaps between the starting range and the ending range of the IP address; (e) defining a new security policy to the plurality of rules, the plurality of policies and the plurality of application specific objects to provide access to a new role; and (f) implementing the new security policy to modify a plurality of user details and a rule and a policy information associated with the plurality of rules and policies and the plurality of application specific objects of the plurality of application devices for managing the security policy of the plurality of application specific objects of the plurality of application devices. The rules include at least one of (a) one or more security rules or (b) one or more NAT rules. The one or more NAT rules are re-ordered as per application device NAT lookup logic when modifying any of a NAT rule.

In one embodiment, the processor is configured to (a) assign a role to the plurality of application specific objects of the plurality of application devices that are stored in the device inventory with security policies as read or write access; (b) assign a plurality of roles to the plurality of application specific objects of the plurality of application devices; and (c) provide privileges over access of functions of the plurality of application devices managed in the security policy management system and the plurality of application specific objects that are allowed to manage.

In another embodiment, the processor is configured to (a) display a plurality of rule and a plurality of policy information of the plurality of application devices on a control center page under a firewall tab, a proxy device tab and a WAF device tab; and (b) enable the plurality of users to add metadata to each rule of the plurality of application devices under the firewall tab, the proxy device tab and the WAF device tab. In yet another embodiment, the metadata includes additional data or external files related to the rule.

In yet another embodiment, the plurality of application devices includes at least one of a plurality of firewall devices, a plurality of proxy devices or a plurality of web application firewall devices. In yet another embodiment, the plurality of application specific objects includes at least one of the plurality of rules, the plurality of polices or objects of the plurality of rules includes at least one of IP address, network objects or UTM profiles.

In yet another embodiment, the processor is configured to (i) automatically detect a high availability peer device which associated to a particular policy. The high availability peer device is detected using an IP address of an application device; and (ii) add a secondary application device by manually entering the secondary application device details.

In yet another embodiment, the processor is configured to (i) select a user role to modify the role of the user through an account management, (ii) select at least one device that is assigned for the user under the access control tab, (iii) select appropriate access to the role for the selected object, and (iv) move the selected object of the plurality of application devices from an available list to assigned list.

In yet another embodiment, the processor is configured to (i) search for the plurality of rules, the plurality of policies and the plurality of objects based on IP objects and network objects that are obtained as the search query. In yet another embodiment, the search query includes at least one of (i) state of a rule, (ii) a device name associated to a policy, (iii) action associated to a policy or a rule base managed within the plurality of application devices, (iv) a policy name, (v) a source object name associated to the policy or the rule base, (vi) a destination object name associated to the policy or the rule base, (vii) IP addresses includes an individual IP address, an IP address with subnet mask, and object range that are associated to the policy or the rule base, (viii) a destination IP addresses includes an individual IP address, an IP address with subnet mask, and object range that are associated to the policy or the rule base, (ix) a service object name that associated to the rule and (x) an application or an object name that associated to the policy or the rule base.

In yet another embodiment, the security policy management system (a) defines a shared object and deploys the shared object in the plurality of application devices and (b) provides ability to re-use an object by sharing across vendors of the plurality of application devices by abstracting information of vendors.

In yet another embodiment, the security policy management system migrate rules from one application device to another application device.

In yet another embodiment, the security policy management system provides the NAT rules that are applicable for the security rules when selecting the security rules specific to an application device.

In another aspect, a computer implemented method for monitoring and managing a security policy of a plurality of application specific objects of a plurality of application devices across a plurality of datacenters by defining a security policy are provides. The computer implemented method includes following steps: (i) displaying the plurality of application devices managed in a security policy management system in a single pane view. The plurality of application devices are displayed along with abstracted rule base of the plurality of application devices. The abstracted rule base is designed and configured to display configurations of the plurality of application devices of different vendors in a unified manner; (ii) adding new application devices to a device inventory. The newly added application devices are displayed and managed under the single pane view; (iii) automatically generating a trend line graph to display a configuration changes of the plurality of application specific objects of the plurality of application devices over a period of time when at least one of the plurality of application specific objects of at least one of the plurality of application devices is modified or changed by continuously monitoring the plurality of application specific objects; (iv) defining a logic for searching and fetching a plurality of rules and a plurality of policies across the plurality of application devices by applying a logic over networks that is by matching and overlapping a IP address of the devices, address ranges and port numbers based on a search query obtained from a user. The logic over networks includes identifying a starting range and an ending range of the IP address and analyzing the plurality of application specific objects, the plurality of rules and the plurality of policies that matches or overlaps between the starting range and the ending range of the IP address; (v) defining a new security policy to the plurality of rules, the plurality of policies and the plurality of application specific objects to provide access to with read access to a new role; and (vi) implementing the new security policy to modify a plurality of user details and a rule and a policy information associated with the plurality of rules and policies and the plurality of application specific objects of the plurality of application devices for managing the security policy of the plurality of application specific objects of the plurality of application devices. The rules includes at least one of (a) one or more security rules or (b) one or more NAT rules. The one or more NAT rules are re-ordered as per an application device NAT lookup logic when modifying any of a NAT rule.

In one embodiment, the method further includes the step of tagging one or more rules of the plurality of application devices to an application ID to monitor the plurality of application devices. In another embodiment, any of a rule from the one or more rules is retrieved by searching the corresponding application ID.

In yet another embodiment, the method further includes the steps of (i) assign a role to the plurality of application specific objects of the plurality of application devices that are stored in the device inventory with security policies as read or write access; (ii) assign a plurality of roles to the plurality of application specific objects of the plurality of application devices; and (iii) provide privileges over access of functions of the plurality of application devices managed in the security policy management system and the plurality of application specific objects that are allowed to manage.

In yet another embodiment, the method further includes the steps of (i) automatically detecting a high availability peer device which associated to a particular policy. In yet another embodiment, the high availability peer device is detected using an IP address of an application device; and (ii) obtaining details about a secondary application device that is manually entered by a user.

In yet another embodiment, the method further includes the step of searching for the plurality of rules, the plurality of policies and the plurality of objects based on IP objects and network objects that are obtained as the search query. In yet another embodiment, the search query includes at least one of (i) state of a rule, (ii) a device name associated to a policy, (iii) action associated to a policy or a rule base managed within the plurality of application devices, (iv) a policy name, (v) a source object name associated to the policy or the rule base, (vi) a destination object name associated to the policy or the rule base, (vii) IP addresses includes an individual IP address, an IP address with subnet mask, and object range that are associated to the policy or the rule base, (viii) a destination IP addresses includes an individual IP address, an IP address with subnet mask, and object range that are associated to the policy or the rule base, (ix) a service object name that associated to the rule and (x) an application or an object name that associated to the policy or the rule base.

In yet another embodiment, the method further includes the steps of (a) providing the NAT rules that are applicable for the security rules when selecting the security rules specific to the application device; and (b) migrating rules from one application device to another application device.

In yet another embodiment, the method further includes the step of comparing web application firewall (WAF) policies to determine changes in values and attributes of the web application firewall policies. In yet another embodiment, the comparison (a) enables validation of the web application firewall policies before and after change and (b) enables the plurality of users to review changes the changes in the web application firewall policies before applying a web application firewall policy to a web application firewall device.

In yet another aspect, one or more non-transitory computer readable storage mediums storing one or more sequences of instructions, which when executed by one or more processors, causes monitoring and managing a security policy of a plurality of application specific objects of a plurality of application devices across a plurality of datacenters by defining a security policy, by performing following steps: (i) displaying the plurality of application devices managed in a security policy management system in a single pane view. The plurality of application devices are displayed along with abstracted rule base of the plurality of application devices. The abstracted rule base is designed and configured to display configurations of the plurality of application devices of different vendors in a unified manner; (ii) adding new application devices to a device inventory. The newly added application devices are displayed and managed under the single pane view; (iii) automatically generating a trend line graph to display outages and configuration changes of the plurality of application specific objects of the plurality of application devices over a period of time when at least one of the plurality of application specific objects of at least one of the plurality of application devices is modified or changed by continuously monitoring the plurality of application specific objects; (iv) defining a logic to search and fetch a plurality of rules and a plurality of policies across the plurality of application devices by applying a logic over networks that is by matching and overlapping a IP address of the devices, address ranges and port numbers based on a search query obtained from a user. The logic over networks includes identifying a starting range and an ending range of the IP address and analyzing the plurality of application specific objects, the plurality of rules and the plurality of policies that matches or overlaps between the starting range and the ending range of the IP address; (v) defining a new security policy to the plurality of rules, the plurality of policies and the plurality of application specific objects to provide access to a new role; and (iv) implementing the new security policy to modify a plurality of user details and a rule and a policy information associated with the plurality of rules and policies and the plurality of application specific objects of the plurality of application devices for managing the security policy of the plurality of application specific objects of the plurality of application devices. The rules include at least one of (a) one or more security rules or (b) one or more NAT rules. The one or more NAT rules are re-ordered as per an application device NAT lookup logic when modifying any of a NAT rule.

In one embodiment, the method further includes the steps of (i) assigning a role to the plurality of application specific objects of the plurality of application devices that are stored in the device inventory with security policies as read or write access; (ii) assigning a plurality of roles to the plurality of application specific objects of the plurality of application devices; and (iii) providing privileges over access of functions of the plurality of application devices managed in the security policy management system and the plurality of application specific objects that are allowed to manage.

In another embodiment, the method further includes the steps of (i) automatically detecting a high availability peer device which associated to a particular policy. The high availability peer device is detected using an IP address of an application device; (ii) obtaining details about a secondary application device that is manually entered by a user; (iii) providing the NAT rules that are applicable for the security rules when selecting the security rules specific to the application device; and (iv) migrating rules from one application device to another application device.

BRIEF DESCRIPTION OF THE DRAWINGS

The embodiments herein will be better understood from the following detailed description with reference to the drawings, in which:

FIG. 3 illustrates a user interface view of a device management firewall module according to an embodiment herein;

FIGS. 4A-4C illustrates user interface views of a firewall device adding module according to an embodiment herein;

FIG. 8 illustrates a user interface view of a firewall module that displays security rules according to an embodiment herein;

FIG. 10 illustrates a user interface view of the firewall module that displays NAT rules according to an embodiment herein;

FIG. 17 illustrates a user interface view of a rule/policy modification module of FIG. 2 according to an embodiment herein;

FIG. 18 illustrates a user interface view of a role enabling module according to an embodiment herein;

FIGS. 19A and 19B illustrate user interface views of a device inventory tab/a control center tab of one or more proxy devices according to an embodiment herein;

FIGS. 20A and 20B illustrate user interface views of a proxy device adding module according to an embodiment herein;

FIG. 22 illustrates a user interface view of an access control module that is operated under a role tab according to an embodiment herein;

FIGS. 24A and 24B illustrate user interface views of a web application firewall (WAF) device management module according to an embodiment herein;

FIGS. 25A and 25B illustrate user interface views of a web application firewall (WAF) device adding module according to an embodiment herein;

FIGS. 26A and 26B illustrate user interface views of a web application firewall (WAF) device search module according to an embodiment herein;

FIG. 28 illustrates a user interface view of a firewall module according to an embodiment herein;

FIGS. 29A and 29B illustrates user interface views depicts adding metadata to a rule according to an embodiment herein;

FIGS. 30A-30C illustrates user interface views depicts WAF Policy comparison according to an embodiment herein;

DETAILED DESCRIPTION OF PREFERRED EMBODIMENTS

Figure 1:
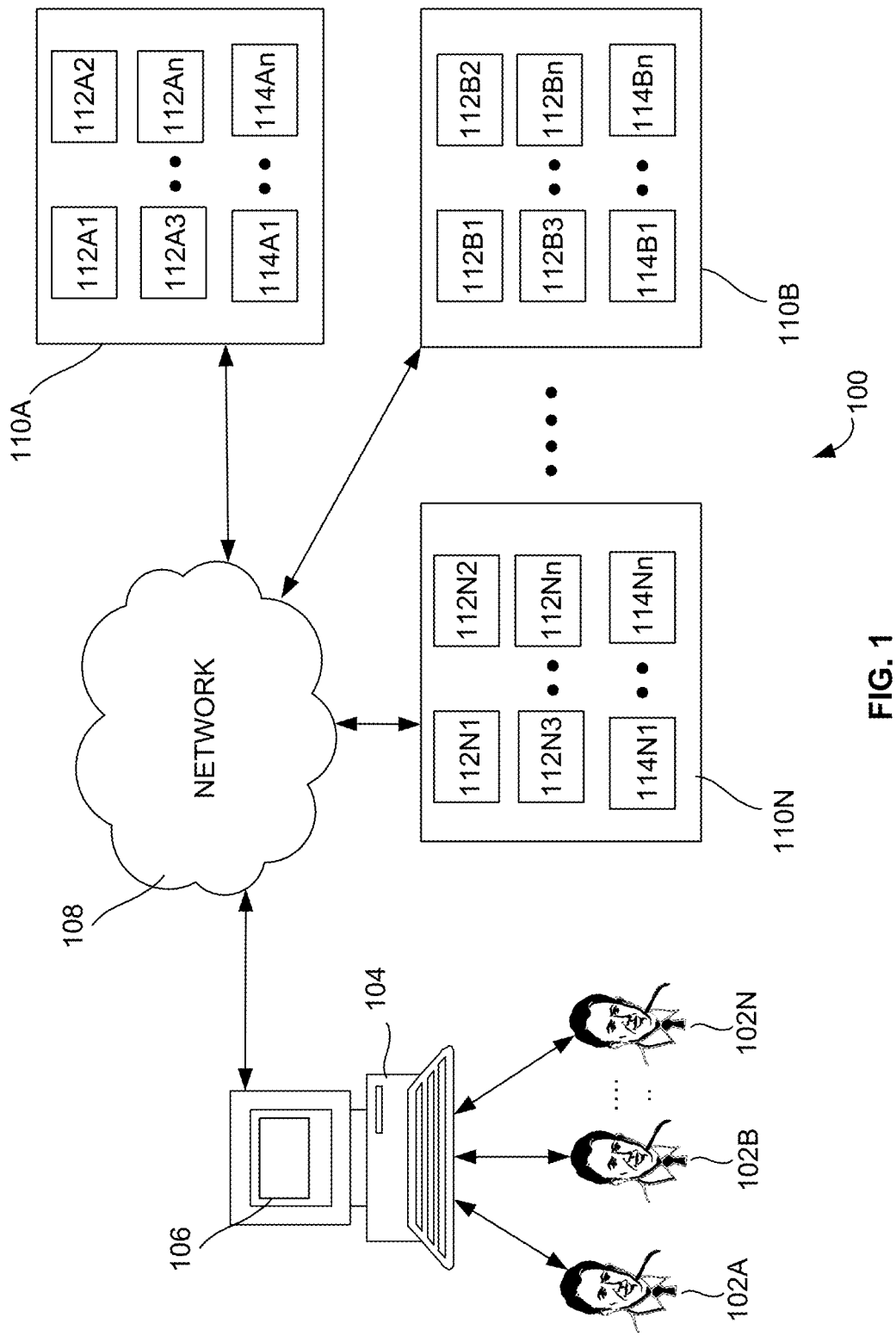
FIG. 1 illustrates a system view of one or more user's 102A-N communicating with a user system for monitoring and managing one or more Application Specific Networking Components (ASNC) using a security policy management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide an application management system that monitors and manages security policies of one or more application specific objects (e.g. one or more rules and one or more policies) by tagging the one or more application specific objects to an application ID. The one or more application specific objects may include one or more rules of firewall device, a certificate, a domain name system (DNS) record, objects of an application delivery controller (ADC) device, a firewall device, an ADC device, proxy devices, objects of the proxy devices, Web Application Firewall (WAF), objects of WAF, a network router, a network switch, and servers, etc. The application management system provides an end-to-end visibility of the one or more application specific objects managed within an application ID (e.g. AppViewX ID), by providing an option to a user to (a) view the current appropriate status of the one or more application specific objects that are managed, (b) compare the configurations of the one or more application specific objects over a period of time, and provides an option the user to restore to a pervious configuration of the one or more application specific objects, (c) view a list of work order changes occurred for the one or more application specific objects, and (d) generate a trend line graph for one or more application specific objects that depicts the outages and changes occurred on the one or more application specific objects over a period of time. The one or more application specific objects are application specific networking components. Also the need in enterprise IT infrastructure for vendor agnostic way of managing configuration (view, add, modify, delete objects and migrate configurations), multi firewall and Multiple devices from L2-L7 across security management platforms and L1-L7 capable security devices with granular and smart search capability to retrieve information and automate tasks using application perspective, there by simplifying the operations by time and effort, with logs and secured with role-based access restrictions that all providing an application perspective for management. Referring now to the drawings, and more particularly to FIGS. 1 through 33, where similar reference characters denote corresponding features consistently throughout the figures, there are shown preferred embodiments.

FIG. 1 illustrates a system view 100 of one or more user's 102A-N communicating with a user system 104 for monitoring and managing one or more Application Specific Networking Components (ASNC) 112A1-Nn (e.g., one or more firewall devices, one or more proxy devices and one or more Web Application Firewall (WAF) devices) using a security policy management system 106 according to an embodiment herein. The security policy management system 106 provides a user interface to the one or more users 102A-N to monitor and manage the one or more application devices 112A1-Nn that are an application specific with L2-L7 management across an enterprise/organization within a network. The one or more application devices 112A1 include at least one of one or more firewall devices, one or more proxy devices or one or more Web Application Firewall (WAF) devices. The security policy management system allows the one or more users 102A-N to vendor agnostic way of managing configuration (view, add, modify, delete objects and migrate configurations), multi firewall and Multiple devices from L2-L7 across security management platforms and L1-L7 capable security devices with granular and smart search capability to retrieve information (e.g. rules, policies and network objects) and automate tasks using application perspective. The security policy management system 106 monitors and manages the one or more application devices 112A1-Nn/one or more rules of the one or more application devices 112A1-Nn by tagging the one or more application devices 112A1-Nn/one or more rules to an application ID (e.g., an AppViewX ID). In one embodiment, any of a firewall device/rule is identified and retrieved by searching the application ID that is corresponding to the firewall device/rule. The security policy management system 106 provides an end-to-end visibility of the one or more application devices 112A1-Nn managed within the application ID, by providing an option to the one or more users 102A-N to view current status of the one or more application devices 112A1-Nn. In an embodiment, the security policy management system 106 migrate rules from one firewall to another. In one embodiment, the rules are NAT rules. In one embodiment, the security policy management system 106 also manages management platforms (e.g. panorama) for Palo Alto Network's Firewall devices and etc. In another embodiment, the security policy management system 106 also manages firewall management servers of vendor-Agnostic FW Management tools, Tuffin's Orchestration Suite, Firemon's Secure Firewall Management, and AlgoSec's Security Management Solution. In one embodiment, the vendor-agnostic firewall management tool includes Checkpoint's SMS, MDS (Multi-Domain Management Server), FortiNet's, FortiManager. And\or Palo Alto Networks's Panorama. The security policy management system 106 further provides role based access control (RBAC) for the one or more users 102A-N to view a policy and a rule base information of the one or more application devices 112A1-Nn managed within the application ID. Assigning role based access control through the work flow authorized functions that allow the one or more users 102A-N to access the one or more application devices 112A1-Nn to perform work order approval and implementation. The security policy management system 106 allows the one or more users 102A-N (e.g. device vendor) to add modify, delete device & platforms one or more end firewall devices within a network/enterprises/organization into a device inventory. In an embodiment, the firewall devices for an application is granularly identified and accessed by a user 102A to perform above mentioned functions. In one embodiment, the security policy management system 106 allows the one or more users 102A-N to add management servers and to fetch configurations, HA status, version etc. from the firewall devices and the management servers. The one or more data centers 110A-N includes one or more internet protocol (IP) servers 114A1-Nn. In one embodiment, the one or more IP servers 114A1-Nn may be called as domain server, or non-domain servers. In another embodiment, the one or more users 102A-N is a network administrator and/or a vendor.

The security policy management system 106 allows the one or more users 102A-N to make changes on security rules across different vendor firewall devices. The security policy management system 106 extracts NAT rules from the one or more application devices 112A1-Nn and parsed NAT rules and displayed to the one or more users 102A-N. The security policy management system 106 provides only the NAT rules that are applicable for the security rules when selecting the security rules of the specific vendor devices or a firewall device. The security policy management system 106 provides the applicable NAT rules for a selected security rule. The security policy management system 106 allows the one or more users 102A-N to re-order the NAT rules as per the firewall vendor's (device vendor from which the security rules are fetched) NAT lookup logic. In one embodiment, the NAT lookup logic is selected as per their packet flow documentation. The firewall process traffic is different for each firewall vendors. In an embodiment, where an engineer is into troubleshooting and wants to filter out the configurations that are related to the firewall devices that are in the traffic, the security policy management system 106 shows the configurations and its sub-elements in the order (NAT rules ordered based on the types, which are looked up in the same way by the firewall vendor during processing the traffic) to the engineer involved in troubleshooting over a specific vendor of firewall. The security policy management system 106 (a) define a shared object and deploy the shared object in different vendor firewall devices, (b) provide ability to re-use an object by sharing across other vendor by abstracting their details. The security policy management system 106 allows for adding, modifying, deleting or updating the configurations of the one or more application devices 112A1-Nn. In one embodiment, the security policy management system 106 provides detailed view of the configurations of the one or more application devices 112A1-Nn.

The security policy management system 106 generates the one or more workflows for performing one or more operations/actions (add/modify/delete the firewall devices and view/change/update/create the configurations) for managing the one or more application devices 112A1-Nn. In one embodiment, the security policy management system 106 allows the one or more users 102A-N to generate the workflows for the one or more operations/actions. The custom workflows are configurable by users using Visual workflow.

Figure 2:
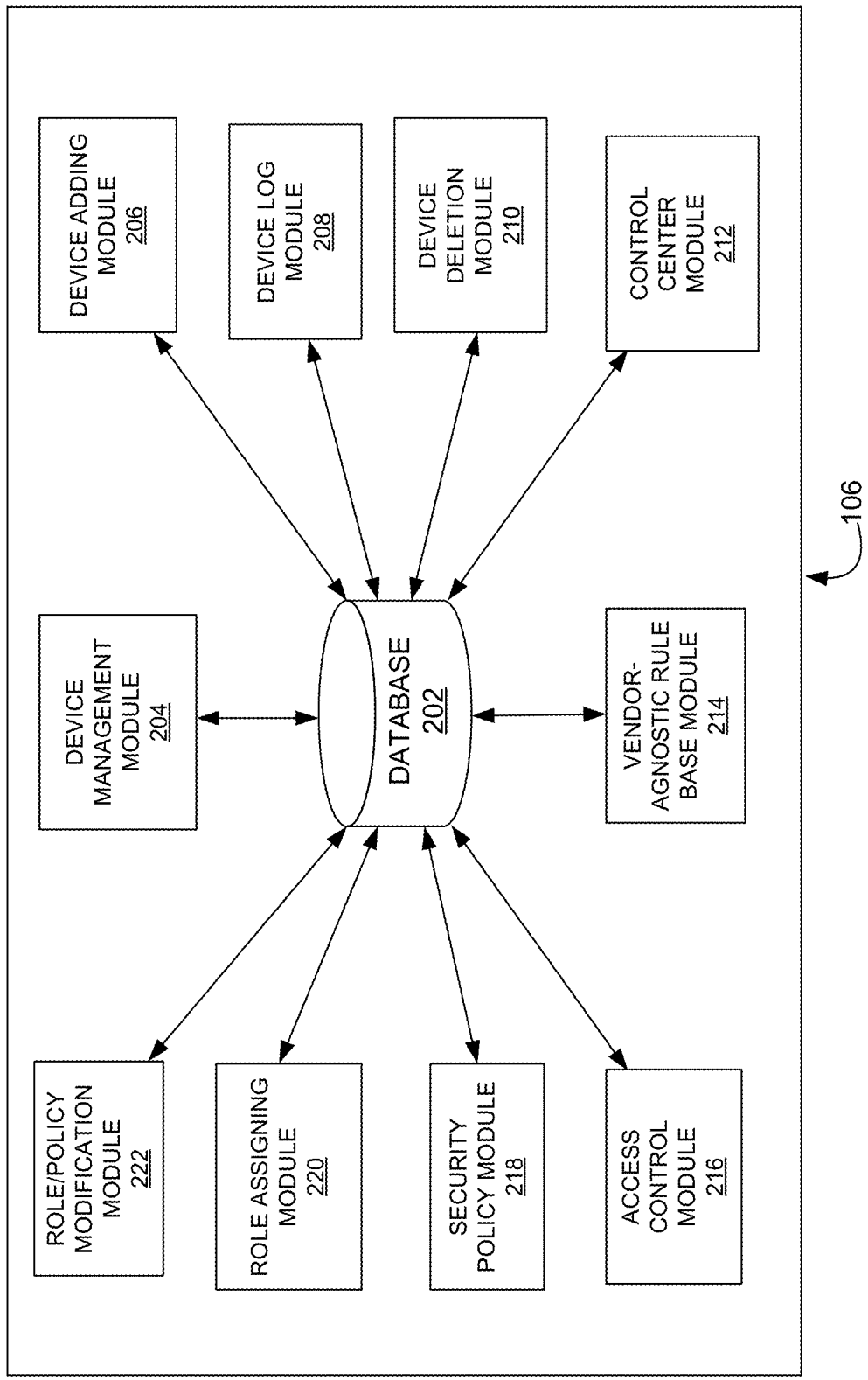
FIG. 2 illustrates an exploded view of the security policy management system of FIG. 1 according to an embodiment herein.

FIG. 2 illustrates an exploded view of the security policy management system 106 of FIG. 1 according to an embodiment herein. The security policy management system 106 includes a database 202, a device management module 204, a device adding module 206, a device log module 208, a device deletion module 210, a control center module 212, a vendor-agnostic rule base module 214, an access control module 216, a security policy module 218, a role assigning module 220, and a rule/policy modification module 222. The device management module 204 displays configurations of the one or more application devices 112A1-Nn (e.g. firewall devices, proxy devices and WAF devices) managed in an enterprise/organization under a firewall tab, a proxy tab and a WAF tab in a single pane view. The device management module 204 provides a search option to the one or more users 102A-N to search for the one or more application devices 112A1-Nn by entering a keyword. The device adding module 206 allows the one or more users 102A-N to add one or more application devices 112A1-Nn to a device inventory. The device log module 208 displays details (e.g. logs) about a newly added device and other events (e.g. config fetch, device modification, and/or device deletion) can be explained where logs are captured. The device deletion module 210 allows the one or more users 102A-N to delete the one or more application devices 112A1-Nn form the device inventory.

The control center module 212 display rules (e.g. security rules and NAT rules) and policy information of the one or more application devices 112A1-Nn on a control center page under a firewall tab, a proxy device tab and a WAF tab. The control center module 212 manages one or more devices with abstracted rule base in a single pane management window. In an embodiment, the abstracted rule base is a generic rule base which is designed and constructed/configured to show configurations of the one or more application devices 112A1-Nn of different vendors in a unified manner, which helps the one or more users 102A-N to view configurations simpler, rather than showing vendor specific view (which is a pain point to users in the industry), where the abstracted rule base requires time to adapt or analyze configuration from vendor perspective. The control center module 212 enables the one or more users 102A-N to view and manage the configuration of one or more application devices 112A1-Nn, and multi firewall devices and multiple firewall devices from L2-L7 not restricted to firewall with an application perspective.

The control center module 212 includes a vendor agnostic/generic firewall rule base view for modules (e.g. security/access policy, NAT rules etc.,) which in-turn displays the policies from multi-vendor devices. The access control module 216 assigns a role to the one or more users 102A-N to access a list of policies with read and read/write permission. In one embodiment, the access control module 216 assigns a role to the one or more users 102A-N to access the one or more application devices 112A1-Nn. In another embodiment, the role is assigned to the one or more users 102A-N through authorized functions menu that allows the one or more users 102A-N to perform specific actions in the one or more application devices 112A1-Nn. In another embodiment, the access control module 216 assigns the role to the one or more application devices 112A1-Nn with read access and/or read and writes access. The access control module 216 allows the one or more users 102A-N to manage the rules (e.g. security/access rules policy, NAT rules etc.,) by navigating rule level or Object/IP level of the one or more application devices 112A1-Nn. The security policy module 218 assigns security policies with read access to the role. In one embodiment, the security policy module 218 allows a respective user of the particular role to view the security policy/policies in a control center. In one embodiment, the role assigning module 220 allows to restrict the role of the security policies that are fetched from the security device(s), security platform(s) with application perspective or group of objects. The role assigning module 220 assigns a role to the one or more users 102A-N. In one embodiment, the role assigning module 220 provides an option to assign a particular role to the one or more users 102A-N when selecting a user under the inventory tab. The rule/policy modification module 222 provides a modify option to the one or more users 102A-N to modify the user details and rule/policy details. In one embodiment, the one or more application devices 112A1 include at least one of one or more firewall devices, one or more proxy devices or one or more Web Application Firewall (WAF) devices.

FIG. 3 illustrates a user interface view 300 of a device management firewall module 204 according to an embodiment herein. The user interface view 300 of the device management firewall module 204 displays the one or more firewall devices 112A1-Nn managed in an enterprise/organization under a firewall tab. The user interface view 300 of the device management firewall module 204 displays the details as follows: (i) firewall device name, (ii) policy details about the firewall device, (iii) IP address of the firewall device, (iv) vendor name, (v) name of platform, (vi) credential type, (vii) access type, (viii) status of the one or more firewall devices 112A1-Nn, and etc. The device management firewall module 204 includes a firewall search tab 302 that provides an option to the one or more users 102A-N to search for the one or more firewall devices 112A1-Nn by entering a keyword. The keyword may be a name of the firewall device, the IP address of the firewall device, and/or vendor name etc. In another embodiment, the device management firewall module 204 displays the one or more firewall devices 112A1-Nn which are all associated with particular vendor when the one or more users 102A-N searching for the one or more firewall devices 112A1-Nn by entering the vendor name as the keyword.

Figure 4C:
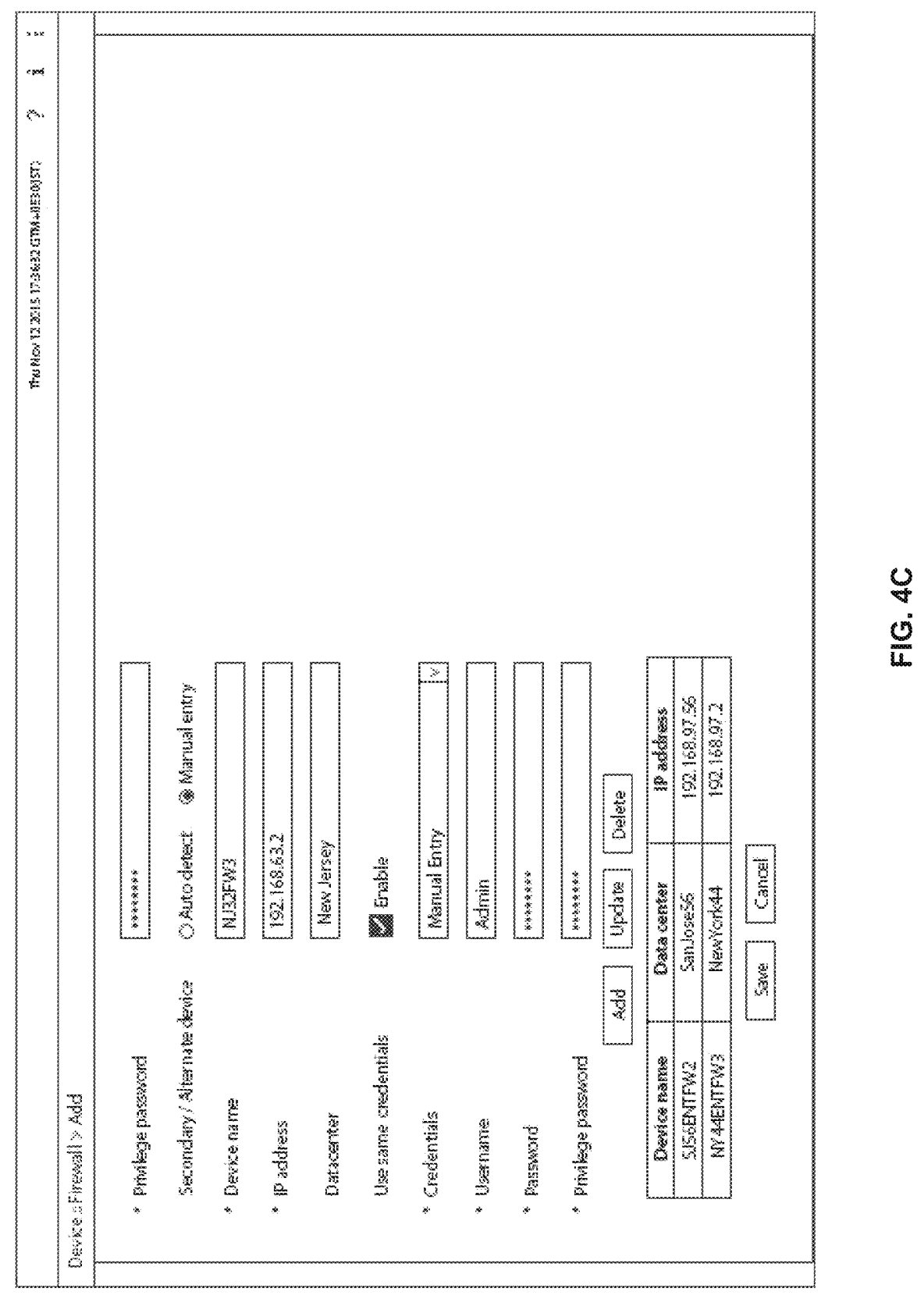

FIGS. 4A-4C illustrates user interface views of a firewall device adding module 206 according to an embodiment herein. The user interface views of the firewall device adding module 206 allows the one or more users 102A-N to add one or more firewall devices 112A1-Nn to a firewall device inventory. In one embodiment, the security policy management system 106 used to (i) view the policy and rule base (e.g. security rules, NAT rules etc.,) for the one or more firewall devices 112A1-Nn, (ii) create the Rule/Object for the one or more firewall devices 112A1-Nn, and (iii) modify the Rule/Object for the one or more firewall devices 112A1-Nn. The security policy management system 106 includes templates for firewall rule creation and delegation. The user interface views of the firewall device adding module 206 includes (i) a device vendor field to enter name of the firewall vendor, (ii) a platform field to enter platform of the vendor, (iii) a device name field to enter name of the device given by the one or more users 102A-N, (iv) an IP address field to enter IP address of the new firewall device, (v) a data center field to enter data center in which the new firewall device is stationed, (vi) a policy name field to enter name of the rule book, (vii) a credential type field, (viii) an access type field to type of communication to use for primary device (SSH/API), (ix) a username filed to enter the username that used to authenticate with the primary firewall device, (x) a password field to the password that used to authenticate with the primary firewall device, (xi) a privilege password field to enter Privilege password that used to access the rules base in primary firewall device. The user interface views of the firewall device adding module 206 further includes (i) an auto detect option, and (ii) a manual entry option. When selecting the auto detect option, the firewall device adding module 206 automatically detects for a high availability peer (e.g. a secondary device) device which associated to the particular policy. The high availability peer device is considered as the alternative firewall device. In one embodiment, each primary firewall device associate with one or more alternative firewall devices (e.g. secondary devices) with same policy details. When the primary firewall device is not available to perform the function, the secondary device may automatically activate to perform the function. In an embodiment, the alternative device monitor the function of the primary firewall device, if the primary firewall device fails to perform the alternative device automatically shares the workload of the primary firewall device. The auto detect is done using an IP address of the primary firewall device. When selecting the manual entry option, the firewall device adding module 206 provides option to enter details about a secondary device. Once the details are entered, the firewall device adding module 206 allows the one or more users 102A-N to save the new firewall device to the firewall device inventory when selecting a save option. The new firewall device removed from the firewall device inventory when selecting a cancel option. In one embodiment, the user interface views of the firewall device adding module 206 provides an option to the one or more users 102A-N to update the details in the existing one or more firewall devices 112A1-Nn, and delete the one or more firewall devices 112A1-Nn from the firewall device inventory.

Figure 5:
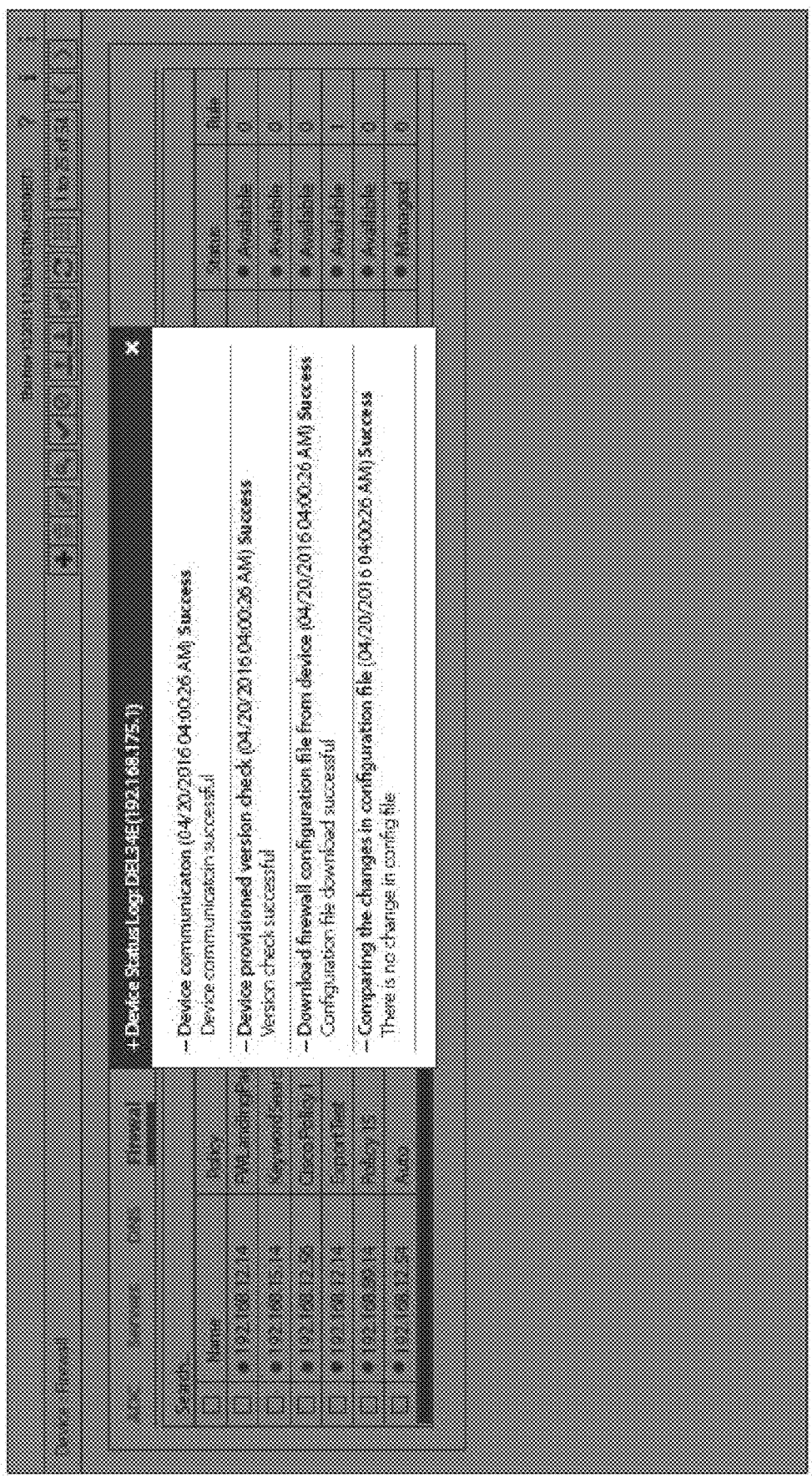
FIG. 5 illustrates a user interface view of a firewall device log module according to an embodiment herein.

FIG. 5 illustrates a user interface view of a firewall device log module 208 according to an embodiment herein. The user interface view of the firewall device log module 208 displays details (e.g. logs) about a newly added firewall device. The logs include (i) status about the firewall device communication, (ii) version of the firewall device, (iii) whether a firewall configuration file is downloaded from the firewall device, and (iv) any changes in the firewall configuration file (e.g. changes in the firewall device configuration file). The firewall device log module 208 continuously monitors one or more application specific objects of the one or more firewall devices 112A1-Nn and displays configuration changes through a trend line graph. In one embodiment, the firewall device log module 208 monitors the one or more application specific objects of the one or more firewall devices 112A1-Nn based on demand (e.g. checks for the configuration updates/changes, when the user 102A initiates the verification process). In an embodiment, the one or more application specific objects includes one or more rules (e.g. security rules, NAT rules etc.), one or more policies and objects of the one or more rules which refers to address & network Objects, UTM profiles, etc.

Figure 6:
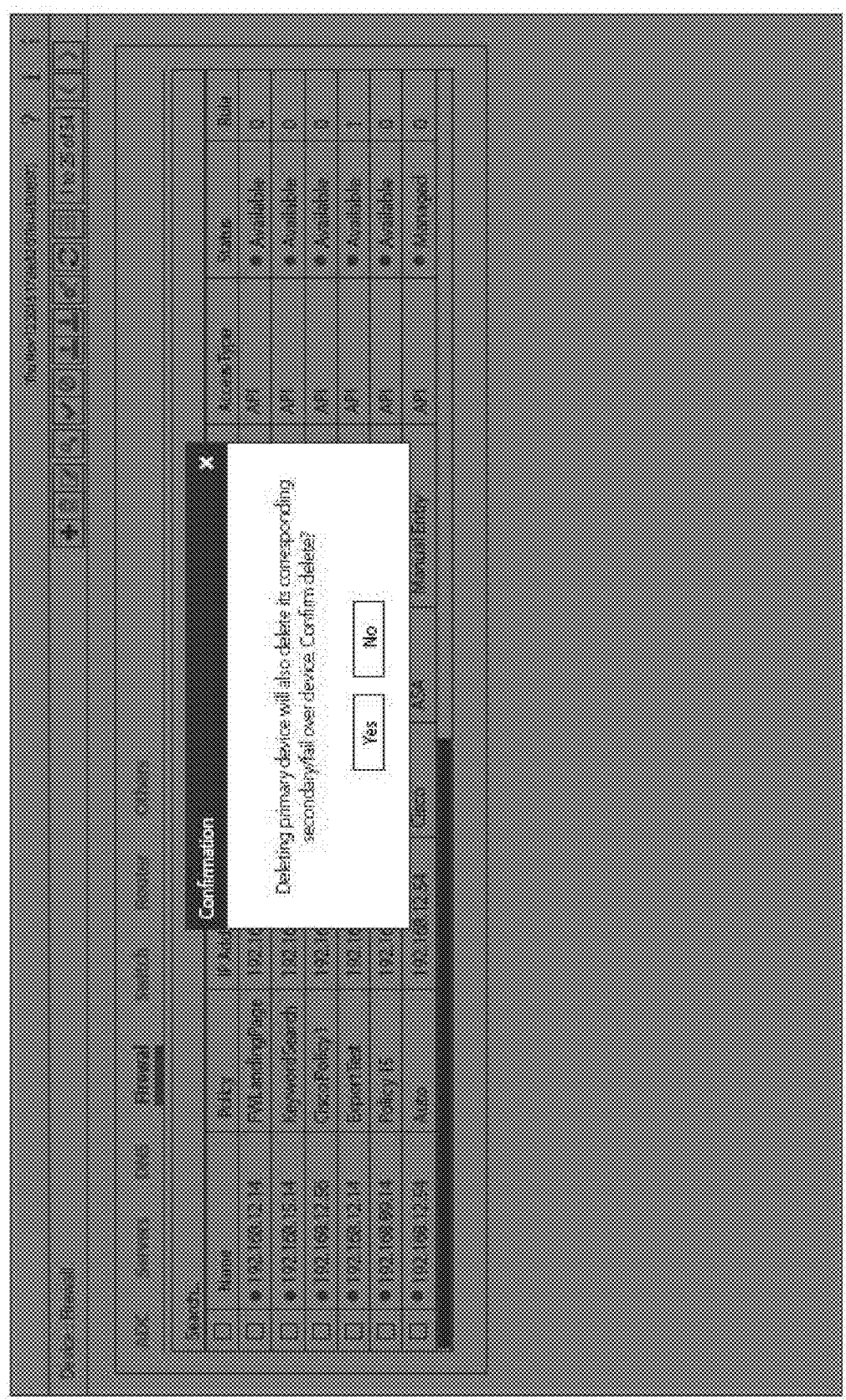
FIG. 6 illustrates a user interface view of a firewall device deletion module according to an embodiment herein.

FIG. 6 illustrates a user interface view of a firewall device deletion module 210 according to an embodiment herein.

The user interface view of the firewall device deletion module 210 allows the one or more users 102A-N to delete the one or more firewall devices 112A1-Nn form the firewall device inventory. In one embodiment, the user interface view of the firewall device deletion module 210 allows the one or more users 102A-N to select the one or more firewall devices 112A1-Nn for deletion. The user interface view of the firewall device deletion module 210 displays a pop-up window that shows a message to confirm the deletion of the one or more firewall devices 112A1-Nn (e.g. deleting primary device will also delete its corresponding secondary/failover devices. Confirm delete?). The firewall device deletion module 210 deletes the one or more firewall devices 112A1-Nn when selecting "yes" option displayed in the popup message. The one or more firewall devices 112A1-Nn deletion cancelled when selecting "no" option displayed in the popup message.

Figure 7A:
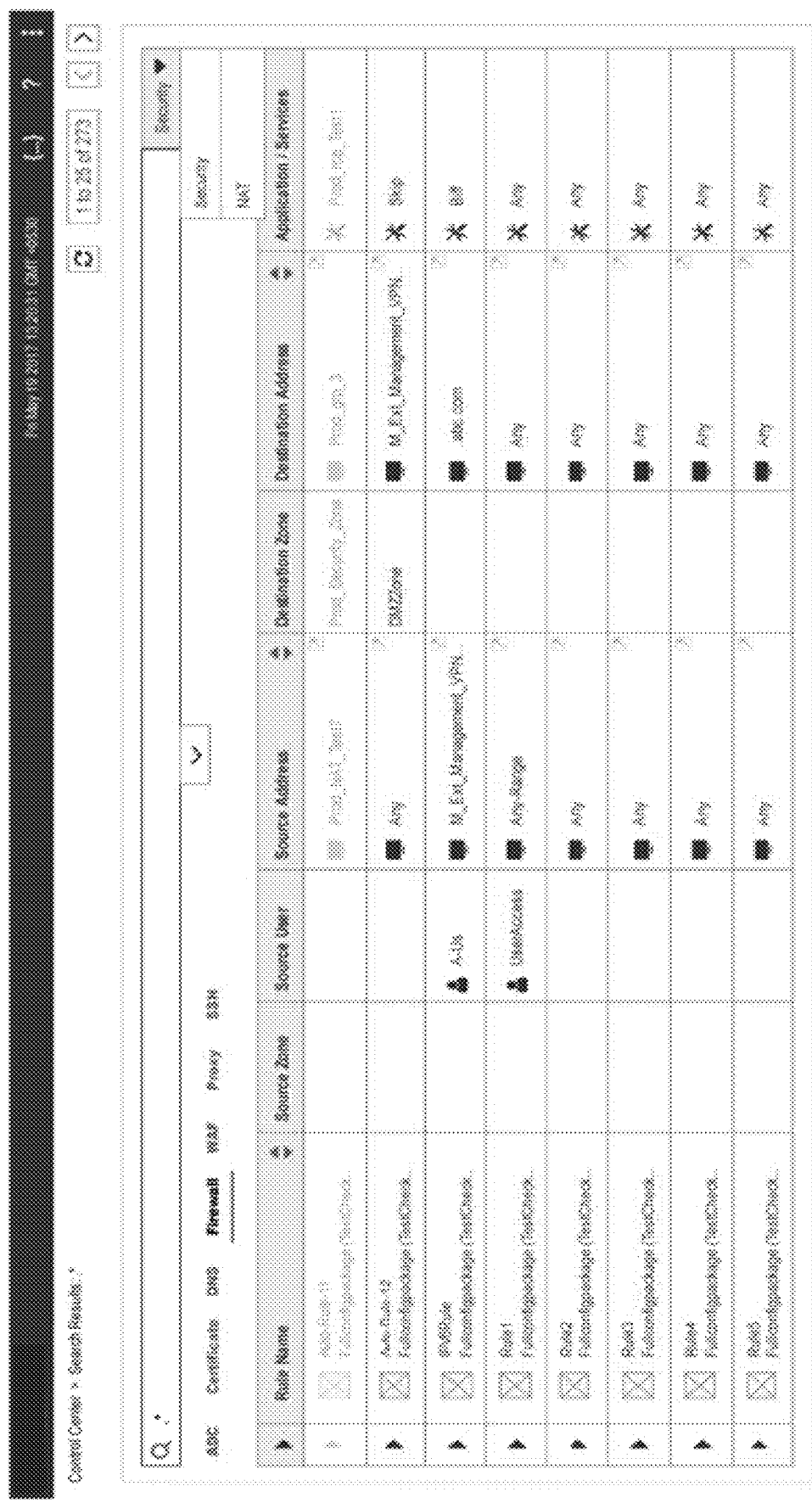
FIGS. 7A and 7B illustrate user interface views of a control center firewall module according to an embodiment herein.
Figure 7B:
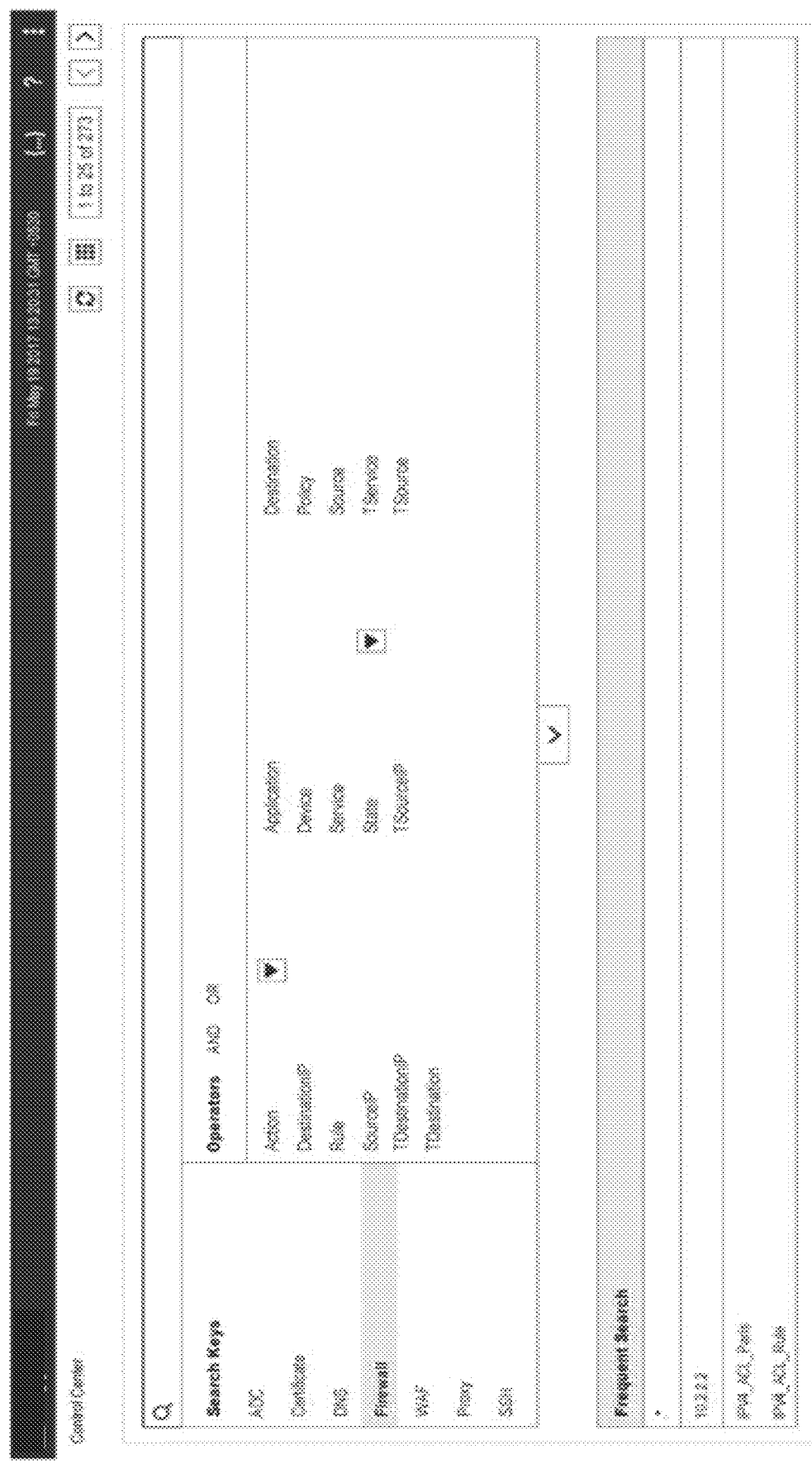

FIGS. 7A and 7B illustrate user interface views of a control center firewall module 212 according to an embodiment herein. The user interface views of the control center firewall module 212 display rules (e.g. security rules, NAT rules etc.,) and policy information of the one or more firewall devices 112A1-Nn on a control center page under a firewall tab. In one embodiment, the control center firewall module 212 provides a rule/policy search option to the one or more users 102A-N to search for a rule and policy information that are parsed from the one or more firewall devices 112A1-Nn by entering a search query (e.g. generic keywords using text) and intelligent/smart search using values of objects (e.g. logic over networks by matching and overlapping the networks, address ranges and port numbers) to retrieve the rules (e.g. security rules, NAT rules etc.,) which use those objects. The logic over networks includes identification of a starting range and an ending range of the IP address and analyzing the one or more application specific objects that matches the starting range and the ending range of the IP address. The logic over the network analyzing the one or more rules and the objects that overlaps on the starting and ending ranges of the IP address. Initially the address range of the objects that are of network type (having CIDR/Subnet Mask) are logically expanded to an IP range and stored alongside with the objects value. When the user 102A search for the objects with respect to a given IP, that is also part of the derived range and the address object is resulted for the search, thereby resulting with logically matching data rather than text based matched value. For example, an Network address object of value: 192.168.2.8/29 (Also written as 192.168.2.8/255.255.255.248 is logically expanded to range values: 192.168.2.9-192.168.2.15, so when the user 102A searches for 192.168.2.12, the rule accompanying this network object is resulted apart from other matches, thereby resulting appropriate data, rather than resulting matches based on text. Similarly, one or more objects of the one or more proxy devices and the one or more WAF devices are searched using the logical/smart search.

In one embodiment, the rule and policy is searched based on object names, rule action types, a rule name, a device name, a source IP, a destination IP etc. For example, when searching for the rules of the one or more firewall devices 112A1-Nn based on IP, the control center firewall module 212 fetches and displays the rules having the specific IP or its superset/overlapping addresses in the source column when the specific source IP is entered in a search tab. Before fetching the rules specific to the source IP, the control center firewall module 212 searches the IP objects, network objects and address range objects (e.g. a starting range and an ending range of the IP address). In another embodiment, the control center firewall module 212 displays the searched policy, and rule information. In yet another embodiment, the search query is free text form, keyword based, and logical operators (e.g. 'AND', OR'). The logical operators are used as the search query in case of multiple criteria needs to be provided. The control center firewall module 212 displays the rule information that matching the search criteria provided. In one embodiment, if one or more users 102A-N are searched for the rule/policy using search queries (that is available only in Firewall), the security policy management system 106 automatically land in firewall tab to display the search results. In another embodiment, the one or more users 102A-N selects the firewall tab to view the search results when the security policy management system 106 shows as the search results displayed in default landing page (i.e. in 'ADC' tab).

The control center firewall module 212 allows the one or more users 102A-N to perform a search without using the predefined search query on the firewall tab. In one embodiment, the search parameter is compared with the following fields in the database to obtain a search results: (i) source IP, (ii) destination IP, (iii) rule name, and (iv) application/services. The control center firewall module 212 allows the one or more users 102A-N to perform a search using the logical operators such as 'AND', 'OR'. The control center firewall module 212 allows one or more users 102A-N to use any number of AND, OR combinations to perform the search. In one embodiment, the one or more users 102A-N can also use negate symbol followed by an exact search term within quotes to exclude a mentioned criteria set of data. In another embodiment, the when using the logical operators with the combination of keywords and free text, the AND operation is executed first followed by OR operation. If the search text contains braces along with operators, the precedence for braces is given over logical operators according to the Boolean operator precedence. The control center firewall module 212 shows the list of keywords available for the Firewall devices when clicking on the expand button in a search bar. For example, to search for the policy, the one or more users 102A-N enters "–POL31" as a search query and that bring in the results of all the rules with action set to allow except the rules belong to POL31. When the one or more users 102A-N searches with an IP address using a source IP or a destination IP, the search results will also include the lapping subnets or IP range of the firewall devices. For example, if one or more users 102A-N searches for the IP address (e.g. 192.168.2.254) under a firewall tab, then if a subnet such as 192.168.2.0/24, 192.168.0.0/16 or 192.168.2.0-192.168.2.255 an IP range such as is present, then control center firewall module 212 displays rules with mentioned subnets in the search result.

The control center firewall module 212 allows the one or more users 102A-N to (i) search for the rule/policy by entering a string within double quotes as the search query, and (ii) fetches and displays the rule/policy that exactly match the string entered. The control center firewall module 212 allows the one or more users 102A-N to search using both insensitive keyword and a string. The control center firewall module 212 always displays one or more rules/policies in ascending/alphabetical order of the policy name, and in turn the rules inside the policy also are in the ascending/alphabetical order. The policy is parsed while parsing the device configurations. The control center firewall module 212 includes a rule/policy sort option to sort the one or more rules/policies. In one embodiment, the control center firewall module 212 allows to sort and re-order the rules (e.g. security rules, NAT rules etc.,) as per the firewall device vendors. The control center firewall module 212 includes displays complete information of all the attributes related to a particular rule when the one or more users 102A-N selects the rule from a rule grid when the one or more users 102A-N is not able to see all the information in one line as displayed by default. In one embodiment, the keyword based search queries as follows: (i) state of the rule, (ii) device name (Target firewall device name) associated to the policy, (iii) action associated to the policy/rule base managed within the one or more firewall devices 112A1-Nn, (iv) policy name, (v) source object name associated to the policy/rule base managed within the one or more firewall devices 112A1-Nn, (vi) destination object name associated to the policy/rule base managed within the one or more firewall devices 112A1-Nn, (vii) IP Addresses (Individual IP, IP with Subnet Mask, Range object) associated to the policy/rule base managed within the one or more firewall devices 112A1-Nn, (viii) destination IP Addresses (Individual IP, IP with Subnet Mask, Range object) associated to the policy/rule base managed within the one or more firewall devices 112A1-Nn, (ix) service object name that associated to the rule, and (x) applications/objects name that associated to the policy/rule base managed within the one or more firewall devices 112A1-Nn.

Figure 8:
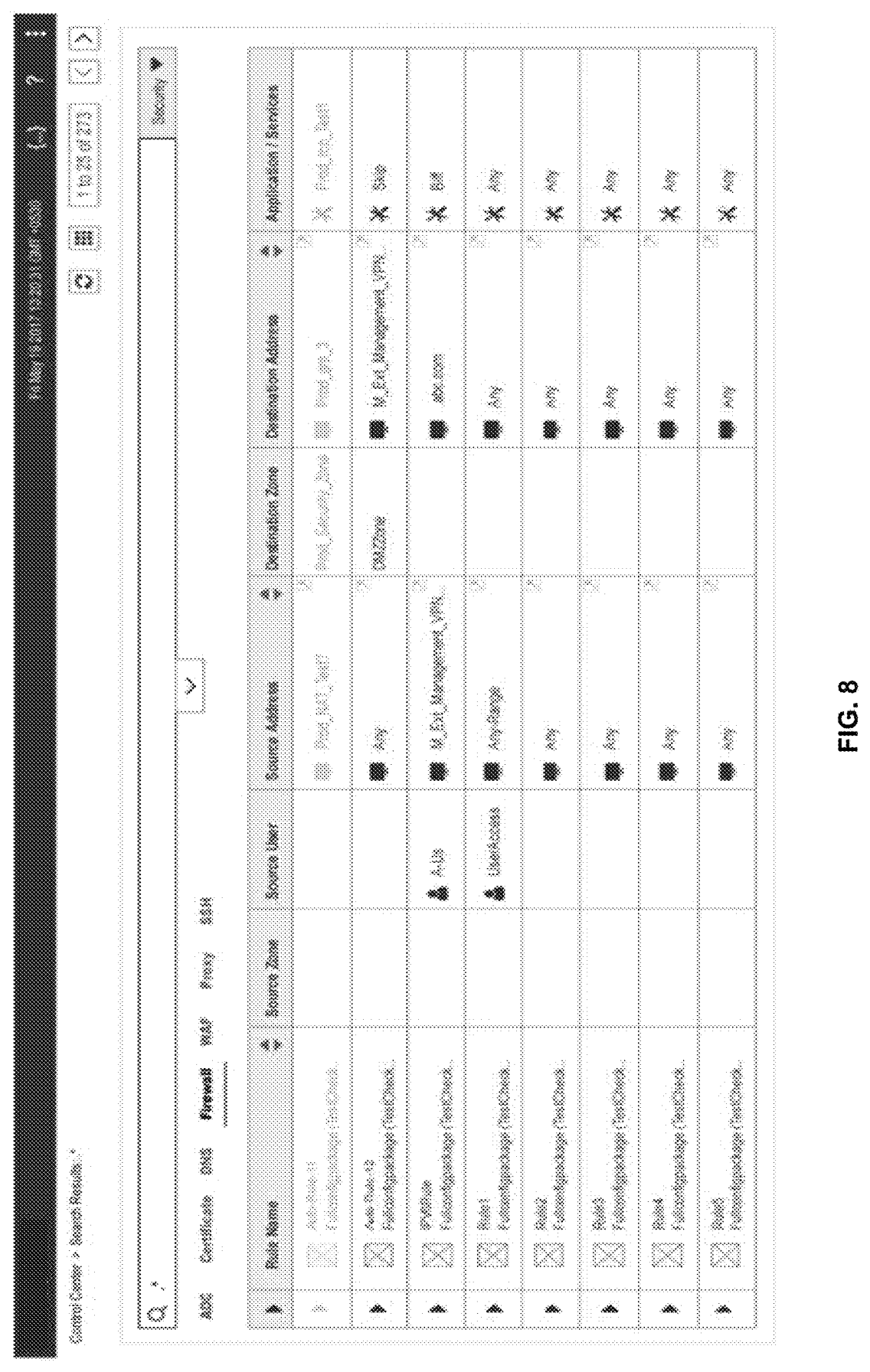

FIG. 8 illustrates a user interface view of a firewall module that displays security rules according to an embodiment herein. When selecting the security rules on the firewall module, the user interface view allows the one or more users 102A-N to enter a keyword to search for the security rules that are associated with the one or more firewall devices 112A1-Nn and displays/provides one or more security rules that are retrieved based on the keywords.

Figure 9:
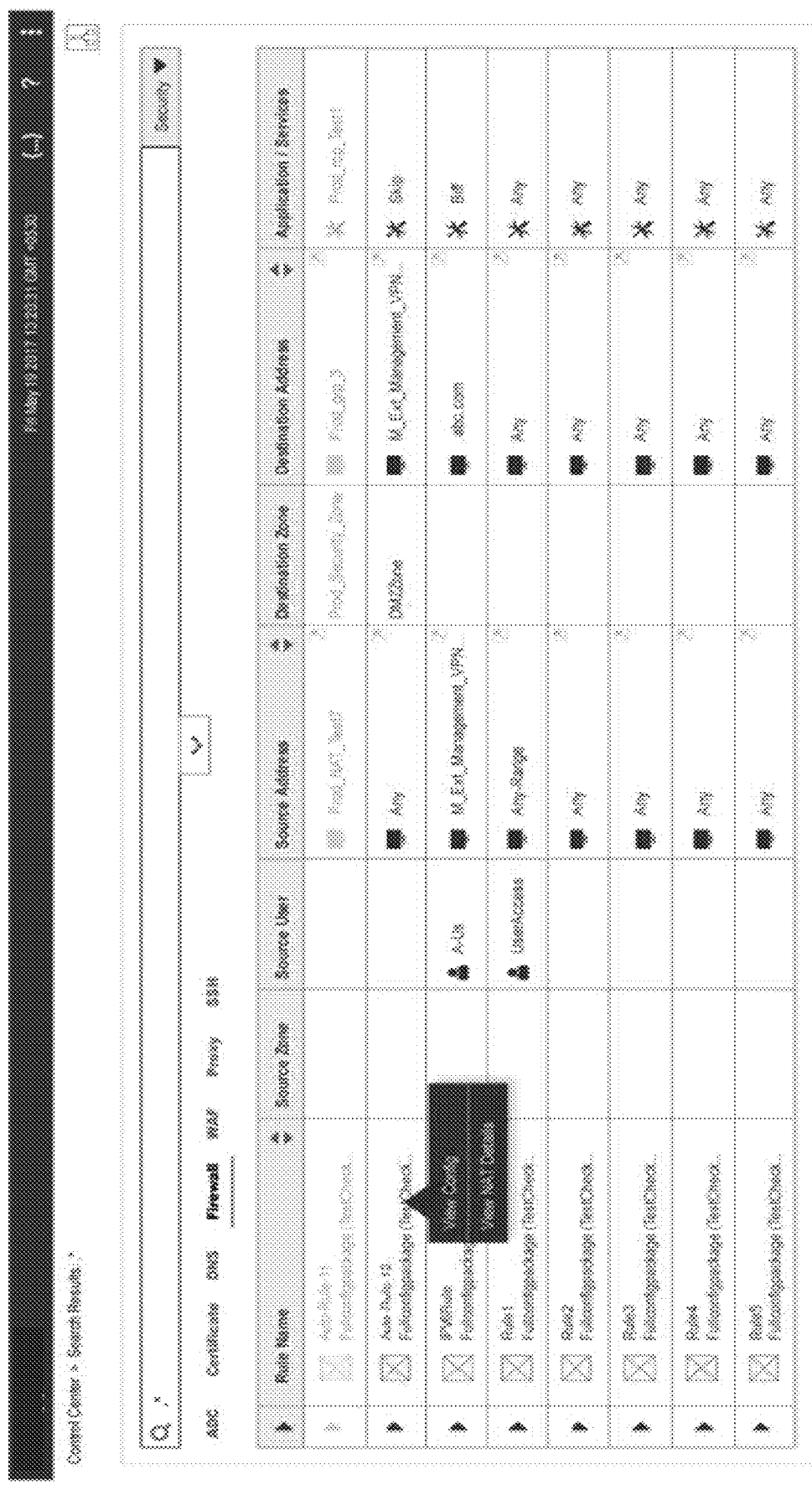
FIG. 9 illustrates a user interface view of the firewall module that provides details about a specific security rule according to an embodiment herein.

FIG. 9 illustrates a user interface view of a firewall module that provides details about a specific security rule according to an embodiment herein. The user interface view allows the one or more users 102A-N to view (a) configurations and (b) NAT details associated with the security rules when the one or more users 102A-N select or navigate to the particular security rule that is listed in the firewall module.

Figure 10:
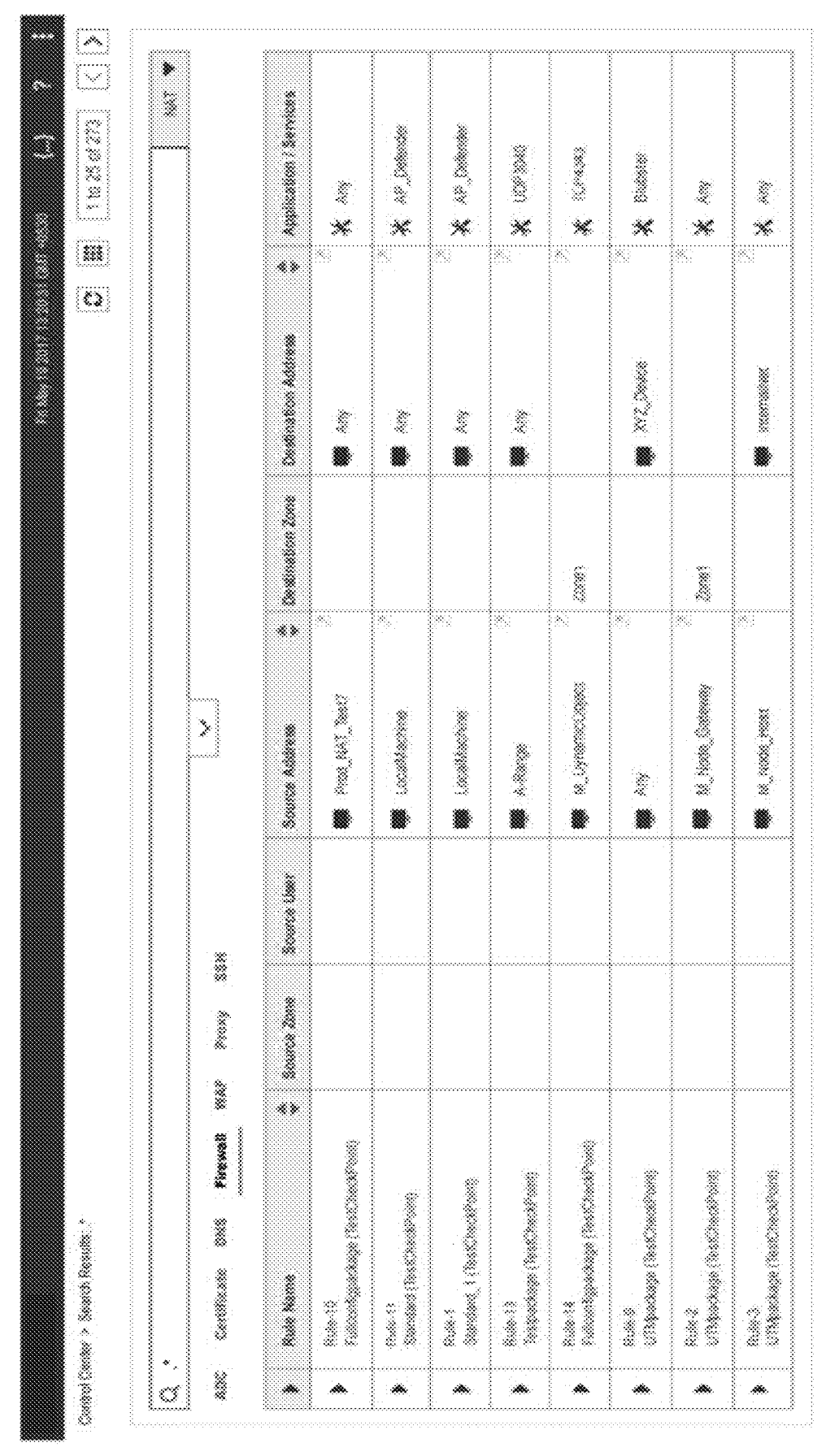

FIG. 10 illustrates a user interface view of a firewall module that displays NAT rules according to an embodiment herein. When selecting the NAT rules on the control center firewall module 212, the user interface views allows the one or more users 102A-N to enter a keyword to search for the NAT rules that are associated with the one or more firewall devices 112A1-Nn and displays/provides one or more NAT rules that are retrieved based on the keywords.

Figure 11:
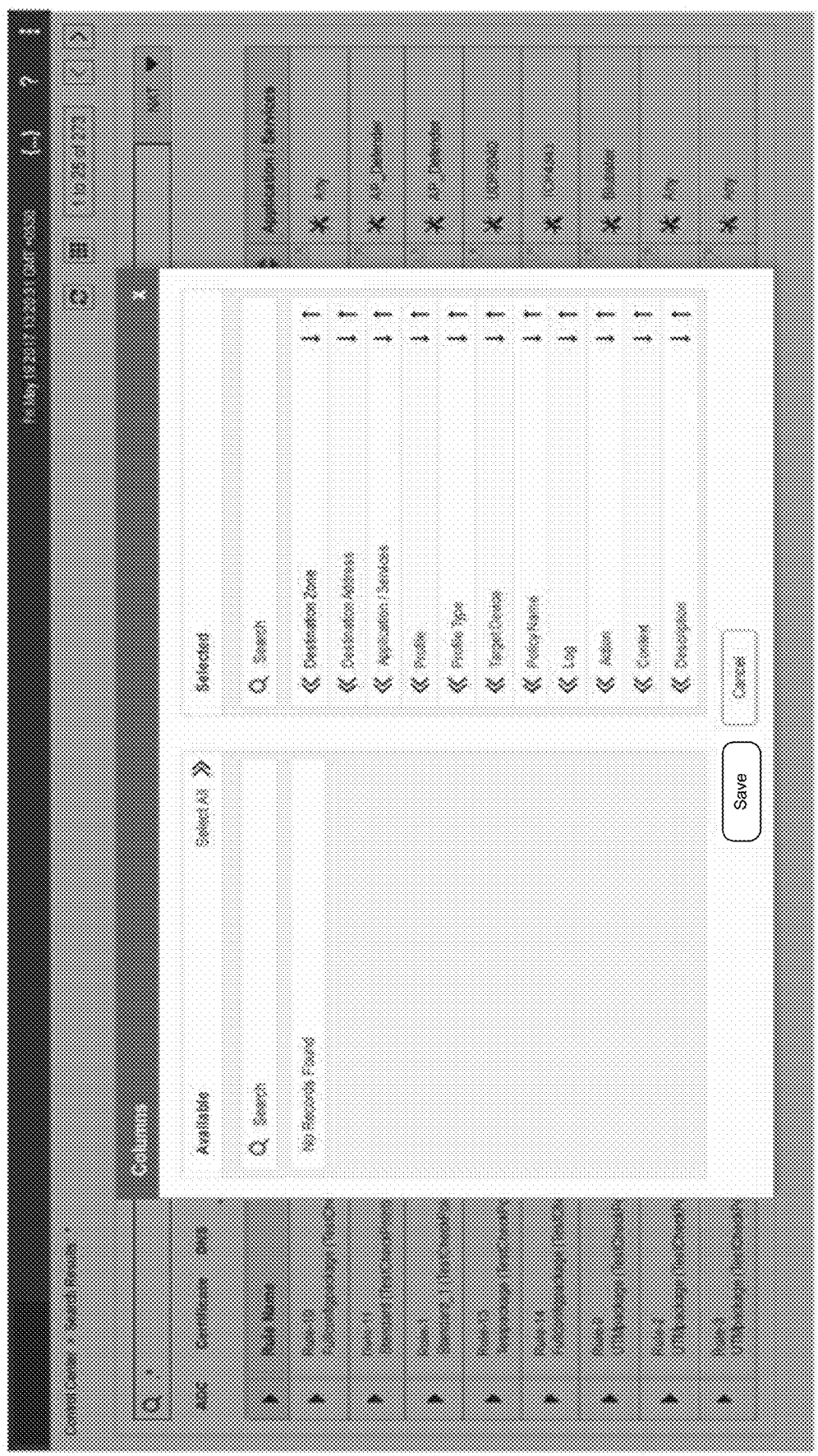
FIG. 11 illustrates a user interface view of a firewall module that provides selectable columns after an update of NAT rules according to an embodiment herein.

FIG. 11 illustrates a user interface view of a firewall module that provides selectable columns after updation of NAT rules according to an embodiment herein. The user interface view of the firewall module 212 provide one or more columns that are selectable after the updation of the NAT rules associated with the one or more firewall devices 112A1-Nn in the security policy management system 106. In one embodiment, the NAT rules include or consider the secure identification code and the credentials of each user.

Figure 12:
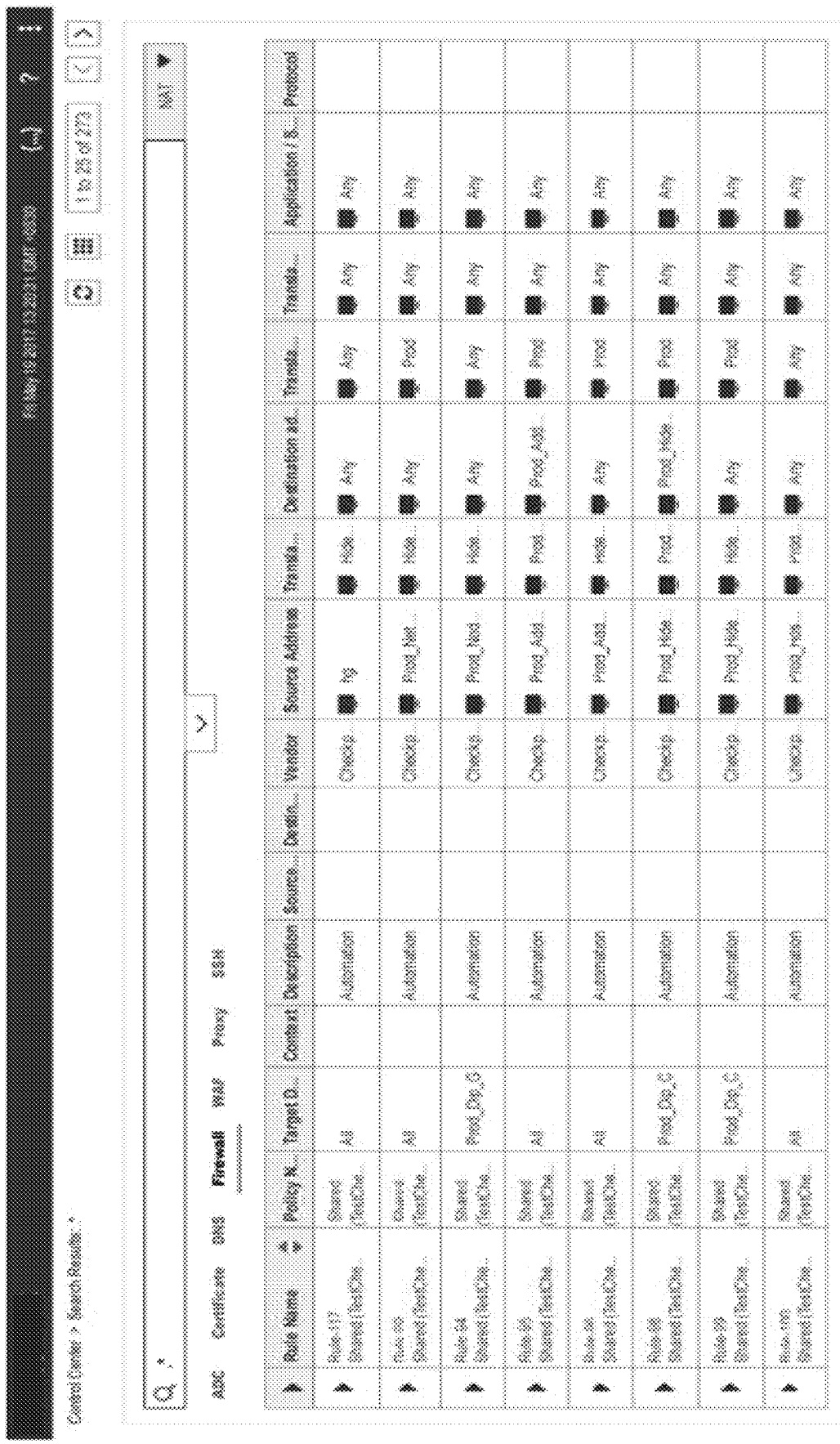
FIG. 12 illustrates a user interface view that provides one or more NAT rules that are associated with one or more application devices according to an embodiment herein.

FIG. 12 illustrates a user interface view that provides one or more NAT rules that are associated with one or more firewall devices according to an embodiment herein. The user interface view allows the one or more users 102A-N to view the NAT rules detail over/using the security rules.

Figure 13:
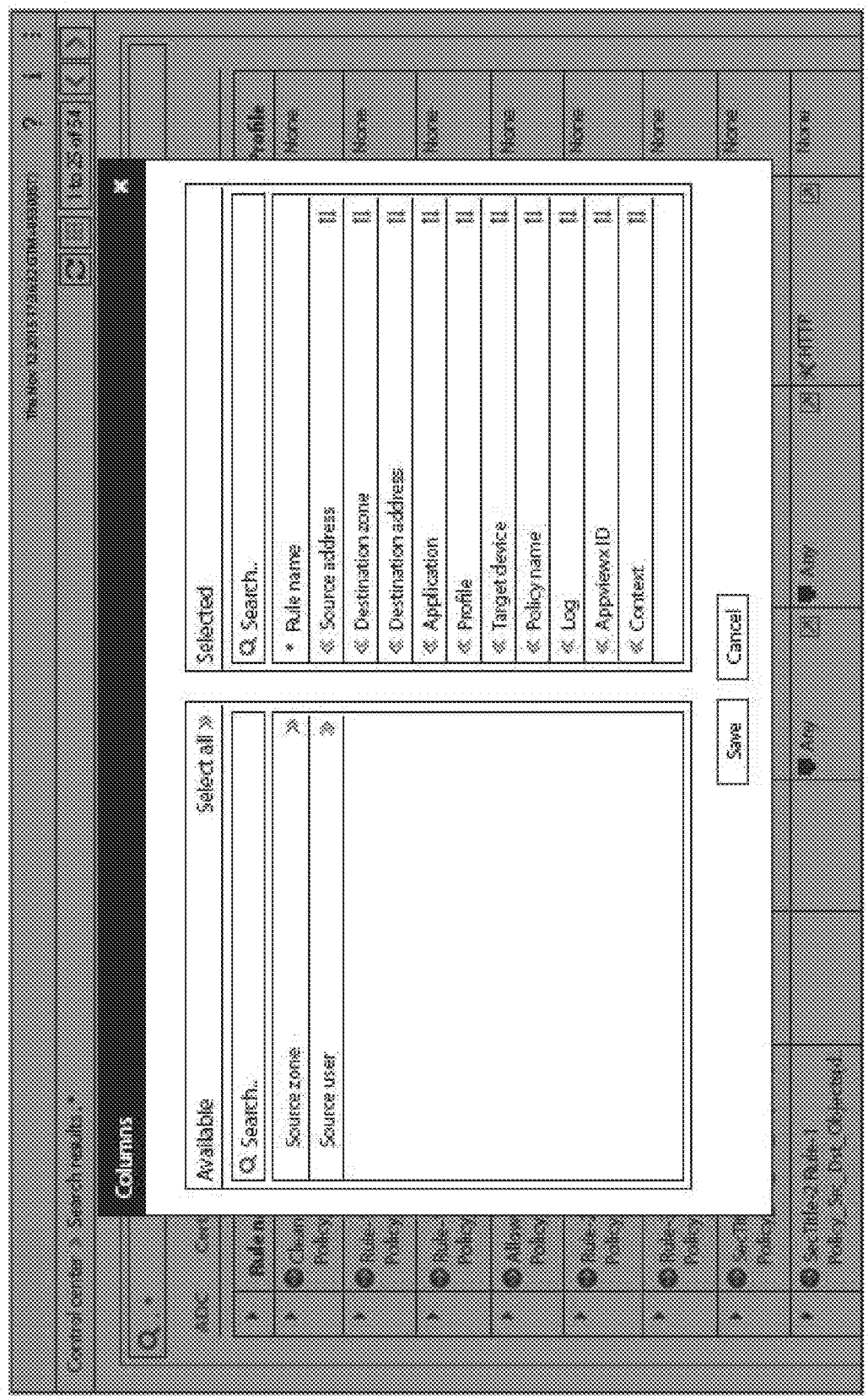
FIG. 13 illustrates a user interface view of a vendor-agnostic rule base module of FIG. 2 according to an embodiment herein.

FIG. 13 illustrates a user interface view of a vendor-agnostic rule base module 214 of FIG. 2 according to an embodiment herein. The vendor-agnostic rule base module 214 provides data/parameters associated with each vendor over generalized set of columns. The vendor-agnostic rule base module 214 provides a generalized view of one or more firewall rule base associated with different vendors. In one embodiment, the each vendors of firewall includes the one or more rule base.

Figure 14:
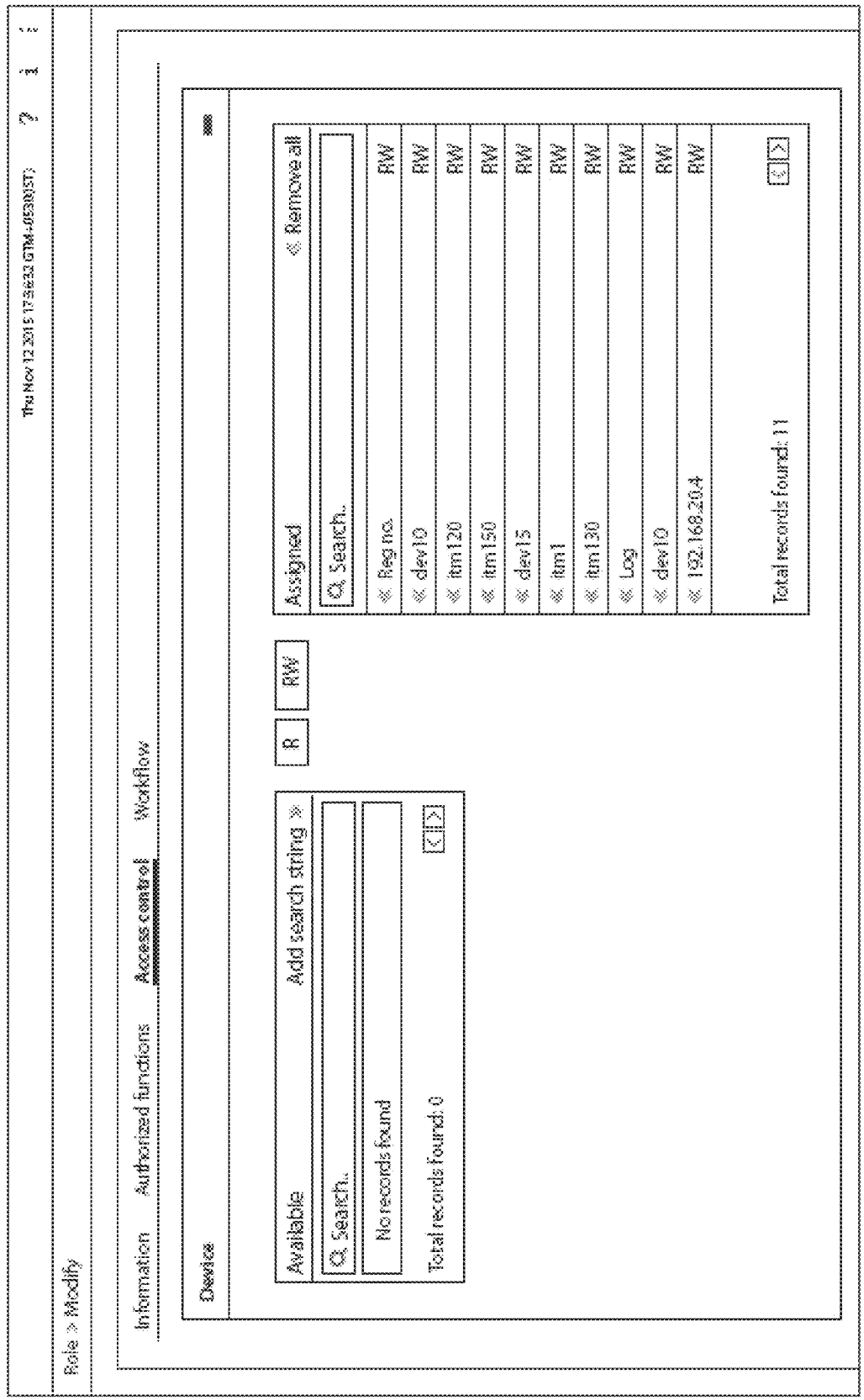
FIG. 14 illustrates a user interface view of an access control module of FIG. 2 according to an embodiment herein.

FIG. 14 illustrates a user interface view of an access control module 216 of FIG. 2 according to an embodiment herein. The access control module 216 assigns a role to the one or more users 102A-N to access a list of policies of the one or more firewall devices 112A1-Nn with read and read/write permission. In one embodiment, the access control module 216 assigns a role to the one or more users 102A-N to access the one or more firewall devices 112A1-Nn. The role is assigned to the one or more users 102A-N through authorized functions menu that allows the one or more users 102A-N to perform specific actions in the one or more firewall devices 112A1-Nn. The user interface view of the access control module 216 provides a firewall device search option to search for the one or more firewall devices 112A1-Nn to add a role to the one or more firewall devices 112A1-Nn/policy of the one or more firewall devices 112A1-Nn. The one or more firewall devices 112A1-Nn is searched by entering a search string. A particular firewall device is selected from the one or more firewall devices 112A1-Nn to assign the role. In one embodiment, the access control module 216 assigns the role to the one or more firewall devices 112A1-Nn with read access and/or read and writes access. The access control module 216 allow the one or more users 102A-N to associate a list of policies accessible for the one or more users 102A-N created via role with either read or read/write permission. The access control module 216 performs the following steps to assign the one or more firewall devices 112A1-Nn to the role: (i) select a user role to modify the role of the one or more users 102A-N through an account management, (ii) click devices under the access control tab, (iii) select appropriate access to the role (i.e. read [R] or read/write [R/W], (iv) move the one or more firewall devices 112A1-Nn under the Available list to Assigned list, and select save option to assign the role. The user interface view of access control module 216 provides an option to the one or more users 102A-N able to search for a specific device. When selecting an add search string option, the one or more users 102A-N are able to add a regular expression as a search criteria provided. In one embodiment, the access control module 216 automatically start categorizing the matching firewall devices into assigned list with the access provided/specified when adding the search criteria as a regular expression. The access control module 216 provides privileges over access to the one or more objects (e.g. security policies etc.). The access control module 216 assigns role to the one or more firewall devices 112A1-Nn in rule level or Object/IP level for managing the rules.

Figure 15:
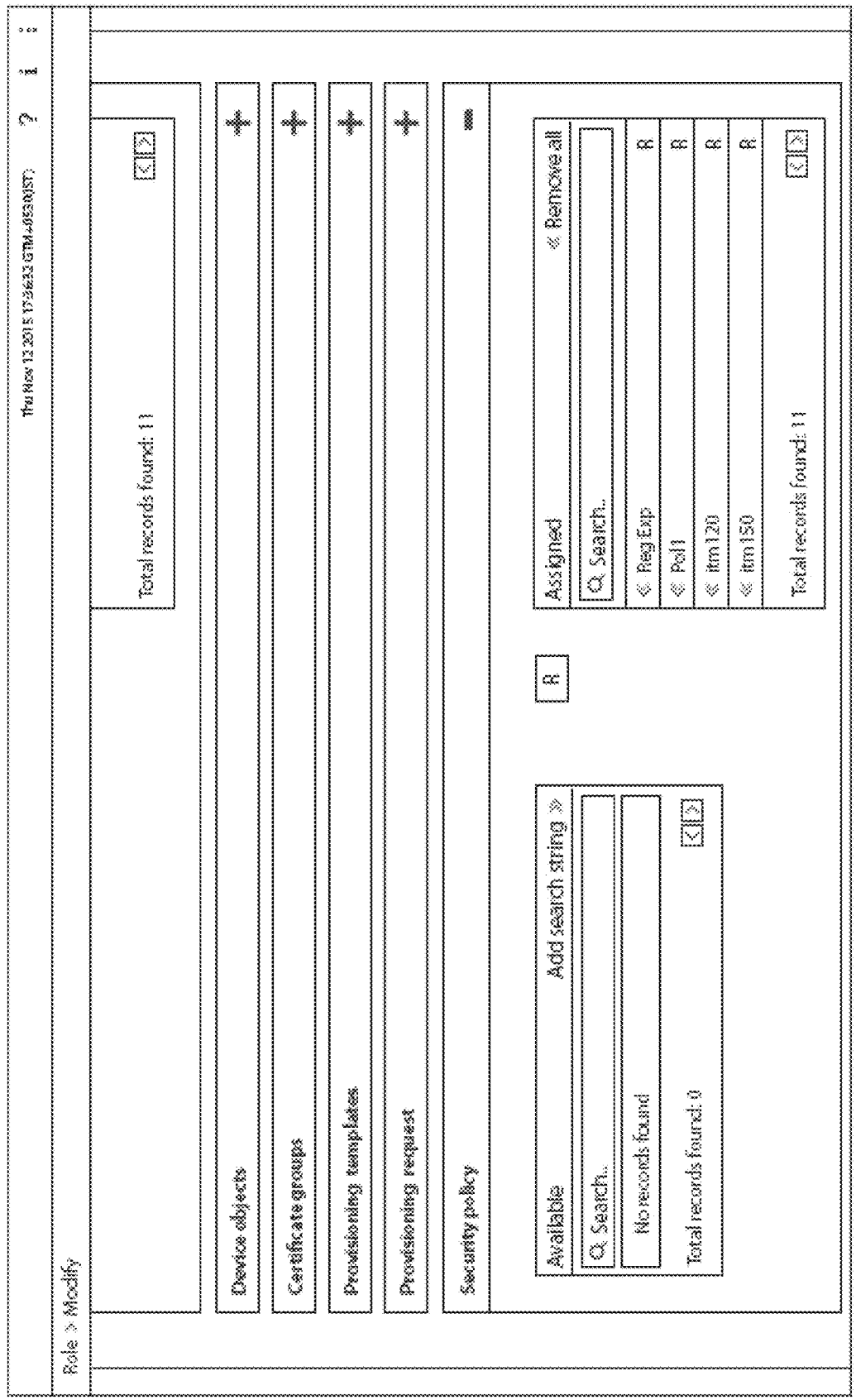
FIG. 15 illustrates a user interface view of a security policy module of FIG. 2 according to an embodiment herein.

FIG. 15 illustrates a user interface view of a security policy module 218 of FIG. 2 according to an embodiment herein. The user interface view of the security policy module 218 assigns/defines security policies with read access to the role. In one embodiment, the user interface view of the security policy module 218 allows the one or more user 102A-N to define the security policies to the rules and policies and the one or more application specific objects of the one or more application devices 112A1-Nn. The security policy module 218 allows a respective user of the particular role to view the security policy/policies in the control center. The security policy module 218 performs the following steps to assign security policy to the role: (i) select a user role to modify the security policy through an account management, (ii) select a security policy under the access control tab, (iii) select appropriate access for the policy (i.e.

read [R]), (iv) move one or more policies under the available list to assigned list and select save option to save the one or more policies. The user interface view of the security policy module 218 allows the one or more users 102A-N to search for a specific policy. When selecting an add search string option, the one or more users 102A-N is able to add the search criteria provided as a regular expression. In one embodiment, the security policy module 218 automatically starts categorizing the matching certificate groups into assigned list with the access provided/specified when adding the search criteria as a regular expression. The security policy is assigned to the one or more objects of the one or more firewall devices, the one or more proxy devices and the one or more WAF devices.

Figure 16:
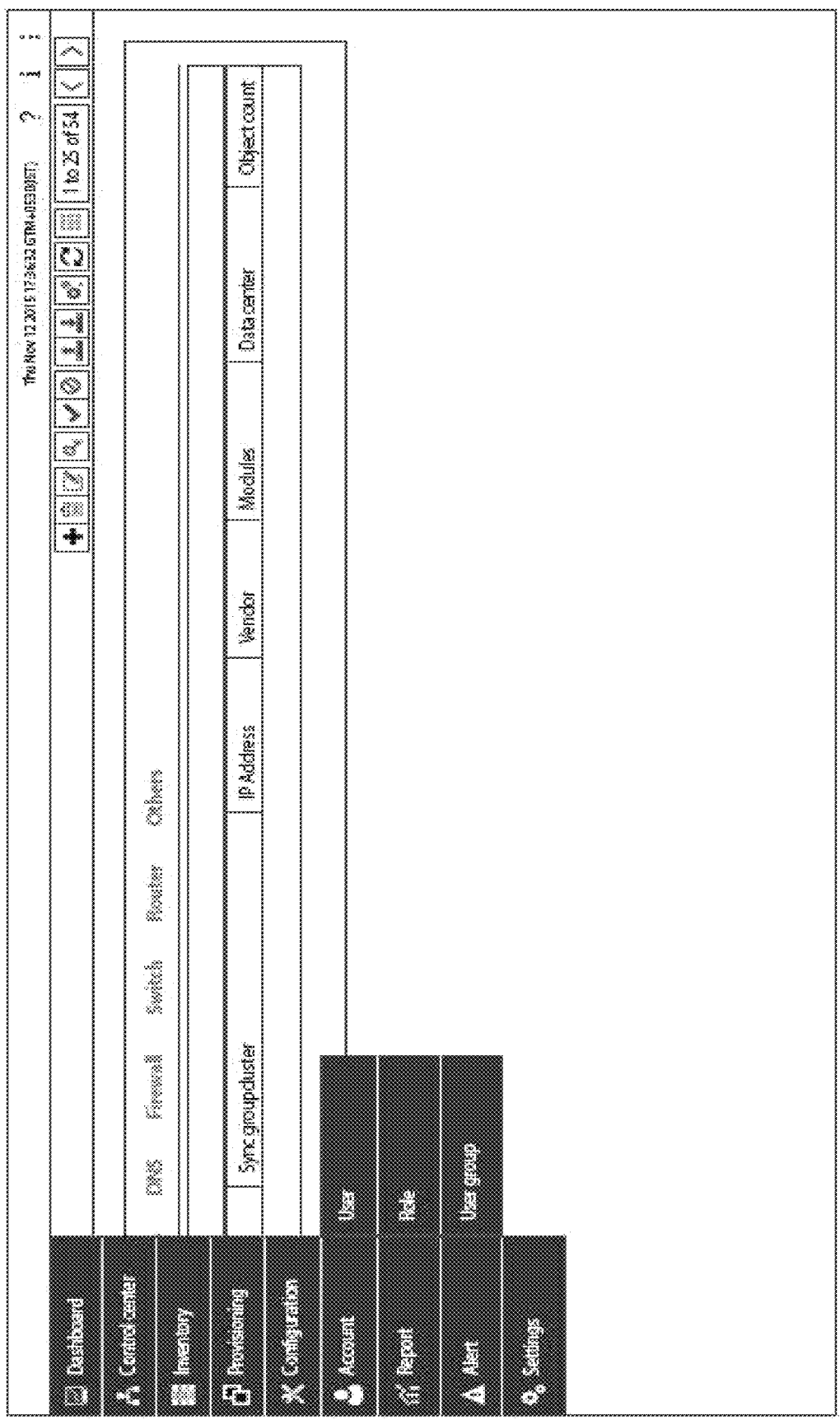
FIG. 16 illustrates a user interface view of a role assigning module of FIG. 2 according to an embodiment herein.

FIG. 16 illustrates a user interface view of a role assigning module 220 of FIG. 2 according to an embodiment herein. The role assigning module 220 assigns a role to the one or more users 102A-N. The user interface view of the role assigning module 220 provides an option to assign a particular role to the one or more users 102A-N when selecting a user under the inventory tab. The role is assigned to the one or more users 102A-N to access the one or more objects of the one or more firewall devices, the one or more proxy devices and the one or more WAF devices.

Figure 17:
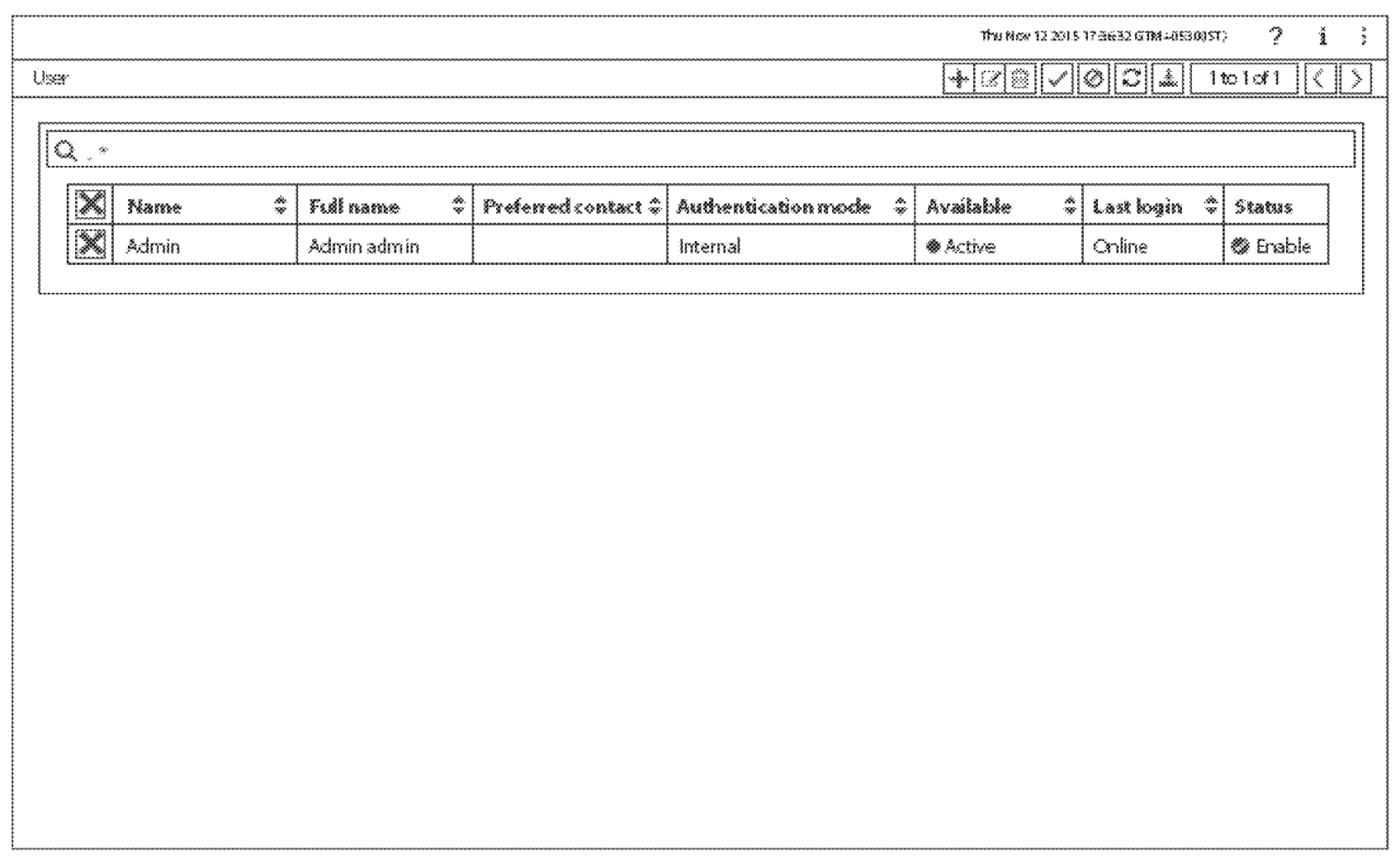

FIG. 17 illustrates a user interface view of a rule/policy modification module 222 of FIG. 2 according to an embodiment herein. The user interface view of the rule/policy modification module 222 displays the details as follows: (i) name of a user, (ii) full name of a user, (iii) contact detail of the user, (iv) authentication mode for the user, (v) availability of the user (e.g. available), (vi) previous login of the user, and (vii) status that indicates whether the user is active or not (e.g. enabled). The security policy management system 106 automatically implements the new security policy to modify a plurality of user details and a rule and a policy information associated with the plurality of rules and policies and the plurality of application specific objects of the plurality of application devices 112A1-Nn for managing the security policy of the plurality of application specific objects of the plurality of application devices 112A1-Nn. The security policy management system 106 implements the new security police once the new security policy is defined. The user interface view of the user page provides a modify option to the one or more users 102A-N to modify the user details and rule/policy details.

FIG. 18 illustrates a user interface view of a role enabling module according to an embodiment herein. The role enabling module enables the role for the one or more users 102A-N. For example role is selected as admin and saved to enable the role. The role enabling module maintains access control over the functions and objects. When the access controls associated with the functions and the objects are mapped with users or one or more users group, the customized privileges are applied.

Figure 19A:
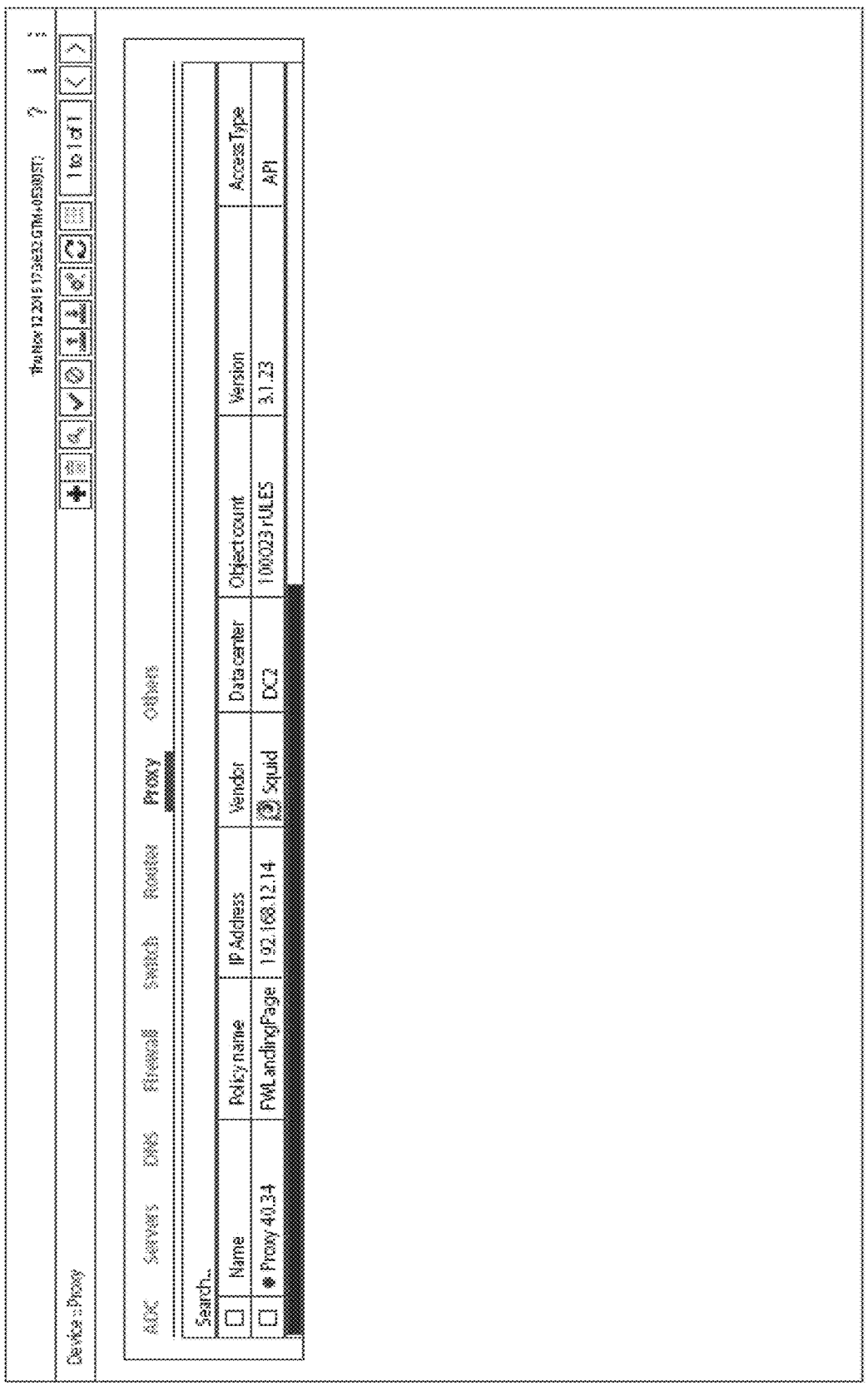
Figure 19B:
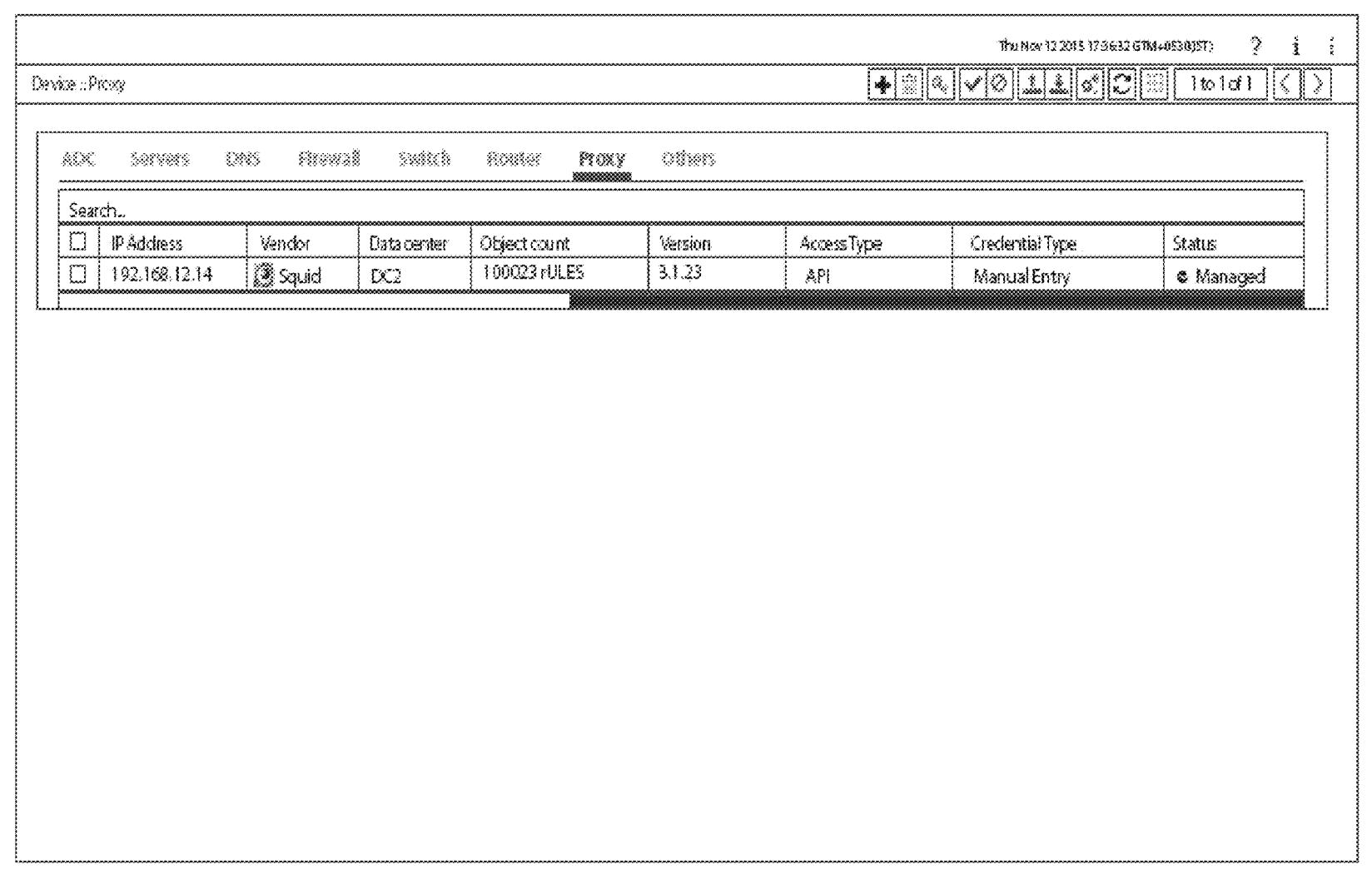

FIGS. 19A and 19B illustrate user interface views of a device inventory tab/a control center tab of one or more proxy devices 112A1-Nn according to an embodiment herein. The user interface views provides list of all proxy devices 112A1-Nn that are already added to the security policy management system 106 and provides details of each proxy device as follows: (a) a name of the proxy device, (b) a policy name of the proxy device, (c) an IP address of a proxy device, (d) a vendor for the proxy device, (e) a data center associated with the proxy device, (f) an object count for the proxy device, (g) a version of the proxy device, (h) an access type for the proxy device, (i) a credential type of the proxy device, and (j) a status of the proxy device (e.g. managed/unmanaged). The user interface views of the device inventory allows the one or more users 102A-N perform the functions as follows: (a) add and delete the proxy devices, (b) managing a credential list, (c) manage and un-manage the proxy devices, (d) export and import the proxy devices, (e) fetching the configurations of the proxy devices, and (f) refresh the proxy devices.

Figure 20B:
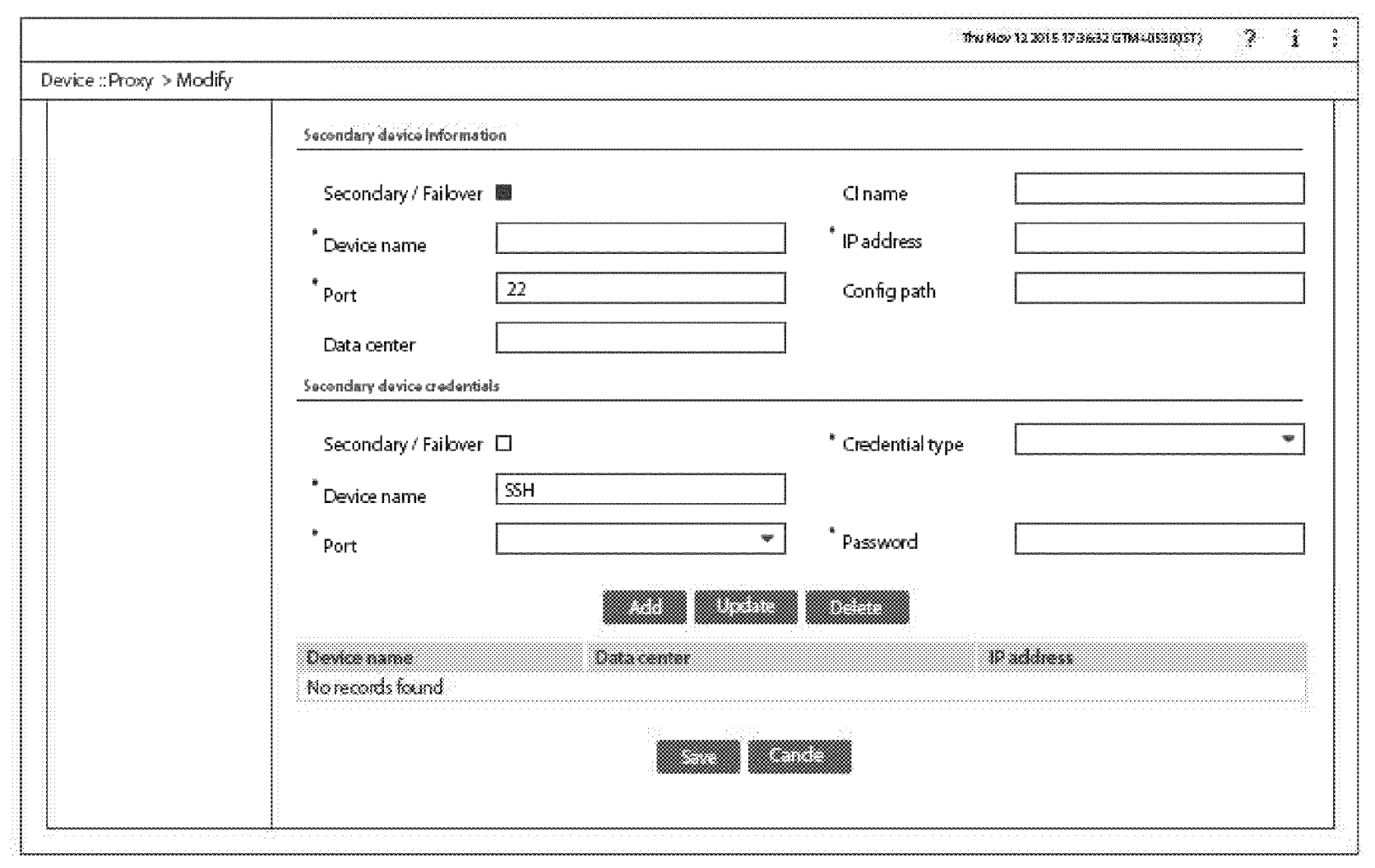

FIGS. 20A and 20B illustrate user interface views of a proxy device adding module according to an embodiment herein. The user interface views provide details of a proxy device as follows: (a) general information, (b) credentials, (c) secondary device information and (d) secondary device credentials. The proxy device adding module adds one or more secondary devices with same or different port credentials. If the primary device (e.g. first or main device) is not reachable, the security policy management system 106 is approaching the second/next device, in the event of second device failing it approaches the third one in the list. The security policy management system 106 checks for availability of a first/main device 112 (e.g. a firewall device, a proxy device or a WAF device) when a user 102 communicate with the one or more proxy devices 112A1-Nn with regards to specific policy. The security policy management system 106 ensures that the policy is fetched with any of the available device/devices which act as a similar source of information listed by the user 102 in the input order.

Figure 21:
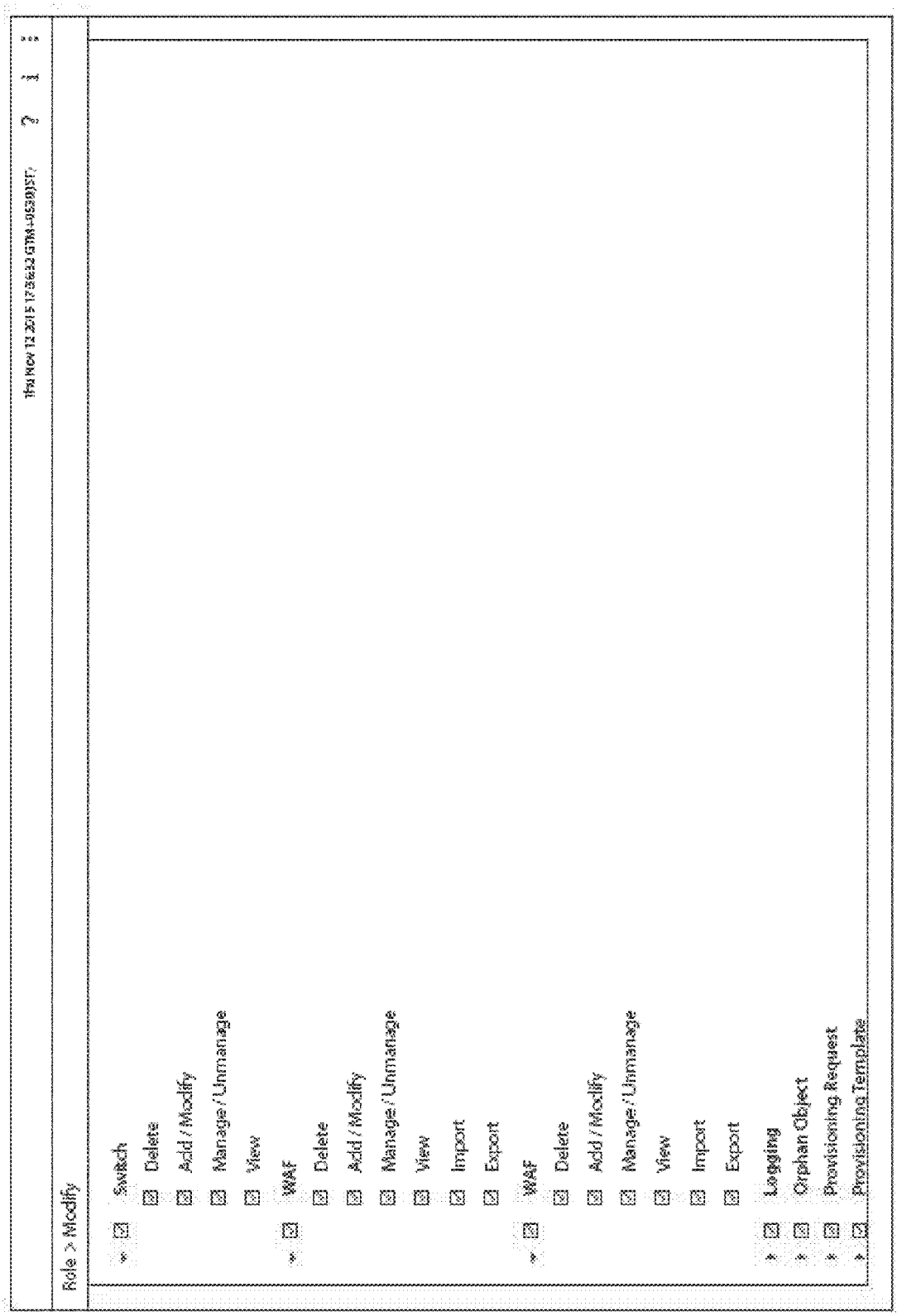
FIG. 21 illustrates a user interface view of a web application firewall (WAF) device modification module according to an embodiment herein.

FIG. 21 illustrates a user interface view of a web application firewall (WAF) device modification module according to an embodiment herein. The web application firewall device management module allows the one or more users 102A-N to control a role over various functionalities under WAF segment. The functionalities includes at least one of but not limited to (a) adding WAF devices to the security policy management system 106, (b) modifying capability to an existing WAF device, (c) set a WAF device to managed state, (d) set the WAF device to unmanaged state, (e) provide ability to view the WAF device and (f) import/export the list of WAF devices to/from the security policy management system 106. The security policy management system 106 retrieves the WAF device configuration as policy and provide/display in a generalized (e.g. vendor agnostic) rule base and provides various search capabilities (e.g. keyword based search with conditions) to filter out configuration as per user's requirement. In one embodiment, the security policy management system 106 allows the user 102A to modify/change the device using a template includes in an application provisioning system (APS) module.

Figure 22:
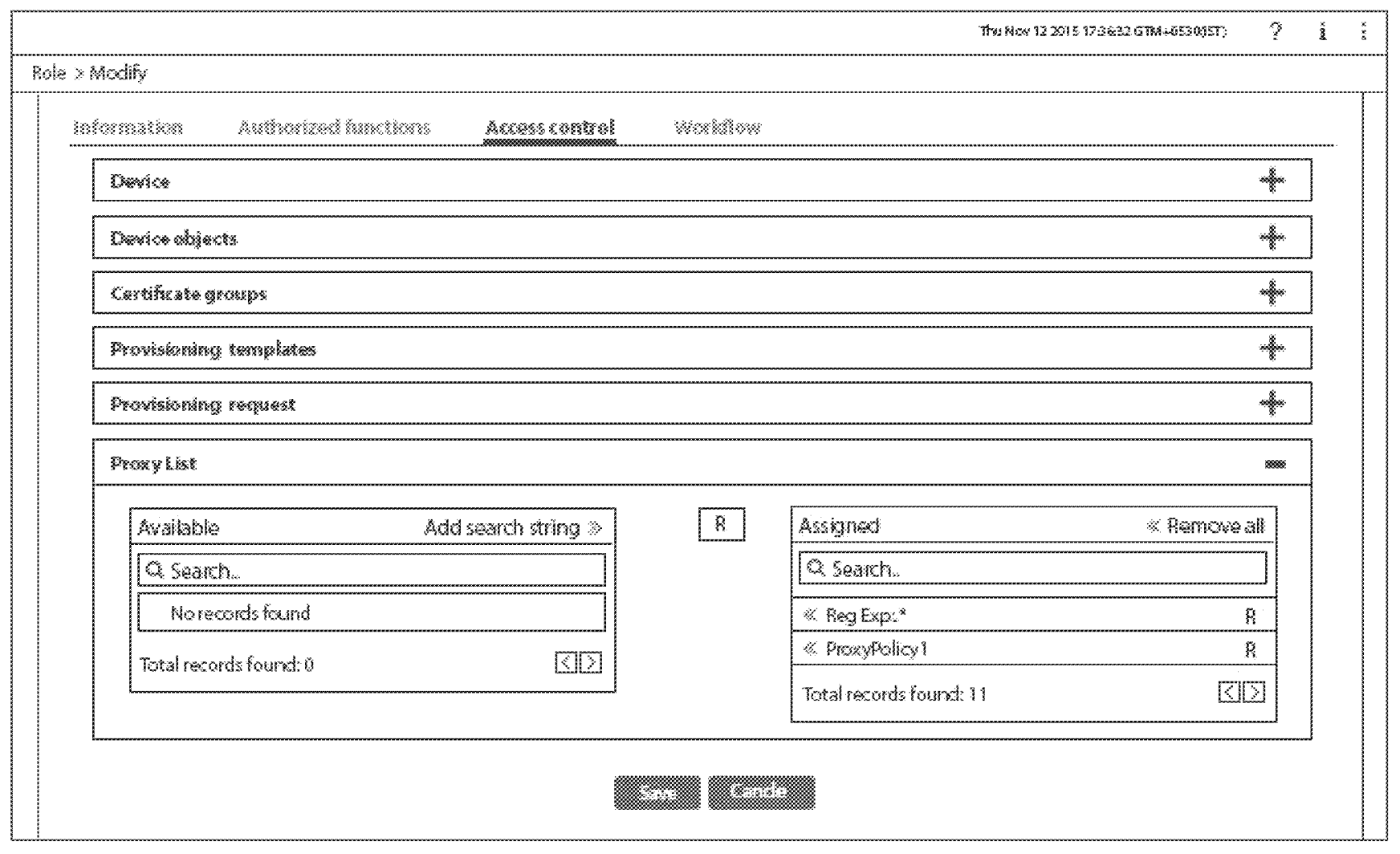
Figure 23A:
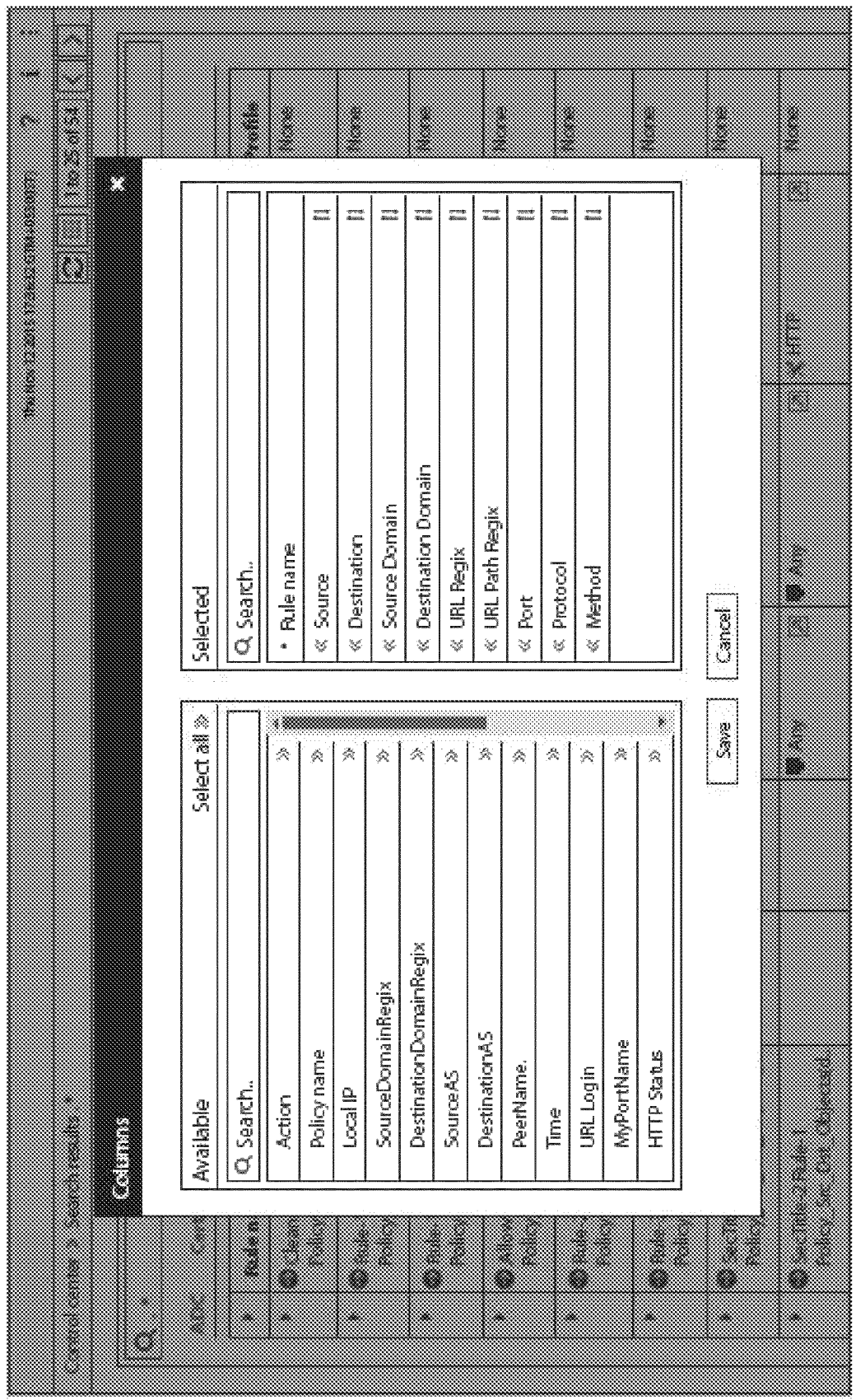
FIGS. 23A-23C illustrates user interface views of adding one or more columns to a control center module according to an embodiment herein.
Figure 23B:
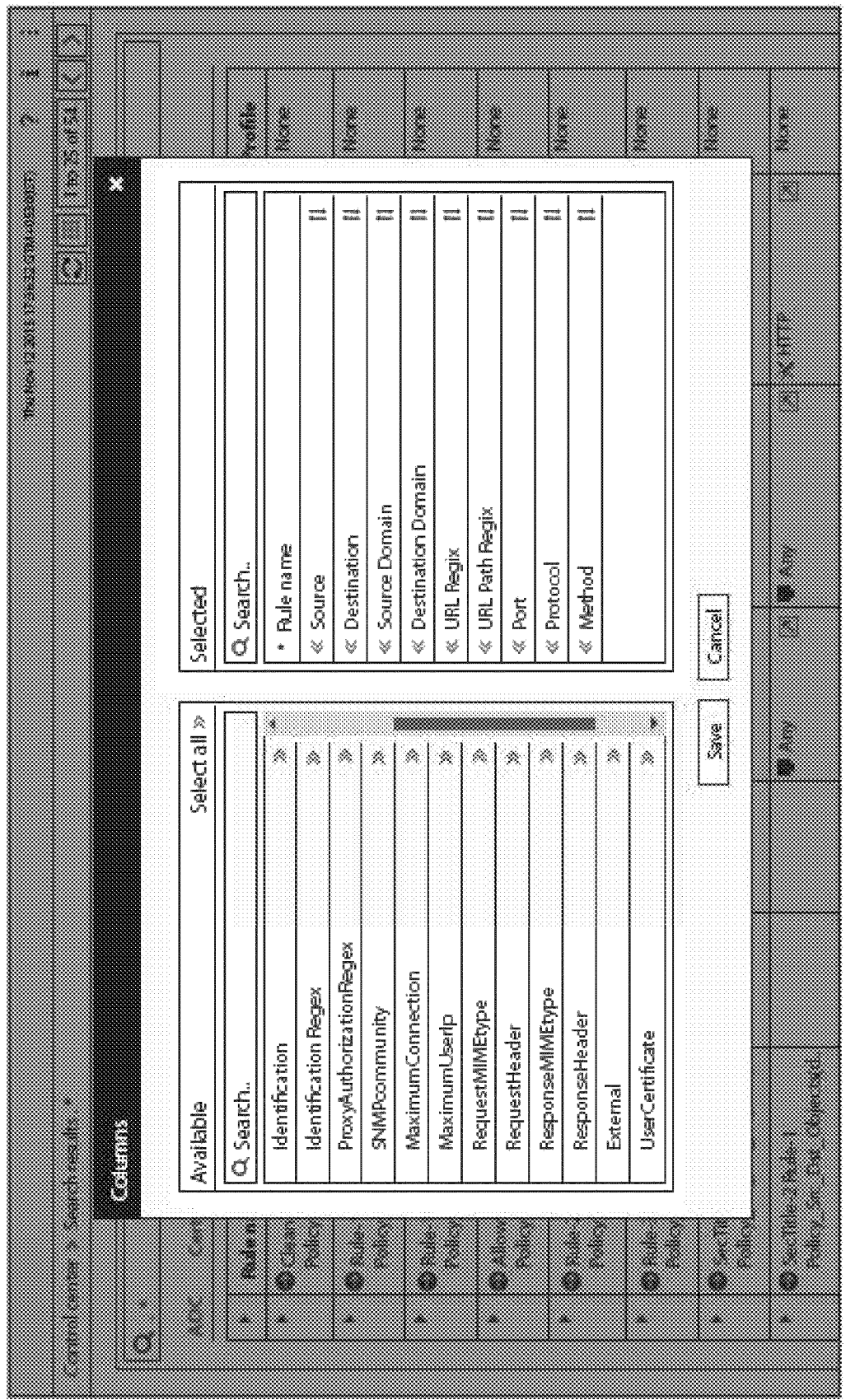
Figure 23C:
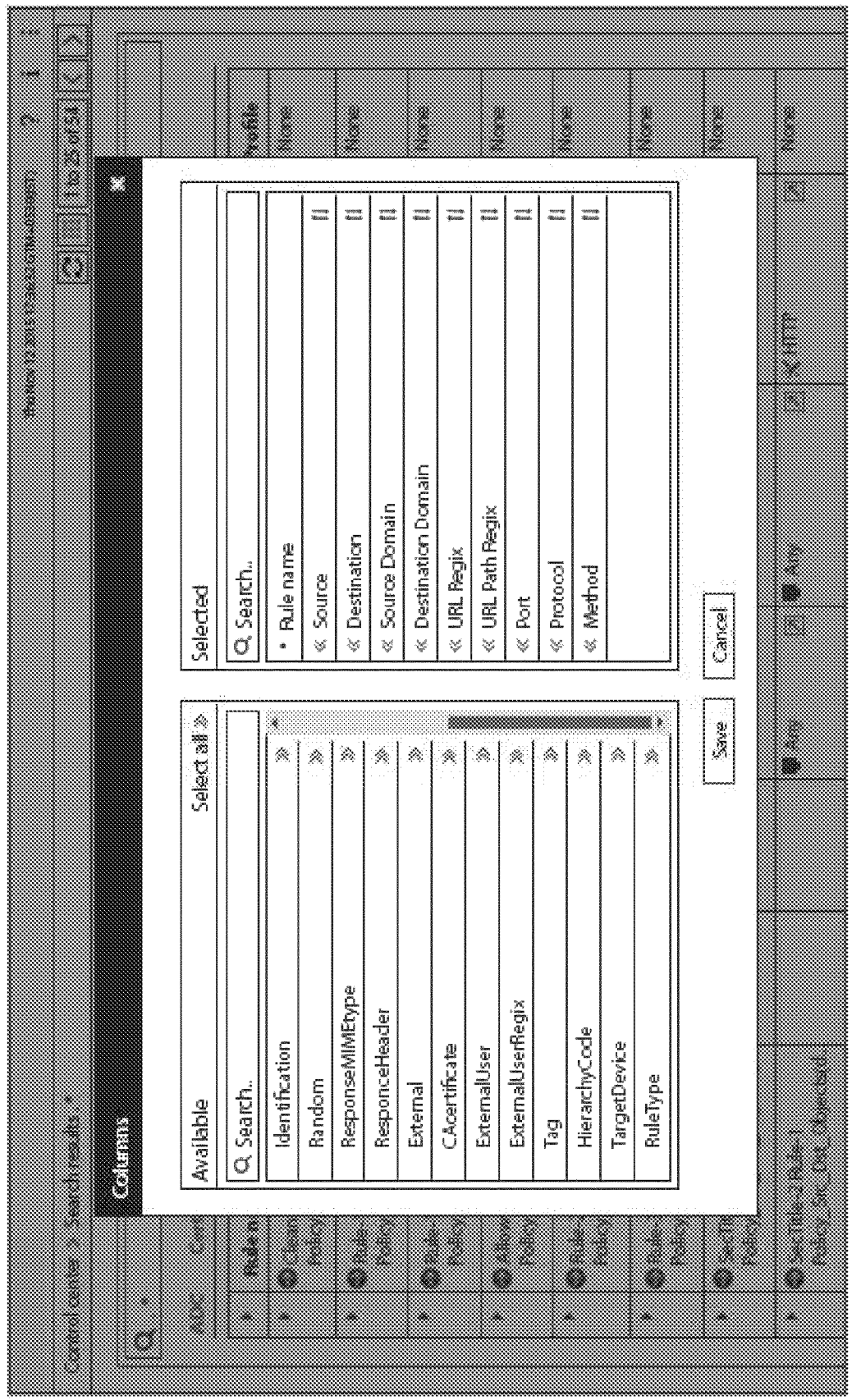

FIG. 22 illustrates a user interface view of an access control module 216 that is operated under a role tab according to an embodiment herein. The user interface view provides one or more proxy policies that are listed as available by default which the user 102A may select each or many proxy policies and assign with read privilege to the one or more proxy devices 112A1-Nn. After which the user 102A can view the proxy policies in control center either on a given search or on default search. The access control module 216 assigns a role to the one or more users 102A-N to access a list of policies of the one or more web application firewall 112A1-*nn* with read and read/write permission FIGS. 23A-23C illustrates user interface views of adding one or more columns to a control center module according to an embodiment herein. The user interface views allow the one or more users 102A-N to customize the control center module by adding new columns and removing existing columns from the control center module. The user interface views allow the one or more users 102A-N to (a) search one or more new columns (e.g. an action field, a policy name field, a policy name field etc.) and (b) select the one or more columns to add to the control center module. The user interface views provide one or more column to customize the control center module. In one embodiment, the one or more column is added to the firewall inventory, a proxy device inventory and the WAF device inventory.

Figure 24A:
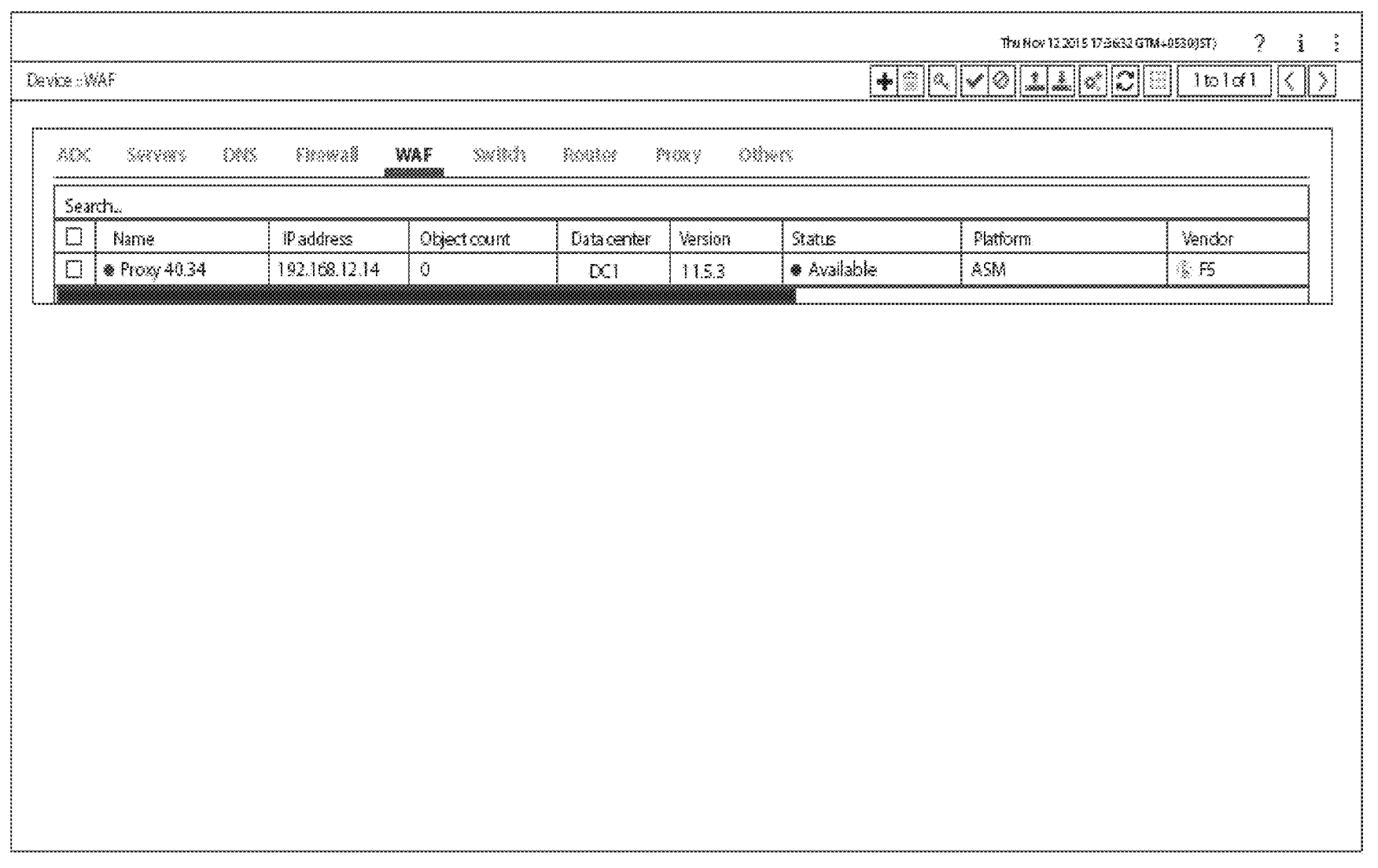
Figure 24B:
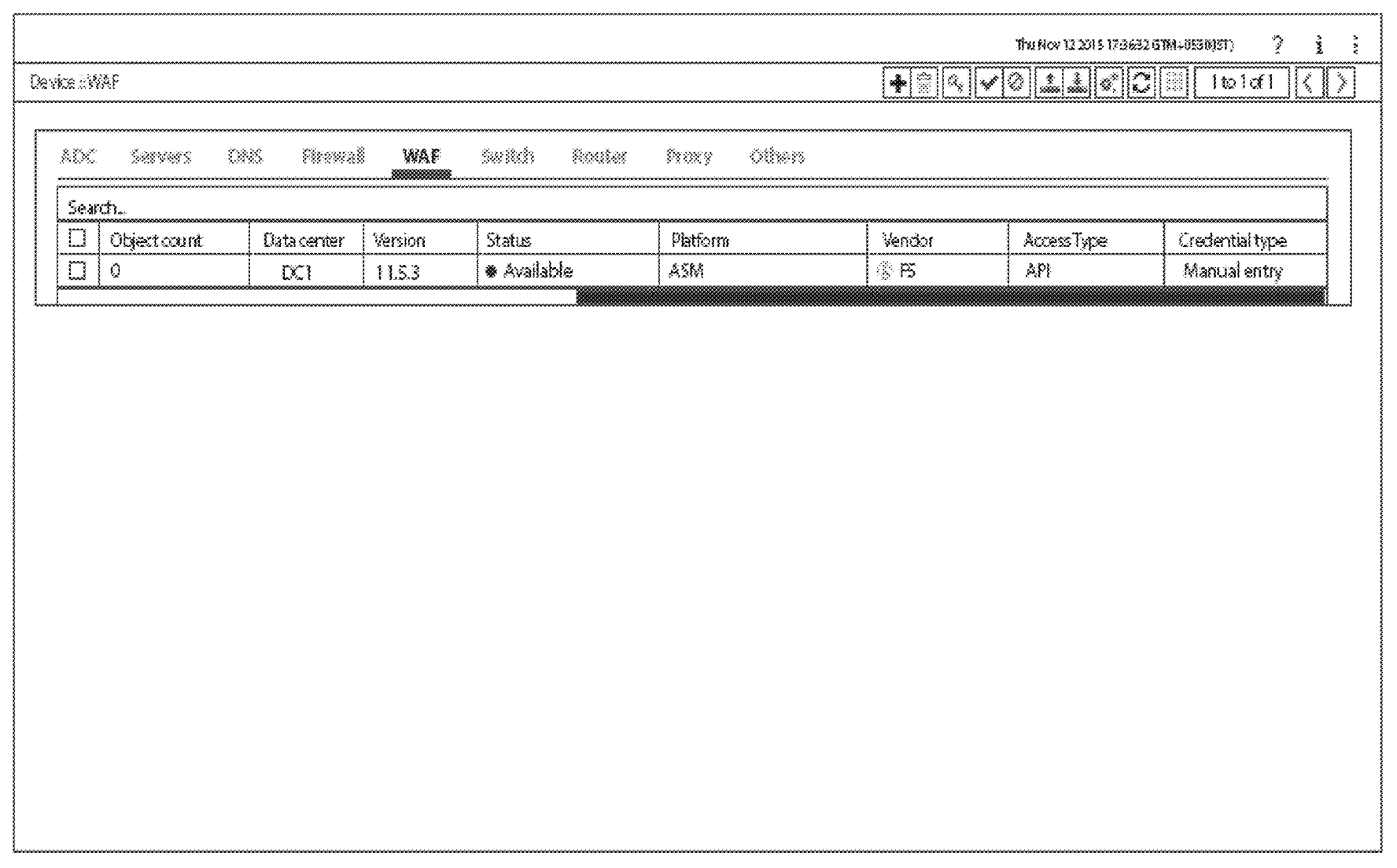

FIGS. 24A and 24B illustrate user interface views of a web application firewall (WAF) device management module according to an embodiment herein. The user interface views of the web application firewall device management module provide one or more web application firewall (WAF) devices 112A1-Nn. The user interface views of the web application firewall device management module provide (a) a name of the WAF device, (b) IP address for the WAF device, (c) object count for the WAF device, (d) a data center associated with the WAF device, (e) version of the WAF device, (f) current status of the WAF device, (g) a platform used to manage the WAF device, (h) a vendor for the WAF device, (i) an access type for the WAF device and (j) credential type of the WAF device.

Figure 25A:
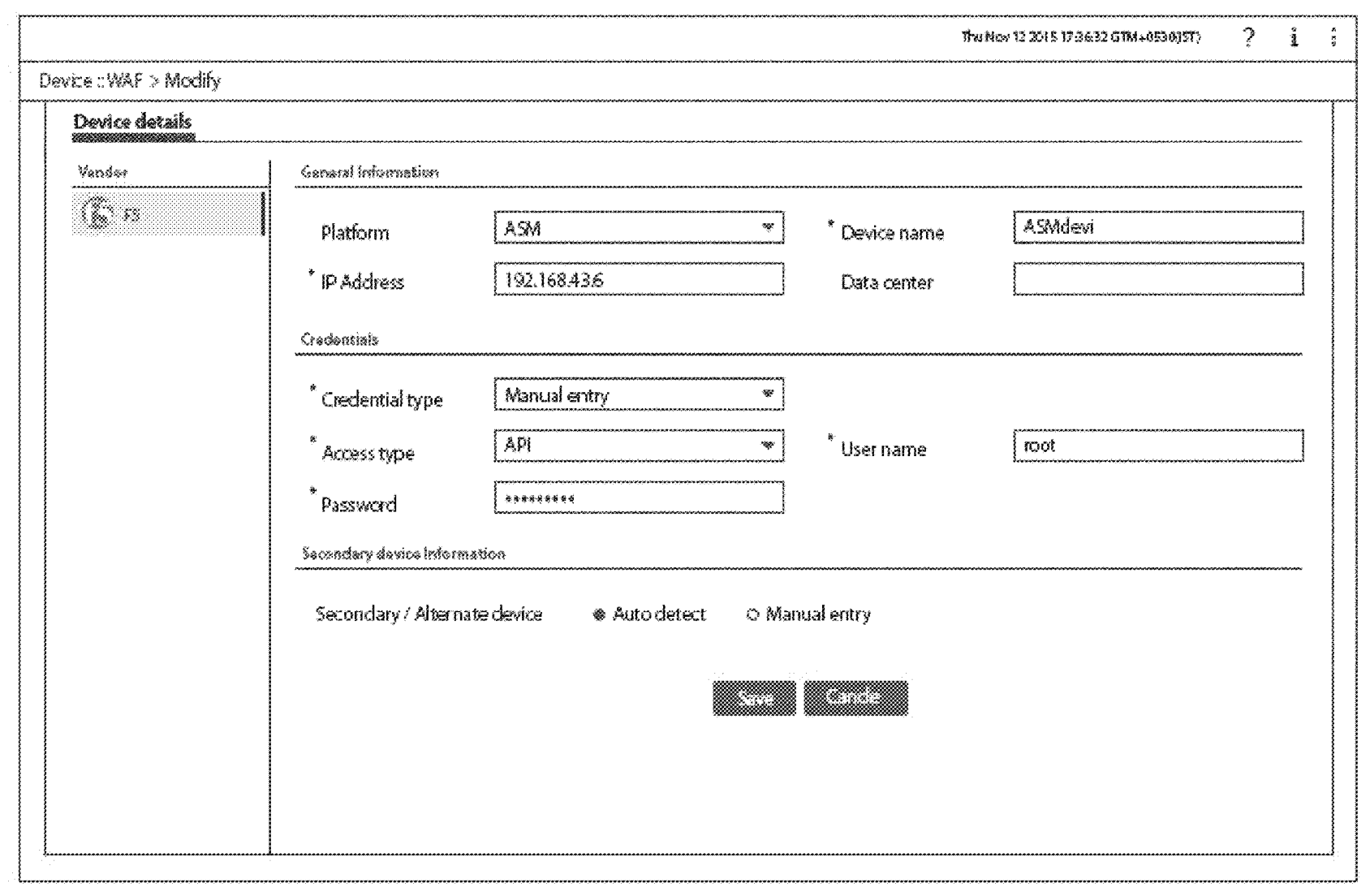
Figure 25B:

FIGS. 25A and 25B illustrate user interface views of a web application firewall (WAF) device adding module according to an embodiment herein. The user interface views of the web application firewall (WAF) device adding module allows the one or more users 102A-N to add one or more WAF devices 112A1-Nn to the firewall device inventory. The security policy management system 106 includes templates for firewall rule creation and delegation. The user interface views of the WAF device adding module automatically search for the WAF device when selecting an auto detect option and allow the one or more users 102A-N to add the detected WAF device to the firewall device inventory. In one embodiment, the user interface views of the WAF device adding module allows the one or more users 102A-N to manually enter add the WAF device to the firewall device inventory by entering the details as follows: (a) a platform name for the WAF device, (b) a device name, (c) an IP address for the WAF device, (d) a data center used for the WAF device, (e) credential type (e.g. manual entry of the WAF device or auto detection), (f) access type for the WAF device (g) a user name for the WAF device, (h) a password to access the WAF device, (i) a secondary device information (e.g. secondary/alternate device added by auto detect or manual entry). If the secondary/alternate device added by auto detect, the security policy management system 106 automatically identify the alternate device and their details (e.g. secondary device name, IP address, data center, credential type, user name and password). Once the details are entered in respective columns, the security policy management system 106 allows the one or more users 102A-N to add/save the second device to the firewall device inventory. In one embodiment, the security policy management system 106 allows the user to update or delete the device by entering the above details.

Figure 26A:
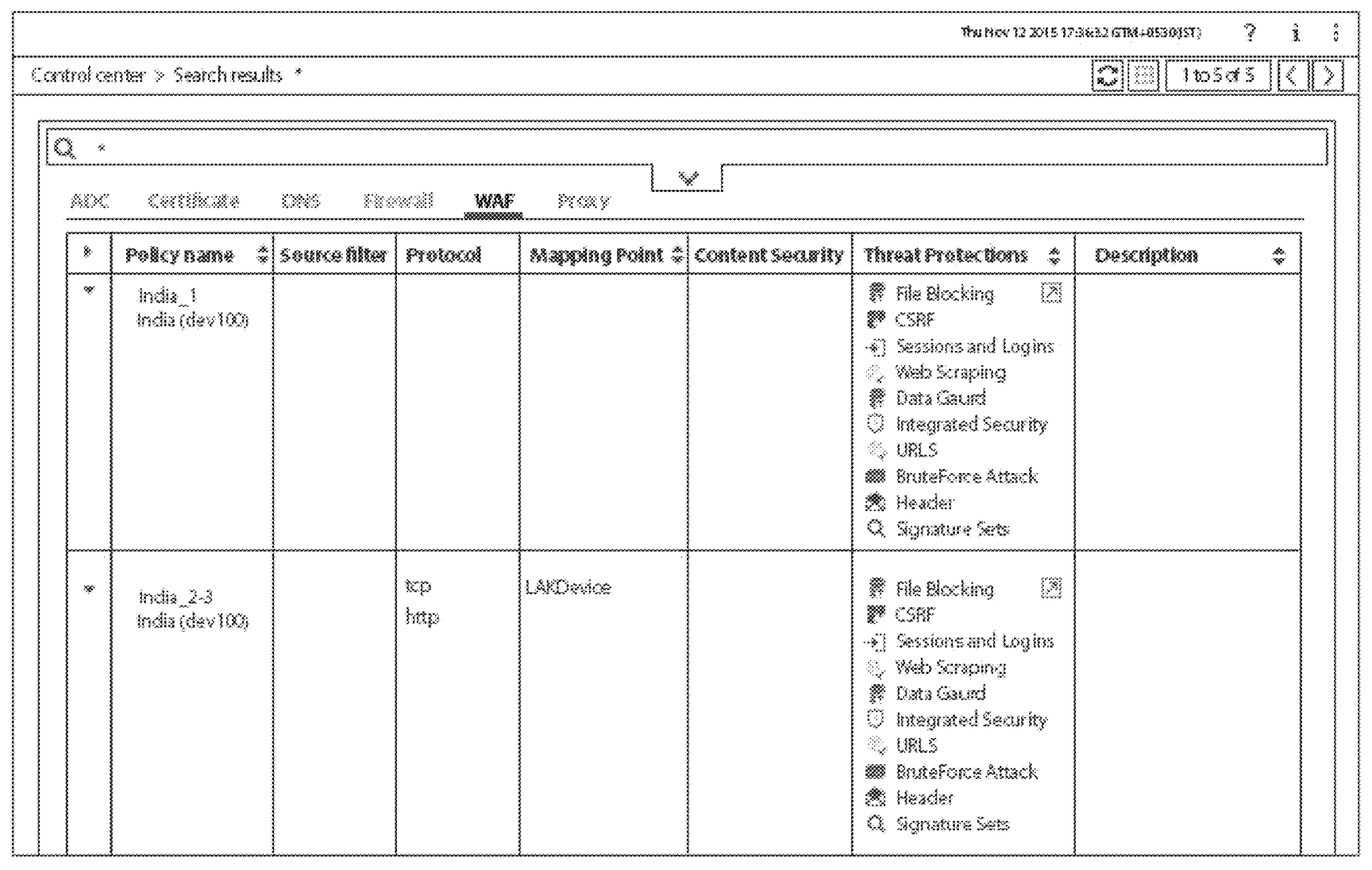

FIGS. 26A and 26B illustrate user interface views of a web application firewall (WAF) device search module according to an embodiment herein. The user interface views of the WAF device search module allows the user to search for the WAF devices using keywords. The user interface views of the WAF device search module provides (a) a policy name of the WAF device, (b) a source filter for the WAF device, (c) a protocol used for the WAF device, (d) mapping point for the WAF device, (e) a content security for the WAF device, (f) threat protections for the WAF device, (g) description for the WAF device. The user interface view provides a search option to search for the one or more WAF devices 112A-Nn using a search query such as free text form, keyword based, and logical operators (e.g. 'AND', 'OR'). The logical operators are used as the search query in case of multiple criteria needs to be provided. In one embodiment, the user interface view of the WAF device search module provides a search option to search for the rule/policy details of the WAF device using the above mentioned search queries.

Figure 27:
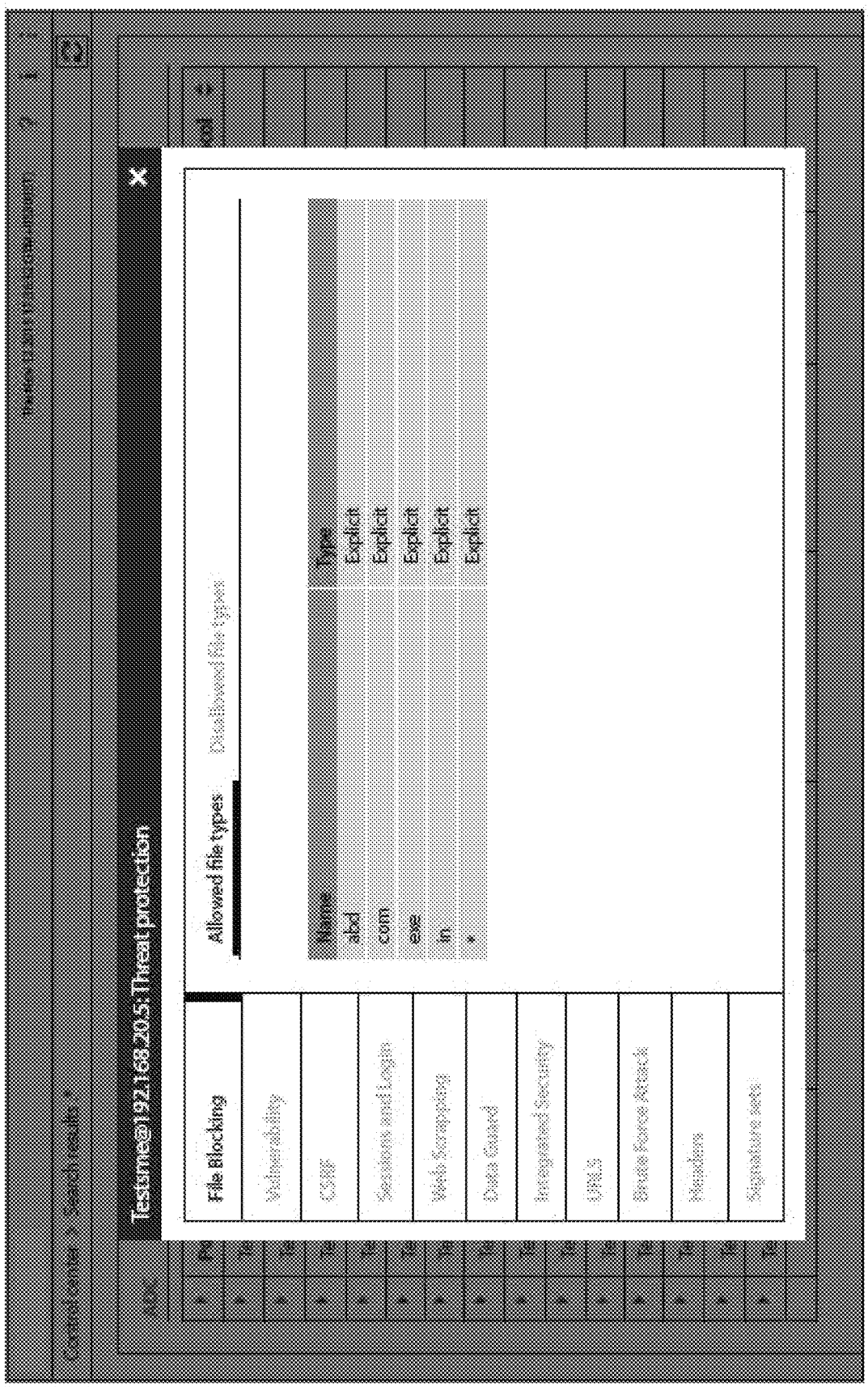
FIG. 27 illustrates a user interface view of particular object of a web application firewall (WAF) device according to an embodiment herein.

FIG. 27 illustrates a user interface view of particular object of a web application firewall (WAF) device according to an embodiment herein. The user interface view provides details of a particular object of the WAF device when selecting the WAF device from the WAF device inventory.

Figure 28:
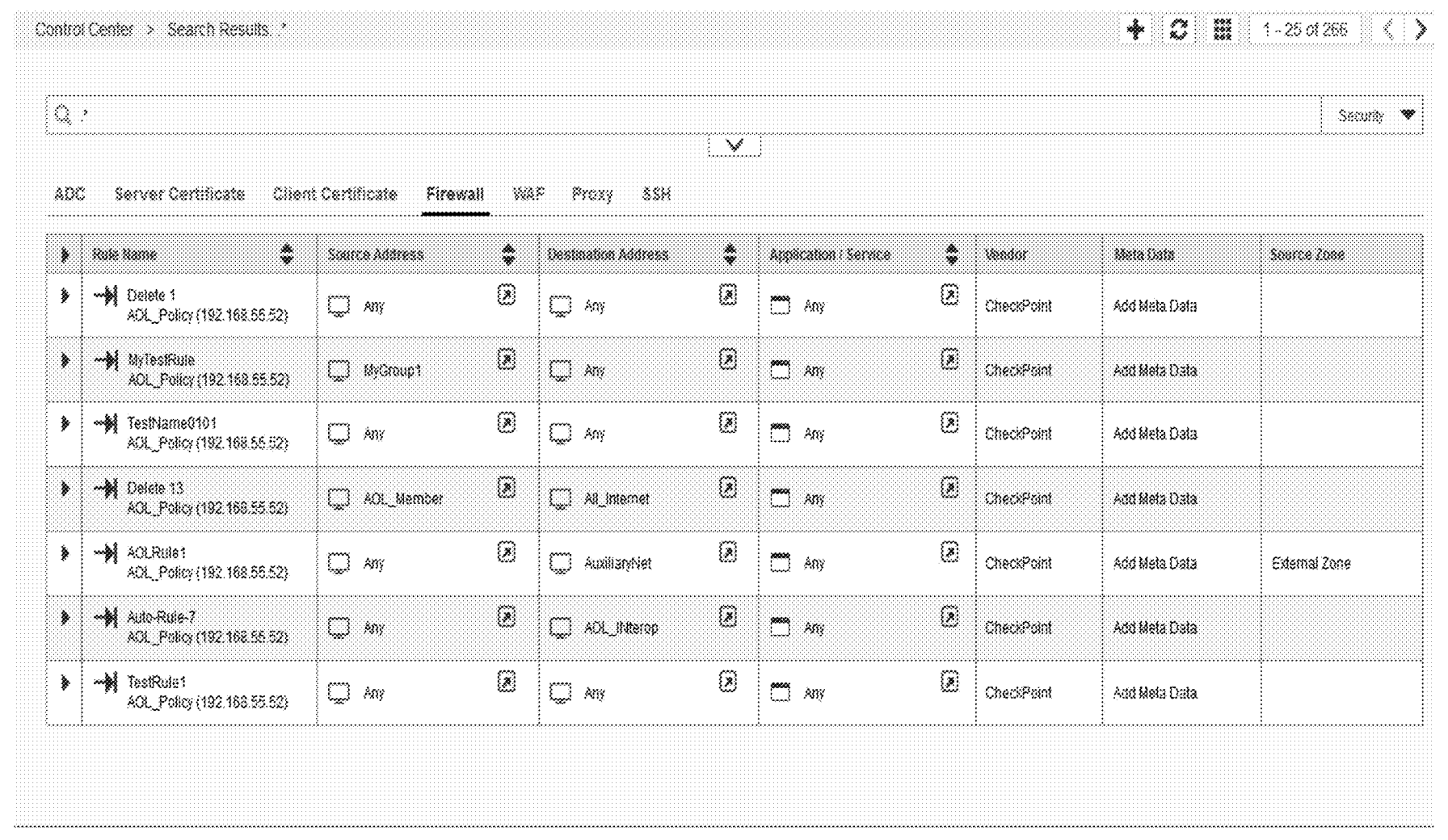

FIG. 28 illustrates a user interface view of a firewall module according to an embodiment herein. The user interface view of the firewall module enables the one or more users 102A-N to view one or more rules associated with the one or more firewall devices 112A1-Nn. The user interface view of the firewall module also referred as abstracted rule base view. The abstracted rule base view provides the details as follows: (a) a rule name filed that provides one or more rules of the one or more firewall devices 112A1-Nn, (b) source address for each firewall device, (c) destination address for each firewall device, (d) application or service associated with each of the rule, (e) a vendor for each of the firewall device, (f) metadata associated with each of the rule and (g) source zone for each of the rule. The metadata includes one or more external files that related to a rule. The user interface view enables the user to add/upload the external details/files related to the rule.

Figure 29A:
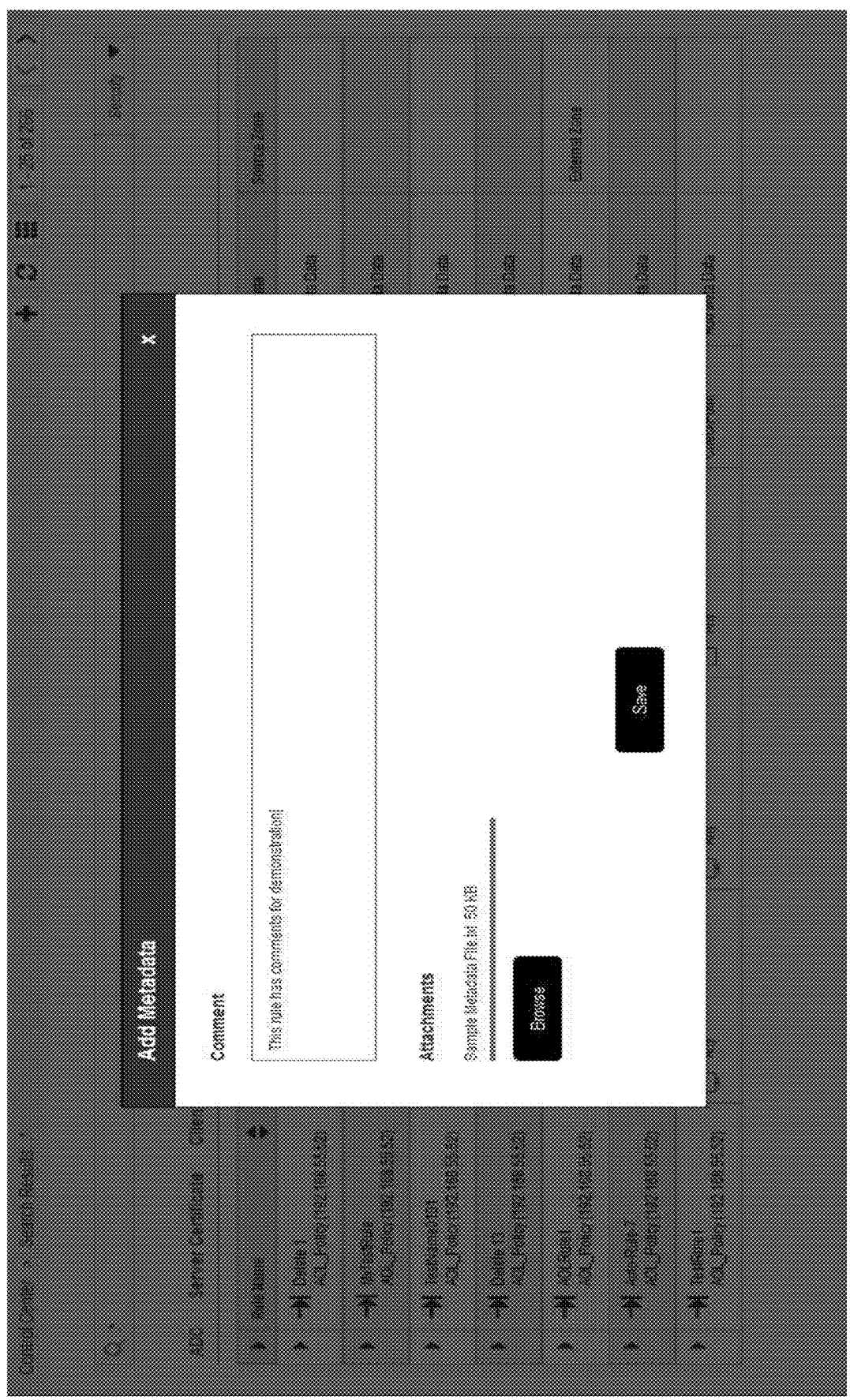
Figure 29B:
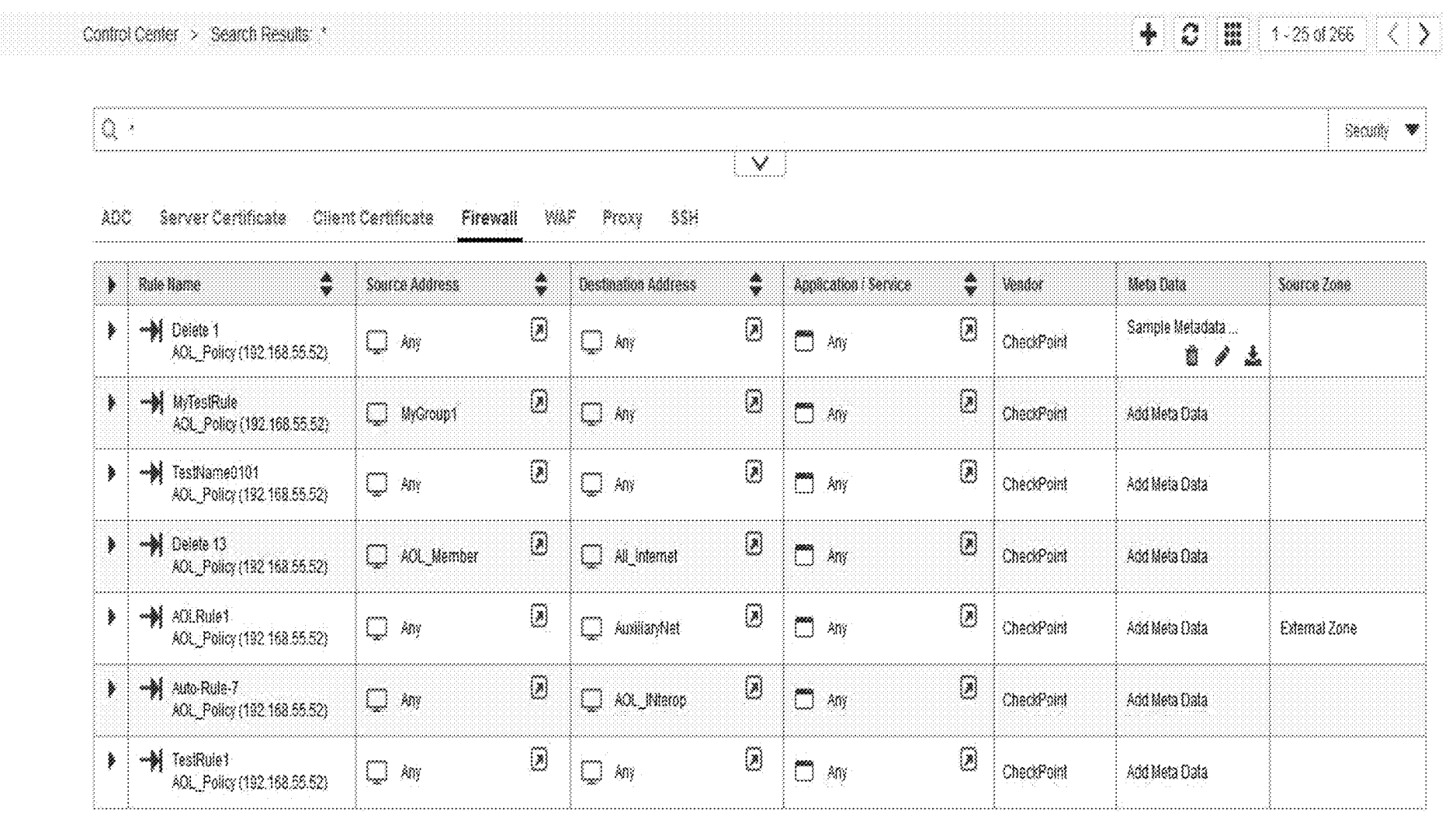

FIGS. 29A and 29B illustrates user interface views depicts adding metadata to a rule according to an embodiment herein. When selects add metadata option under a metadata field, the user interface view provides a pop-up page to add details/comments related to the rule and attach a files/documents that are related to a specific rule (shown in FIG. 29A). The comment and/or the file related to the rule is stored in the database 202. The user interface view FIG. 29B depicts the metadata field after addition of the metadata to the rule. The user interface view FIG. 29B enables the user to (a) delete the metadata, (b) edit the metadata and (c) download the metadata. In one embodiment, the metadata option enables the one or more users 102A-N to refer and add additional data, that can help in organizing tasks and update the additional data on consequent tasks to provide more details to the rule.

Figure 30A:
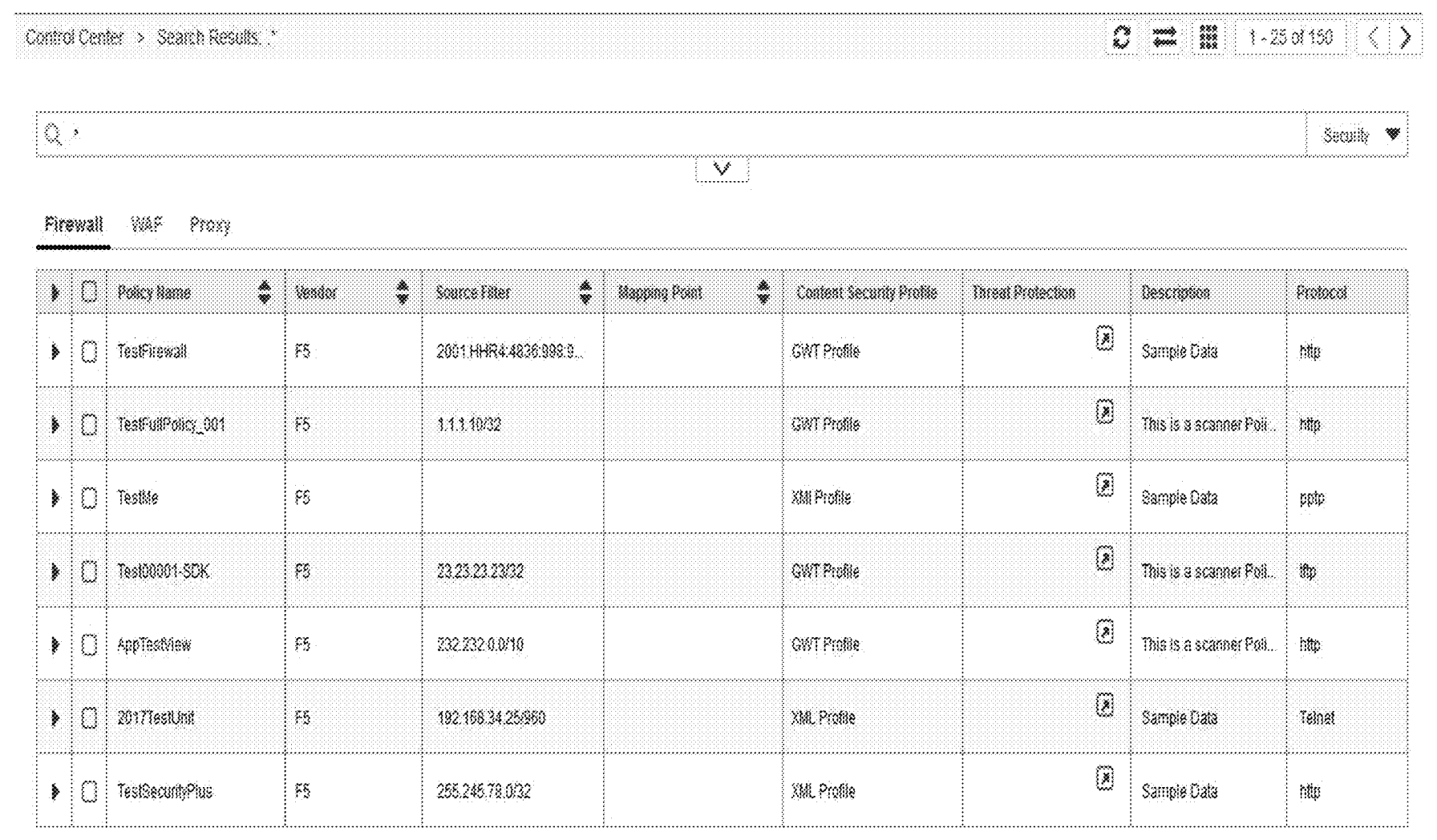
Figure 30B:
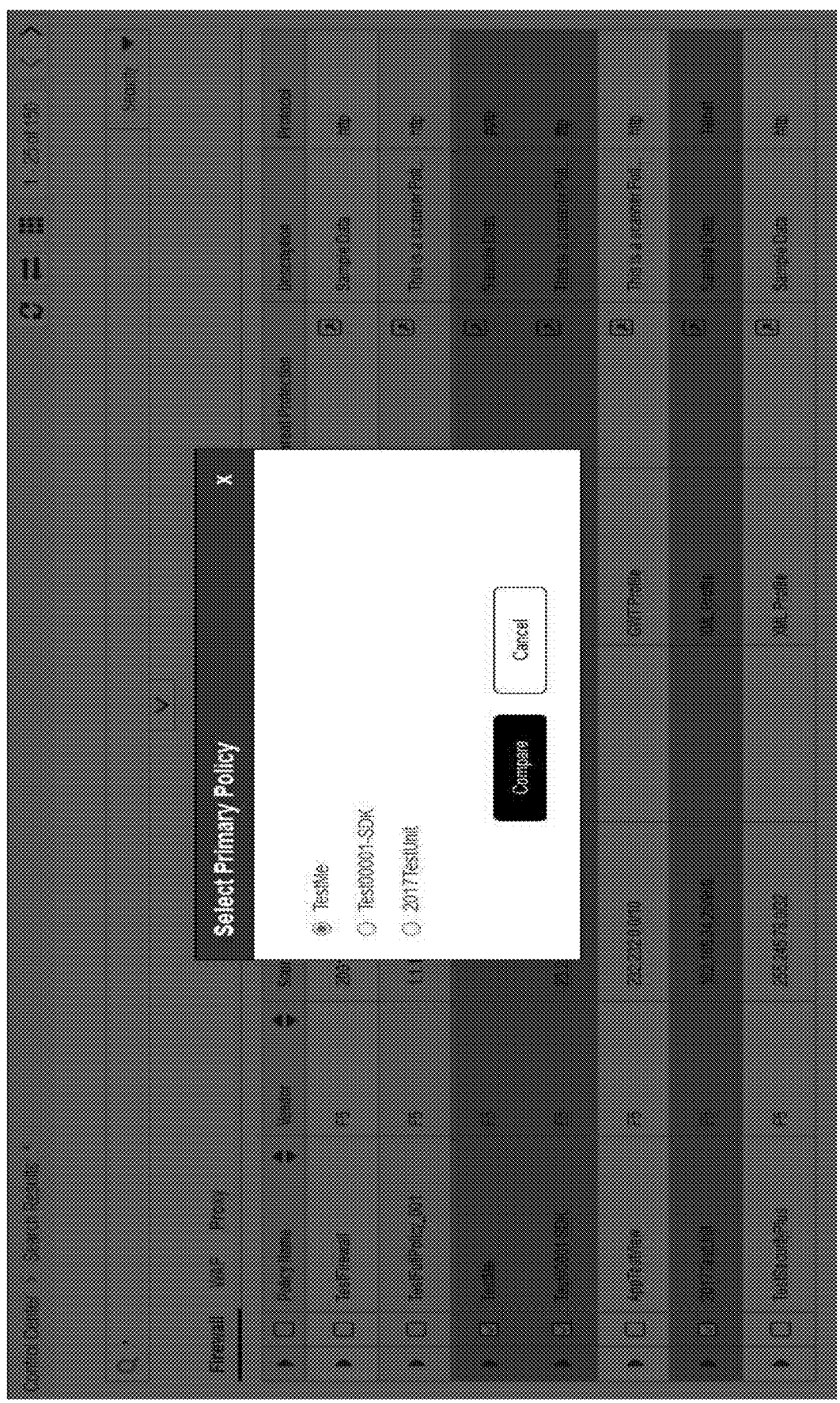

FIGS. 30A-30C illustrates user interface views depicts WAF Policy comparison according to an embodiment herein. The user interface view of FIG. 30A enables the one or more user 102A-N to compare the WAF's (Web Application Firewalls). Initially, the user interface view enables the one or more user 102A-N to select one or more WAF's for comparison. The user interface view of FIG. 30B allows the one or more user 102A-N to select a WAF policy against which other or other two WAF policies can be compared, for changes in values, and missing attributes. The user interface view of FIG. 30C provides a result of comparison of the selected WAF policies. In one embodiment, the differences are high-lighted on all levels, and missing parameters are indicated through strikethrough etc. The WAF comparison helps the one or more users 102A-N to validate before and after change to the WAF policy, and review changes before applying the WAF policy to the one or more firewall devices 112A1-Nn.

Figure 31A:
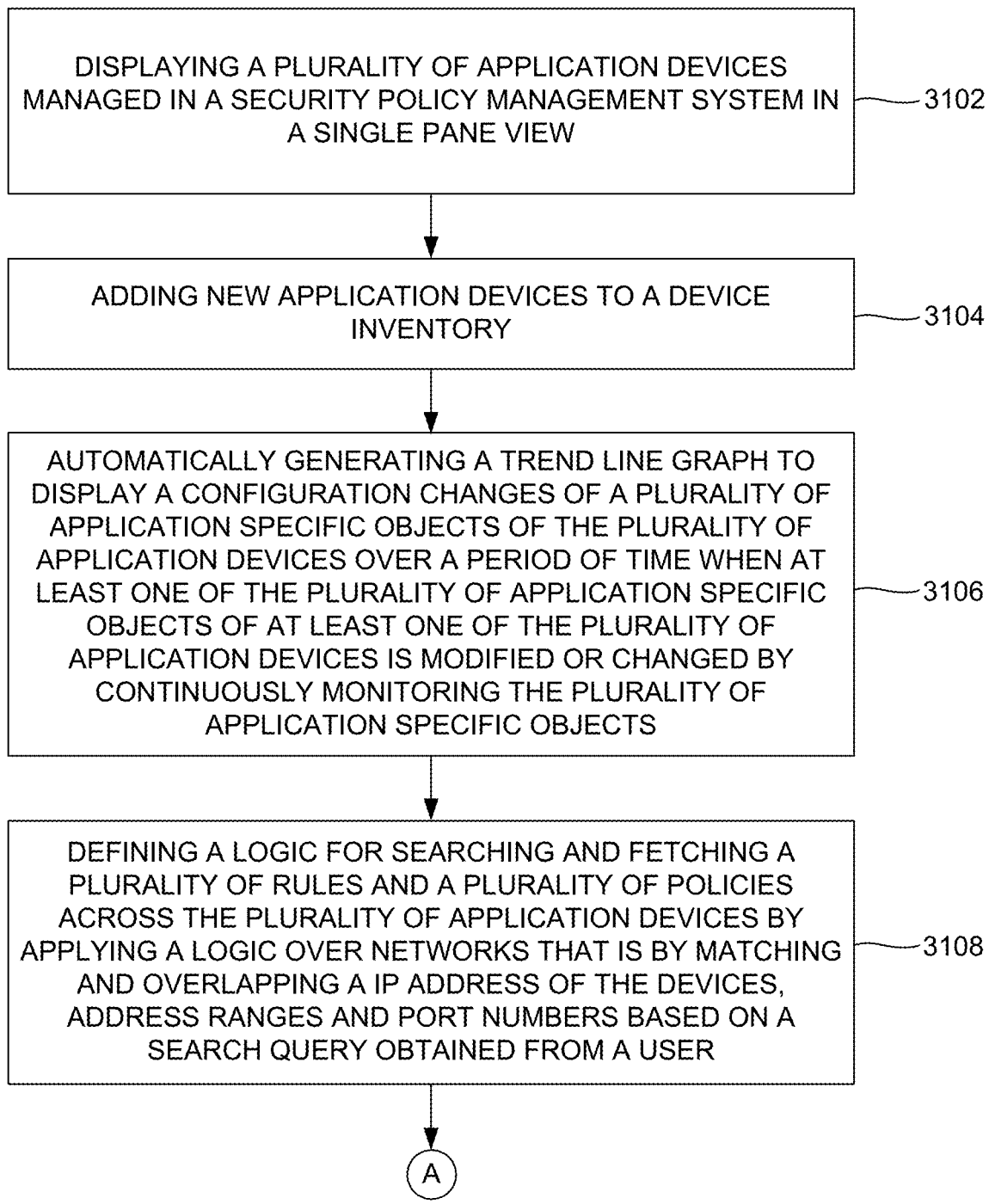
FIGS. 31A-31B are a flow diagram illustrating a computer implemented method for monitoring and managing firewall devices using the security policy management system of FIG. 1 according to an embodiment herein.
Figure 31B:
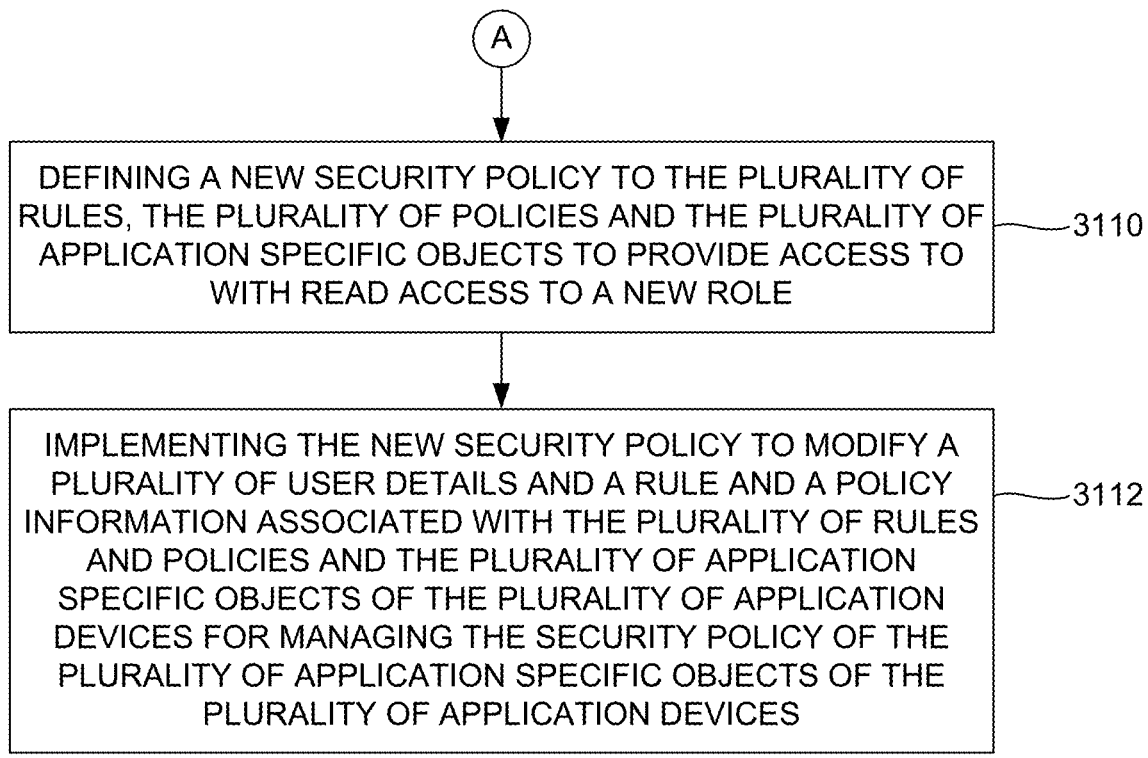

FIGS. 31A-31B are flow diagrams illustrating a computer implemented method for monitoring and managing firewall devices using the security policy management system 106 of FIG. 1 according to an embodiment herein. In step 3102, the plurality of application devices 112A1-Nn managed in a security policy management system 106 is displayed in a single pane view. The plurality of application devices 112A1-Nn is displayed along with abstracted rule base of the plurality of application devices 112A1-Nn. The abstracted rule base is designed and configured to display configurations of the plurality of application devices 112A1-Nn of different vendors in a unified manner. In step 3104, new application devices are added to a device inventory. The newly added application devices are displayed and managed under the single pane view. In step 3106, a trend line graph is automatically generated to display a configuration changes of the plurality of application specific objects of the plurality of application devices 112A1-Nn over a period of time when at least one of the plurality of application specific objects of at least one of the plurality of application devices 112A1-Nn is modified or changed by continuously monitoring the plurality of application specific objects. In step 3108, logic is defined for searching and fetching a plurality of rules and a plurality of policies across the plurality of application devices 112A1-Nn by applying logic over networks that are by matching and overlapping a IP address of the devices, address ranges and port numbers based on a search query obtained from a user. The logic over networks includes identifying a starting range and an ending range of the IP address and analyzing the plurality of application specific objects, the plurality of rules and the plurality of policies that matches or overlaps between the starting range and the ending range of the IP address. In step 3110, a new security policy is defined to the plurality of rules, the plurality of policies and the plurality of application specific objects to provide access to with read access to a new role. In step 3112, the new security policy is implemented to modify a plurality of user details and a rule and a policy information associated with the plurality of rules and policies and the plurality of application specific objects of the plurality of application devices 112A1-Nn for managing the security policy of the plurality of application specific objects of the plurality of application devices 112A1-Nn. The rules include at least one of (a) one or more security rules or (b) one or more NAT rules. The one or more NAT rules are re-ordered as per application device NAT lookup logic when modifying any of a NAT rule.

Figure 32:
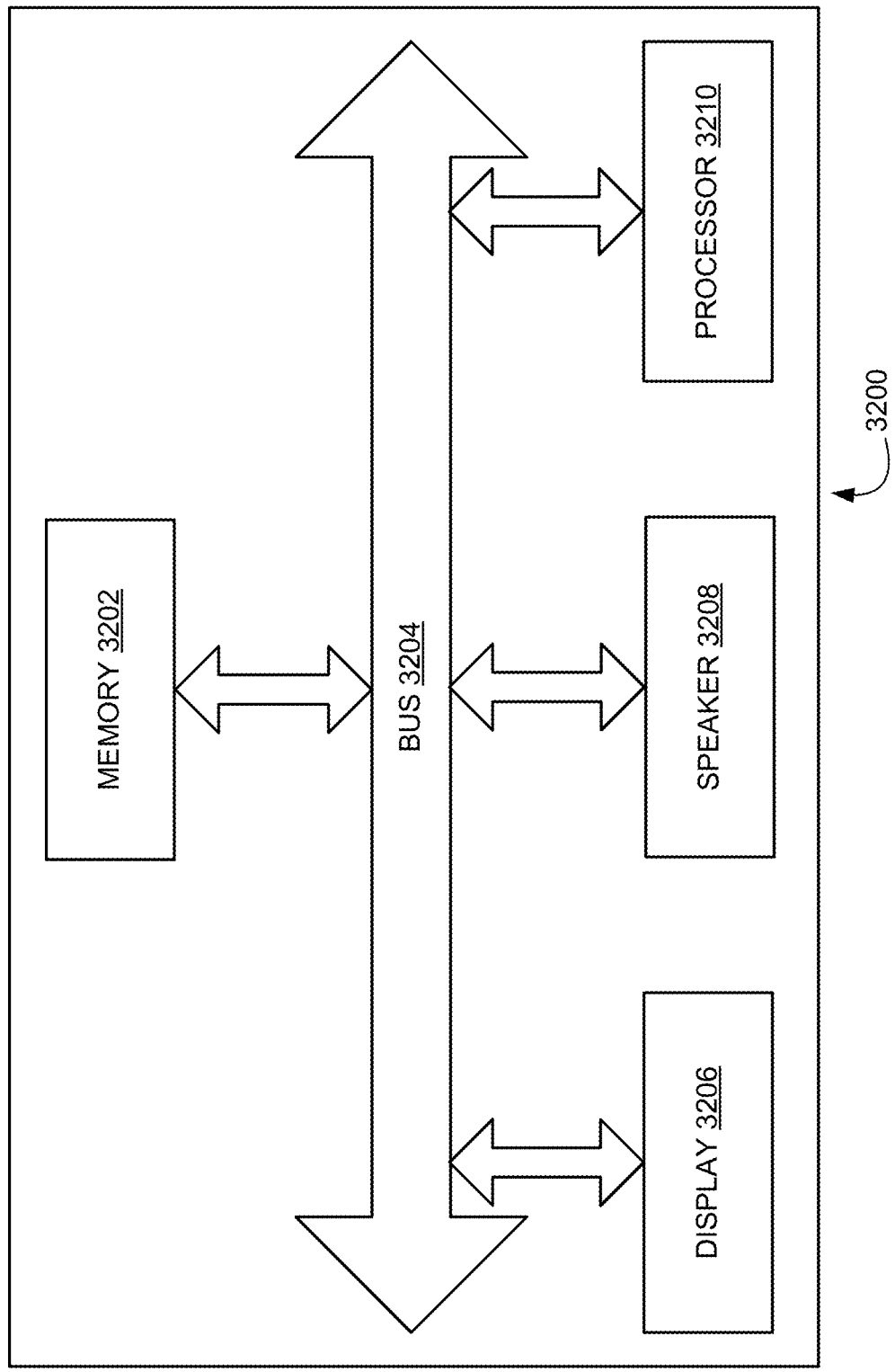
FIG. 32 illustrates an exploded view of a receiver of FIG. 1 according to an embodiment herein.

FIG. 32 illustrates an exploded view of a receiver 3200 of FIG. 1 having a memory 3202 having a set of instructions, a bus 3204, a display 3206, a speaker 3208, and a processor 3210 capable of processing the set of instructions to perform any one or more of the methodologies herein, according to an embodiment herein. The processor 3210 may also enable digital content to be consumed in the form of video for output via one or more displays 3206 or audio for output via speaker and/or earphones 3208. The processor 3210 may also carry out the methods described herein and in accordance with the embodiments herein.

Digital content may also be stored in the memory 3202 for future processing or consumption. The memory 3202 may also store program specific information and/or service information (PSSI), including information about digital content (e.g., the detected information bits) available in the future or stored from the past. A user of the receiver 3200 may view this stored information on display 3206 and select an item of for viewing, listening, or other uses via input, which may take the form of keypad, scroll, or other input device(s) or combinations thereof. When digital content is selected, the processor 3210 may pass information. The content and PSI/SI may be passed among functions within the receiver using the bus 3204.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 33:
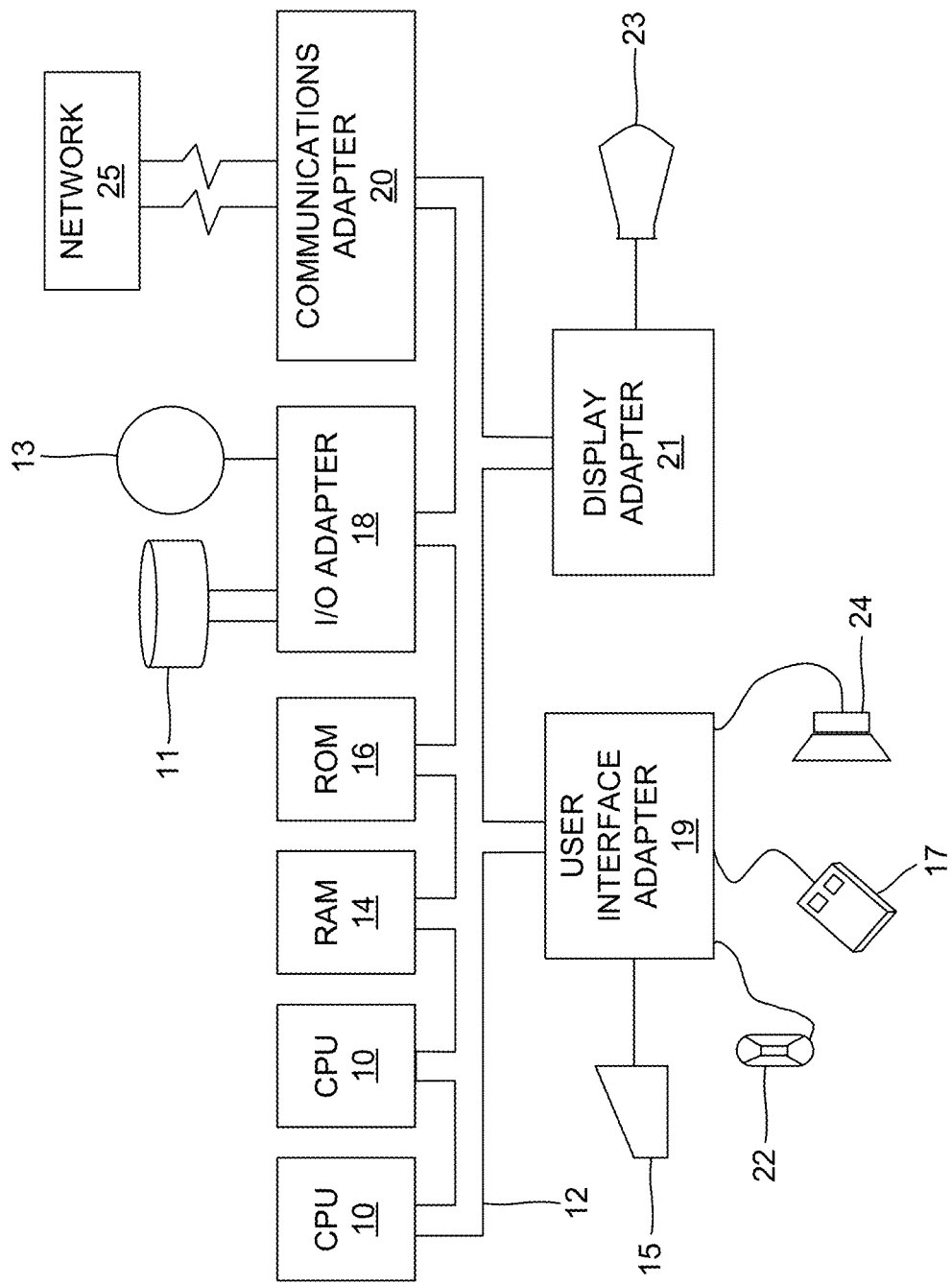
FIG. 33 illustrates a schematic diagram of a hardware configuration of information handling computer architecture according to an embodiment herein.

FIG. 33 is a schematic drawing illustrates a hardware configuration of information handling/computer architecture in accordance with the embodiments herein. The computer architecture includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The security policy management system 106 easily identifies the one or more application specific objects of the one or more firewall devices 112A1-Nn based on the smart search capability. The security policy management system 106 is used for security management (e.g. changing a role/security policy for the objects) of the one or more application specific objects of the one or more firewall devices 112A1-Nn. In high-level key word (e.g. IP address) search, the existing systems search in a database and provides the matching firewall device (or provides s result as no matching firewall device for a keyword), whereas the security policy management system 106 identifies the IP range of the IP address (e.g. identifies a starting and an ending range of the IP address) and searching the one or more rule and the one or more policies that matches the IP ranges and final output provides the one or more firewall devices 112A1-Nn, the one or more rules and the one or more application specific objects of the firewall devices. For example, if an employee resigned his/her position in an organization, the organization needs to be update the security policy, at that time a network admin may search for the IP ranges to identify the rules to update the rules with security policy (e.g. access role for that rules and objects).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A security policy management system for monitoring and managing security policies of a plurality of application specific objects of a plurality of application devices across a plurality of datacenters by defining a security policy, said security policy management system comprising:

a memory that stores a database; and a hardware processor that is executed and configured to:

display said plurality of application devices that are managed in said security policy management system in a single pane view, wherein said plurality of application devices are displayed along with abstracted rule base of said plurality of application devices, wherein an abstract rule base view is designated as a user interface view that enables a user to add/upload related external details or files and said abstracted rule base is designed and configured to display configurations of said plurality of application devices of different vendors in a unified manner that simplifies users of said plurality of application devices to view the configuration displays of the different vendors without showing vendor-specific views;

add said plurality of application devices to a device inventory, wherein said added plurality of application devices are displayed and managed under said single pane view;

automatically generate a trend line graph to display outages and configuration changes of said plurality of application specific objects of said plurality of application devices over a period of time when at least one of said plurality of application specific objects of at least one of said plurality of application devices is modified or changed by continuously reviewing the changes and monitoring said plurality of application specific objects of said plurality of application devices before applying the changes to associated application devices;

define a search logic to query and fetch a plurality of rules and a plurality of policies across said plurality of application devices by applying said search logic over networks by matching and overlapping a range of IP addresses, wherein said search logic over networks comprises identifying a set of starting range and an ending range of said IP addresses obtained from a user as a search query and analyzing said plurality of application specific objects, said plurality of rules and said plurality of policies that matches or overlaps between said starting range and said ending range of said IP addressees;

define a new security policy associated with said plurality of rules, and said plurality of policies and assign a new role to said plurality of application specific objects of said plurality of application devices stored in said device inventory with appropriate access permissions; and automatically implement said new security policy to modify a plurality of user details and policy information associated with said plurality of rules and policies in values or attributes and said plurality of application specific objects of said plurality of application devices for managing said security policy of said plurality of application specific objects of said plurality of application devices, wherein said rules comprises at least one of (a) one or more security rules or (b) one or more NAT rules that are applicable to said one or more security rules, wherein said one or more NAT rules are re-ordered as per an application device NAT lookup logic when modifying any of the one or more NAT rules.

2. The security policy management system of claim 1, wherein said processor is further configured to:
assign a role to said plurality of application specific objects of said plurality of application devices that are stored in said device inventory with security policies as read or write access;
assign a plurality of roles to said plurality of application specific objects of said plurality of application devices; and
provide privileges over access of functions of said plurality of application devices managed in said security policy management system and said plurality of application specific objects that are allowed to manage.

3. The security policy management system of claim 2, wherein said plurality of application devices comprises at least one of a plurality of firewall devices, a plurality of proxy devices or a plurality of web application firewall devices,
wherein said plurality of application specific objects comprises at least one of said plurality of rules, said plurality of polices or objects of said plurality of rules comprises at least one of IP address, network objects or UTM profiles.

4. The security policy management system of claim 2, wherein said processor is further configured to:
(i) select a user role to modify said role of said user through an account management,
(ii) select at least one device that is assigned for said user under said access control tab,
(iii) select appropriate access to said role for said selected object, and
(iv) move said selected object of said plurality of application devices from an available list to assigned list.

5. The security policy management system of claim 1, wherein said processor is further configured to:
display a plurality of rule and a plurality of policy information of said plurality of application devices on a control center page under a firewall tab, a proxy device tab and a WAF device tab; and
enable said plurality of users to add metadata to each rule of said plurality of application devices under said firewall tab, said proxy device tab and said WAF device tab, wherein said metadata comprises additional data or external files related to said rule.

6. The security policy management system of claim 1, wherein said processor is further configured to:
(i) automatically detect a high availability peer device which associated to a particular policy, wherein said high availability peer device is detected using an IP address of an application device; and
(ii) add a secondary application device by manually entering said secondary application device details.

7. The security policy management system of claim 1, wherein said processor is further configured to:
search for said plurality of rules, said plurality of policies and said plurality of objects based on IP objects and network objects that are obtained as said search query, wherein said search query comprises at least one of (i) state of a rule, (ii) a device name associated to a policy, (iii) action associated to a policy or a rule base managed within said plurality of application devices, (iv) a policy name, (v) a source object name associated to said policy or said rule base, (vi) a destination object name associated to said policy or said rule base, (vii) IP addresses comprises an individual IP address, an IP address with subnet mask, and object range that are associated to said policy or said rule base, (viii) a destination IP addresses comprises an individual IP address, an IP address with subnet mask, and object range that are associated to said policy or said rule base, (ix) a service object name that associated to said rule and (x) an application or an object name that associated to said policy or said rule base.

8. The security policy management system of claim 1, wherein said security policy management system (a) defines a shared object and deploys said shared object in said plurality of application devices and (b) provides ability to re-use an object by sharing across vendors of said plurality of application devices by abstracting information of vendors.

9. The security policy management system of claim 1, wherein said security policy management system migrate rules from one application device to another application device.

10. The security policy management system of claim 1, wherein said security policy management system provides said NAT rules that are applicable for said security rules when selecting said security rules specific to an application device.

11. A computer-implemented method for monitoring and managing a security policy of a plurality of application specific objects of a plurality of application devices across a plurality of datacenters by defining a security policy, comprising:
displaying said plurality of application devices managed in a security policy management system in a single pane view, wherein said plurality of application devices are displayed along with abstracted rule base of said plurality of application devices, wherein an abstract rule base view is designated as a user interface view that enables a user to add/upload related external details or files and said abstracted rule base is designed and configured to display configurations of said plurality of application devices of different vendors in a unified manner that simplifies users of said plurality of application devices to view the configuration displays of the different vendors without showing vendor-specific views;
adding new application devices to a device inventory, wherein said newly added application devices are displayed and managed under said single pane view;
automatically generating a trend line graph to display a configuration changes of said plurality of application specific objects of said plurality of application devices over a period of time when at least one of said plurality of application specific objects of at least one of said plurality of application devices is modified or changed by continuously reviewing the changes and monitoring said plurality of application specific objects of said plurality of application devices before applying the changes to associated application devices;
defining a search logic to query and fetching a plurality of rules and a plurality of policies across said plurality of application devices by applying said search logic over networks by matching and overlapping a range of IP addresses and port numbers of said plurality of application devices based on a search query obtained from a user, wherein said search logic over networks comprises identifying a set of starting range and an ending range of said IP addresses and port numbers and analyzing said plurality of application specific objects, said plurality of rules and said plurality of policies that matches or overlaps between said starting range and said ending range of said IP addresses and port numbers;

defining a new security policy associated with said plurality of rules, and said plurality of policies and assigning a new role to said plurality of application specific objects of said plurality of application devices stored in said device inventory with read access permissions; and implementing said new security policy to modify a plurality of user details and a policy information associated with said plurality of rules and policies in values or attributes and said plurality of application specific objects of said plurality of application devices for managing said security policy of said plurality of application specific objects of said plurality of application devices, wherein said rules comprises at least one of (a) one or more security rules or (b) one or more NAT rules that are applicable to said one or more security rules, wherein said one or more NAT rules are re-ordered as per an application device NAT lookup logic when modifying any of the one or more NAT rules.

12. The computer-implemented method of claim 11, further comprising:
tagging one or more rules of said plurality of application devices to an application ID to monitor said plurality of application devices, wherein said any of a rule from said one or more rules is retrieved by searching said corresponding application ID.

13. The computer-implemented method of claim 11, further comprising:
assigning a role to said plurality of application specific objects of said plurality of application devices that are stored in said device inventory with security policies as read or write access;
assigning a plurality of roles to said plurality of application specific objects of said plurality of application devices; and
providing privileges over access of functions of said plurality of application devices managed in said security policy management system and said plurality of application specific objects that are allowed to manage.

14. The computer-implemented method of claim 11, further comprising:
automatically detecting a high availability peer device which associated to a particular policy, wherein said high availability peer device is detected using an IP address of an application device; and
obtaining details about a secondary application device that is manually entered by a user.

15. The computer-implemented method of claim 11, further comprising:
searching for said plurality of rules, said plurality of policies and said plurality of objects based on IP objects and network objects that are obtained as said search query,
wherein said search query comprises at least one of (i) state of a rule, (ii) a device name associated to a policy, (iii) action associated to a policy or a rule base managed within said plurality of application devices, (iv) a policy name, (v) a source object name associated to said policy or said rule base, (vi) a destination object name associated to said policy or said rule base, (vii) IP addresses comprises an individual IP address, an IP address with subnet mask, and object range that are associated to said policy or said rule base, (viii) a destination IP addresses comprises an individual IP address, an IP address with subnet mask, and object range that are associated to said policy or said rule base, (ix) a service object name that associated to said rule and (x) an application or an object name that associated to said policy or said rule base.

16. The computer-implemented method of claim 11, further comprising:
providing said NAT rules that are applicable for said security rules when selecting said security rules specific to said application device; and
migrating rules from one application device to another application device.

17. The computer-implemented method of claim 11, further comprising:
comparing web application firewall (WAF) policies to determine changes in values and attributes of said web application firewall policies, wherein said comparison (a) enables validation of said web application firewall policies before and after change and (b) enables said plurality of users to review changes said changes in said web application firewall policies before applying a web application firewall policy to a web application firewall device.

18. One or more non-transitory computer-readable storage mediums storing one or more sequences of instructions, which when executed by one or more hardware processors, cause monitoring and managing a security policy of a plurality of application specific objects of a plurality of application devices across a plurality of datacenters by defining a security policy, by performing:
displaying said plurality of application devices managed in a security policy management system in a single pane view, wherein said plurality of application devices are displayed along with abstracted rule base of said plurality of application devices, wherein an abstract rule base view is designated as a user interface view that enables a user to add/upload related external details or files and said abstracted rule base is designed and configured to display configurations of said plurality of application devices of different vendors in a unified manner that simplifies users of said plurality of application devices to view the configuration displays of the different vendors without showing vendor-specific views;
adding new application devices to a device inventory, wherein said newly added application devices are displayed and managed under said single pane view;
automatically generating a trend line graph to display outages and configuration changes of said plurality of application specific objects of said plurality of application devices over a period of time when at least one of said plurality of application specific objects of at least one of said plurality of application devices is modified or changed by continuously reviewing the changes and monitoring said plurality of application specific objects of said plurality of application devices before applying the changes to associated application devices;
defining a search logic to query and fetching a plurality of rules and a plurality of policies across said plurality of application devices by applying said search logic over networks by matching and overlapping a range of IP addresses and port numbers of said plurality of application devices based on a search query obtained from a user, wherein said search logic over networks comprises identifying a set of starting range and an ending range of said IP addresses and port numbers and analyzing said plurality of application specific objects, said plurality of rules and said plurality of policies that matches or overlaps between said starting range and said ending range of said IP addresses and port numbers;

defining a new security policy associated with said plurality of rules, and said plurality of policies and assigning a new role to said plurality of application specific objects of said plurality of application devices stored in said device inventory with appropriate access permissions; and implementing said new security policy to modify a plurality of user details and a policy information associated with said plurality of rules and policies in valves or attributes and said plurality of application specific objects of said plurality of application devices for managing said security policy of said plurality of application specific objects of said plurality of application devices, wherein said rules comprises at least one of (a) one or more security rules or (b) one or more NAT rules that are applicable to said one or more security rules, wherein said one or more NAT rules are re-ordered as per an application device NAT lookup logic when modifying any of the one or more NAT rules.

19. The one or more non-transitory computer-readable storage mediums storing one or more sequences of instructions of claim 18, which when executed by the one or more processors further cause:

assigning a role to said plurality of application specific objects of said plurality of application devices that are stored in said device inventory with security policies as read or write access;

assigning a plurality of roles to said plurality of application specific objects of said plurality of application devices; and providing privileges over access of functions of said plurality of application devices managed in said security policy management system and said plurality of application specific objects that are allowed to manage.

20. The one or more non-transitory computer-readable storage mediums storing one or more sequences of instructions of claim 18, which when executed by the one or more processors further cause:

automatically detecting a high availability peer device which associated to a particular policy, wherein said high availability peer device is detected using an IP address of an application device;

obtaining details about a secondary application device that is manually entered by a user;

providing said NAT rules that are applicable for said security rules when selecting said security rules specific to said application device; and migrating rules from one application device to another application device.

* * * * *